United States Patent
Hoek et al.

(10) Patent No.: US 10,532,328 B2
(45) Date of Patent: Jan. 14, 2020

(54) POLYANILINE-BASED CHLORINE RESISTANT HYDROPHILIC FILTRATION MEMBRANES

(71) Applicant: The Regents of the University of California, Oakland, CA (US)

(72) Inventors: Eric M. V. Hoek, Pacific Palisades, CA (US); Richard B. Kaner, Pacific Palisades, CA (US); Xinwei Huang, West Hollywood, CA (US); Brian T. McVerry, Los Angeles, CA (US); Shaily Mahendra, Santa Monica, CA (US)

(73) Assignee: The Regents of the University of California, Oakland, CA (US)

( * ) Notice: Subject to any disclaimer, the term of this patent is extended or adjusted under 35 U.S.C. 154(b) by 274 days.

(21) Appl. No.: 15/302,361

(22) PCT Filed: Apr. 7, 2015

(86) PCT No.: PCT/US2015/024635
§ 371 (c)(1),
(2) Date: Oct. 6, 2016

(87) PCT Pub. No.: WO2015/157227
PCT Pub. Date: Oct. 15, 2015

(65) Prior Publication Data
US 2017/0050153 A1    Feb. 23, 2017

Related U.S. Application Data

(60) Provisional application No. 61/976,688, filed on Apr. 8, 2014.

(51) Int. Cl.
| | | |
|---|---|---|
| *B01D 71/60* | (2006.01) | |
| *B01D 61/00* | (2006.01) | |
| *B01D 69/02* | (2006.01) | |
| *B01D 69/10* | (2006.01) | |
| *B01D 71/68* | (2006.01) | |
| *C08G 73/02* | (2006.01) | |
| *B01D 71/56* | (2006.01) | |
| *B01D 61/02* | (2006.01) | |
| *B01D 61/14* | (2006.01) | |
| *B01D 67/00* | (2006.01) | |
| *C02F 1/44* | (2006.01) | |
| *C08J 5/18* | (2006.01) | |
| *B01D 69/12* | (2006.01) | |

(52) U.S. Cl.
CPC ............ *B01D 71/60* (2013.01); *B01D 61/002* (2013.01); *B01D 61/025* (2013.01); *B01D 61/027* (2013.01); *B01D 61/145* (2013.01); *B01D 67/0006* (2013.01); *B01D 67/0011* (2013.01); *B01D 67/0013* (2013.01); *B01D 69/02* (2013.01); *B01D 69/10* (2013.01); *B01D 71/68* (2013.01); *C02F 1/441* (2013.01); *C08G 73/0266* (2013.01); *C08J 5/18* (2013.01); *B01D 69/125* (2013.01); *B01D 71/56* (2013.01); *B01D 2325/28* (2013.01); *B01D 2325/30* (2013.01); *B01D 2325/36* (2013.01); *C08J 2379/02* (2013.01); *C08J 2481/06* (2013.01)

(58) Field of Classification Search
None
See application file for complete search history.

(56) References Cited

U.S. PATENT DOCUMENTS

| | | | |
|---|---|---|---|
| 4,504,529 | A | 3/1985 | Sorensen et al. |
| 4,976,860 | A | 12/1990 | Takahashi et al. |
| 5,096,586 | A | 3/1992 | Kaner et al. |
| 5,156,780 | A | 10/1992 | Kenigsberg et al. |
| 5,234,453 | A | 8/1993 | Smith et al. |
| 5,358,556 | A | 10/1994 | Kaner et al. |
| 5,916,485 | A | 6/1999 | Besenhard et al. |
| 5,981,695 | A | 11/1999 | Mattes et al. |
| 6,429,282 | B1 | 8/2002 | Wang et al. |
| 6,465,120 | B1 | 10/2002 | Akita et al. |
| 6,797,325 | B2 | 9/2004 | Wang et al. |
| 7,033,639 | B2 | 4/2006 | Kelly et al. |
| 7,160,575 | B1 | 1/2007 | Pinto et al. |
| 7,250,189 | B2 | 7/2007 | Ji et al. |
| 7,309,385 | B2 | 12/2007 | Hong et al. |
| 7,455,891 | B2 | 11/2008 | Kunz et al. |

(Continued)

FOREIGN PATENT DOCUMENTS

| | | |
|---|---|---|
| CA | 1148834 A1 | 6/1983 |
| CN | 101274221 A | 10/2008 |

(Continued)

OTHER PUBLICATIONS

Song, Edward et al—Conducting Polyaniline Nanowire and Its Applications in Chemiresistive Sensing—Nanomaterials, 2013, 3, 498-523—Aug. 7, 2013 (Year: 2013).*

(Continued)

*Primary Examiner* — Bradley R Spies
(74) *Attorney, Agent, or Firm* — Foley Hoag LLP; David P. Halstead; Alexander J. Chatterley

(57) ABSTRACT

In one aspect, the invention relates to chlorine-resistant filtration membranes comprising n-alkyl substituted polyaniline derivatives for use in, for example, water purification, and methods for making and using same. This abstract is intended as a scanning tool for purposes of searching in the particular art and is not intended to be limiting of the present invention.

13 Claims, 9 Drawing Sheets

(56) References Cited

U.S. PATENT DOCUMENTS

| | | |
|---|---|---|
| 7,510,658 B2 | 3/2009 | Gordon |
| 7,535,019 B1 | 5/2009 | Sager et al. |
| 7,601,263 B2 | 10/2009 | Ebert et al. |
| 7,780,875 B2 | 8/2010 | Asgari |
| 7,850,798 B2 | 12/2010 | Kaner et al. |
| 8,079,480 B2 | 12/2011 | Haring et al. |
| 8,101,709 B1 | 1/2012 | Kaner et al. |
| 8,470,203 B2 | 6/2013 | Kaner et al. |
| 8,664,357 B2 | 3/2014 | Livingston et al. |
| 9,017,773 B2 | 4/2015 | D'Arcy et al. |
| 9,278,319 B2 | 3/2016 | Hoek et al. |
| 10,265,662 B2 | 4/2019 | Hoek et al. |
| 2003/0136727 A1 | 7/2003 | Yamada et al. |
| 2003/0138619 A1 | 7/2003 | David et al. |
| 2003/0162939 A1 | 8/2003 | Wang et al. |
| 2005/0131139 A1 | 6/2005 | Kaner et al. |
| 2005/0238804 A1 | 10/2005 | Garbar et al. |
| 2006/0284218 A1 | 12/2006 | Kaner et al. |
| 2007/0007515 A1 | 1/2007 | Suh et al. |
| 2007/0108420 A1 | 5/2007 | Kuramoto |
| 2008/0048996 A1 | 2/2008 | Hu et al. |
| 2008/0185294 A1 | 8/2008 | Cai et al. |
| 2008/0203012 A1 | 8/2008 | Yeager et al. |
| 2009/0305055 A1 | 12/2009 | Shimizu |
| 2010/0025892 A1 | 2/2010 | Jones et al. |
| 2010/0051538 A1 | 3/2010 | Freeman et al. |
| 2010/0091275 A1 | 4/2010 | Wang et al. |
| 2010/0092809 A1 | 4/2010 | Drzal et al. |
| 2010/0224555 A1 | 9/2010 | Hoek et al. |
| 2010/0300488 A1 | 12/2010 | Watanabe et al. |
| 2010/0307974 A1 | 12/2010 | Pettinger et al. |
| 2011/0073540 A1 | 3/2011 | McGinnis et al. |
| 2011/0212027 A1 | 9/2011 | Hoare et al. |
| 2011/0240556 A1 | 10/2011 | Hoek et al. |
| 2011/0278175 A1 | 11/2011 | Whitcombe et al. |
| 2011/0287551 A1 | 11/2011 | Weiller et al. |
| 2012/0012520 A1 | 1/2012 | Lee et al. |
| 2012/0043274 A1 | 2/2012 | Chi et al. |
| 2012/0111791 A1 | 5/2012 | Freeman et al. |
| 2012/0248031 A1 | 10/2012 | Kerres et al. |
| 2012/0255897 A1 | 10/2012 | Lu et al. |
| 2013/0020243 A1 | 1/2013 | Han et al. |

FOREIGN PATENT DOCUMENTS

| | | |
|---|---|---|
| CN | 101786768 A | 7/2010 |
| CN | 102258950 A | 11/2011 |
| DE | 19916802 A1 | 10/2001 |
| EP | 1466934 A1 | 10/2004 |
| EP | 1792948 A1 | 6/2007 |
| JP | H02220373 A | 9/1990 |
| JP | H04104869 A | 4/1992 |
| JP | H04341333 A | 11/1992 |
| JP | H06169079 A | 6/1994 |
| JP | H07-507000 A | 8/1995 |
| JP | 08-201978 | 9/1996 |
| JP | 2005233637 A | 9/2005 |
| JP | 2006-192398 A | 7/2006 |
| JP | 2008-201635 A | 9/2008 |
| JP | 2009-146576 A | 7/2009 |
| JP | 2009-295378 A | 12/2009 |
| KR | 1020000000662 | 1/2000 |
| RU | 2141377 C1 | 11/1999 |
| RU | 2176928 C2 | 12/2001 |
| RU | 2487145 C1 | 7/2013 |
| WO | WO-1992/03217 A1 | 3/1992 |
| WO | WO-97/44121 A1 | 11/1997 |
| WO | WO-2012/102678 A1 | 8/2012 |
| WO | WO-2012/135679 A2 | 10/2012 |
| WO | WO-2012/149141 A1 | 11/2012 |
| WO | WO-2013/130143 A2 | 9/2013 |
| WO | WO-2013/155453 A1 | 10/2013 |
| WO | WO-2014/059339 A1 | 4/2014 |
| WO | WO-2014/186552 A1 | 11/2014 |
| WO | WO-2015/012869 A1 | 1/2015 |
| WO | WO-2015/157227 A1 | 10/2015 |

OTHER PUBLICATIONS

Sedenkova, Ivana et al—Chemical degradation of polyaniline by reaction with Fenton's reagent—a spectroelectrochemical study—Chemical Papers 67 (8) 961-971 (2013)—(Year: 2013).*
U.S. Appl. No. 13/522,302, Issued.
U.S. Appl. No. 14/695,185, Abandoned.
U.S. Appl. No. 13/139,263, Issued.
U.S. Appl. No. 14/434,266, Allowed.
U.S. Appl. No. 14/891,010, Pending.
U.S. Appl. No. 15/005,189, Pending.
Extended European Search Report issued by the European Patent Office in corresponding Application No. EP 15777181.7, dated Oct. 25, 2017.
Jaymand, "Recent progress in chemical modification of polyaniline," Prog Polym Sci, 38(9):1287-1306 (2013).
Sairam et al., "Nanoporous asymmetric polyaniline films for filtration of organic solvents," J Membrane Sci, 330(1-2):166-174 (2009).
Guillen et al., "Pore-structure, hydrophilicity, and particle filtration characteristics of polyaniline-polysulfone ultrafiltration membranes," Journal of Materials Chemistry, 20:4621-4628 (2010).
Huang et al., "Novel chlorine resistant low-fouling ultrafiltration membrane based on a hydrophilic polyaniline derivative," Journals of Chemistry A (2015).
International Search Report dated Jun. 30, 2015 from PCT/US2015/024635.
Langer, Jerzy J., "N-Substituted Polyanilines I. Poly(N-Methylaniline) and Related Copolymers," Synthetic Metals, 35:295-300 (1990).
Liao et al., "Highly dispersible polypyrrole nanospheres for advanced nanocomposite ultrafiltration membranes," Materials Horizons (2013).
Lindfors et al., "Potentiometric and UV—vis characterization of N-substituted polyanilines," Journal of Electroanalytical Chemistry, 535:65-74 (2002).
Manohar et al., "N-Substituted Derivatives of Polyaniline," Synthetic Metals, 29:E349-E356 (1989).
McVerry et al., "Fabrication of Low-Fouling Ultrafiltration Membranes Using a Hydrophilic, Self-Doping Polyaniline Additive," Chemistry of Materials, 25:3597-3602 (2013).
Shadi et al., "Synthesis and Characterization of N- and O-Alkylated Poly[aniline-co-N-(2-hydroxyethyl) aniline]," Journal of Applied Polymer Science, 124:2118-2126 (2012).
Tan et al., "Characterization and transport properties of Nafion/polyaniline composite membranes," The Journal of Physical Chemistry. B, 109(49):23480-23490 (2005).
Cheng et al., "Film climbing of particle-laden interfaces," Colloids and Surfaces A: Physicochemical and Engineering Aspects, 315:275-284 (2008).
Dictionary.com, "Light Mineral Oil," p. 1-3 (2015).
Extended European Search Report dated Mar. 21, 2013, for European Patent Application No. 09832594.7.
Ferreira, et al., "Transport of metallic ions through polyaniline-containing composite membranes," J Chem Eng Data, 55: 4801-4807 (2010).
International Search Report dated Dec. 2, 2013, from PCT/US2013/052348.
International Search Report dated Feb. 20, 2014, from PCT/US13/64641.
International Search Report dated Sep. 25, 2014, from PCT/US2014/038155.
ISR dated Aug. 19, 2013 from WO13/155453.
ISR dated Jul. 13, 2010 from PCT/US2009/067628.
Japanese Office Action dated Dec. 2, 2014, from JP 2012-548961.
Massey, "Effects of UV Light and Weather on Plastics and Elastomers—Chapter 30.1: Polyethylene Terephthalate Weathering Properties," William Andrew Publishing, p. 167-172 (2007).

(56) References Cited

OTHER PUBLICATIONS

Matsunaga et al., "Surface changes brought about by corona discharge treatment of polyetheylene film and the effect on subsequent microbial colonisation," Polymer Degradation and Stability, 70:325-332 (2000).
Supplementary European Search Report for European Patent Application No. EP 14797886.0 dated Feb. 16, 2017.
Supplementary European Search Report issued by the European Patent Office, dated Apr. 13, 2016, in corresponding EP Application No. 13845639.
Written Opinion for International Application No. PCT/US2009/067628 dated Jul. 13, 2010.
Xia, et al., "Camphorsulfonic acid fully doped polyaniline emeraldine salt: conformations in different solvents studied by an ultraviolet/visible/near-infrared spectroscopic method," Chem Mater, 7: 443-445 (1995).

\* cited by examiner

POLYANILINE-BASED CHLORINE RESISTANT HYDROPHILIC FILTRATION MEMBRANES

RELATED APPLICATIONS

This application is the United States National Stage application of PCT/US2015/024635, filed Apr. 7, 2015, which claims the benefit of priority to U.S. Provisional Patent Application Ser. No. 61/976,688, filed Apr. 8, 2014, each of which is hereby incorporated by reference in its entirety.

BACKGROUND

An abundant supply of fresh water is a fundamental requirement for municipal, industrial and agricultural uses. However, rising populations and source contamination have exerted increasing stress on fresh water supplies. Along with pressure from stricter regulations for clean water, improvements in water treatment technology are critical (Howe, K. J. and Tchobanoglous. G. (2005) *Water Treatment: Principles and Design*, John Wiley & Sons, Inc., Hoboken, N.J. $2^{nd}$ edn.; Service, R. F. (2006) *Science* 313, 1088-1090).

Membrane-based filtration is the most important and widely used method for water purification due to its ability to completely and continuously filter impurities by size exclusion on a large scale (Howe, K. J. and Tchobanoglous. G. (2005) *Water Treatment: Principles and Design*, John Wiley & Sons. Inc., Hoboken, N.J., $2^{nd}$ edn.). Generally, membranes can be categorized into four types: microfiltration (MF), ultrafiltration (UF), nanofiltration (NF) and reverse osmosis (RO) based on their pore size and ability to reject different matter.

UF membranes have an average pore size of ~10 nm. In waste water treatment, UF membranes are used to reject pathogenic microorganisms such as viruses, bacteria, protozoa and other colloids (Cheryan, M. (1998) *Ultrafiltration and Microfiltration Handbook*, Technomic, Lancaster, Pa.). They can serve as a pretreatment step for desalination (Howe, K. J. and Tchobanoglous. G. (2005) *Water Treatment: Principles and Design*, John Wiley & Sons. Inc., Hoboken, N.J., $2^{nd}$ edn.; Rosberg. R. (1997) *Desalination* 110, 107-114). UF membranes are commonly used for separations in the chemical, pharmaceutical, food and beverage industries, and are an integral component m blood dialysis.

When a membrane is used for separation, the flux gradually decreases during operation as the membrane is fouled by inorganic particulates, organic matter and/or biological microorganisms. The susceptibility to fouling varies among different membrane materials due to hydrophobic interactions between the foulant and the surface of the polymeric membrane. Thus, membrane hydrophilicity has been linked to a membrane's propensity to foul, i.e. hydrophilic membranes generally foul less than hydrophobic membranes (Mcverry, B. T. et al. (2013) *Chem. Mater.* 25, 3597-3602; Liao, Y., et al. (2014) *Materials Horizons* 1, 58-64). A more hydrophobic membrane allows foulants to adhere strongly via van der Waals interactions to the membrane surface that leads to irreversible membrane fouling (Hilal, N., et al. (2005) *Separ. Sci. Technol.* 179, 323-333).

Chemical cleaning is typically used to remove adhered organic matter and biofilms from the membrane surfaces. Cleaning treatments restore membrane performance to regain flux loss during operation due to membrane fouling. Common chemicals used for cleaning membranes include caustics, oxidants/disinfectants, acids, chelating agents and surfactants (Liu, C., et al. (2006) *Membrane Chemical Cleaning: From Art to Science*, Pall Corporation, Port Washington, N.Y. 11050, USA). Chlorine bleach (sodium hypochlorite), is popular in industry for its low cost, commercial availability and ability to effectively reduce fouling when added to the feed solution. Strong oxidants such as hypochlorite not only kill microorganisms, but also oxidize functional groups in natural organic matter into more water-soluble moieties, allowing the new species to be easily washed away during operation. However, strong oxidants simultaneously attack chemical bonds found within the polymeric membrane material, negatively affecting the membrane properties (Eykamp, W. (1995) Microfiltration and ultrafiltration. In *Membrane Separation Technology: Principles and Applications*, Elsevier Science: Amsterdam; Gitis, V., et al. (2006) *J. Membr. Sci.* 276, 185-192: Wienk, I. M., et al. (1995) *J. Polym. Sci. Pol. Chem.* 33, 49-54; Nystrom, M. and Zhu, H. (1997) *J. Membr. Sci.* 131, 195-205; Wolf, H. and Zydney, A. L. (2004) *J. Membr. Sci.* 243, 389-399; Zhu, H. and Nystrom, M. (1998) *J. Membr. Sci.* 138, 309-321).

The impact of chlorine cleaning on polyethersulfone (PES) membranes shows that chlorine can actually cause more severe fouling and increase the electronegativity of the membrane after cleaning (Arkhangelsky, E., et al. (2007) *J. Membr. Sci.* 305, 176-184; Rouaix, S., et al. (2006) *J. Membr. Sci.* 277, 137-147; Gaudichet-Maurin, E. and Thominette, F. (2006) *J. Membr. Sci.* 282, (98-204). This leads to chain scission of the polymer and deteriorates the mechanical strength of the membrane (Arkhangelsky, E., et al. (2007) *J. Membr. Sci.* 305. 176-184; Thominette, F., et al. (2006) *Desalination* 200, 7-8; Kuzmenko, D., et al. (2005) *Desalination* 179, 323-333). Chemical attack by chlorine on polyamide RO membranes results in membrane failure with enhanced passage of salt and water (Manohar, S. K. and Macdiarmid, A. G. (1989) *Synthetic Met.* 29, 349-356; Langer, J. J. (1990) *Synthetic Met.* 35, 295-300; Shin, J. S., et al. (2005) *Synthetic Met.* 151, 246-255; Shadi, L., et al. (2012) *J. Appl. Polym. Sci.* 124, 2118-2126). In response, attempts have been made to modify membrane materials in order to make them less susceptible to chlorine degradation. For instance, using a polyamide that contains a tertiary amide instead of a secondary amide results in a chlorine-resistant RO membrane (Scheme I) (Manohar, S. K. and Macdiarmid, A. G. (1989) *Synthetic Metals* 29, 349-356; Langer, J. J. (1990) *Synthetic Metals* 35, 295-300).

Conducting polymers and their derivatives have been extensively examined recently for their potential use in water treatment membranes due to their hydrophilic properties, thermal and chemical stability, low-cost, facile synthesis and ability to be modified by doping (McVerry, B. T., et al. (2013) *Chem. Mater.* 25, 3597-3602; Liao, Y., et al. (2014) *Materials Horizons* 1, 58-64; Liao, Y., et al. (2012) *J. Colloid Interf. Sci.* 386, 148-157; Bocchi, V., et al. (1991) *J. Mater. Sci.* 26, 3354-3355; Price, W. E., et al. (1999) *Synthetic Materials* 102, 1338-1341; Alargova, R. G., et al. (1998) *Colloid Surface A* 134, 331-342; Li, X., et al. (2008) *J. Membr. Sci.* 320, 143-150; Fan, Z., et al. (2008) *J. Membr. Sci.* 310, 402-408; Fan, Z., et al. (2008) *J. Membr. Sci.* 320, 363-371; Zhao, W., et al. (2011) *J. Membr. Sci.* 385-386, 251-262; Guillen, G. R., et al. *J. Mater Chem.* (2010) 20, 4621-4628). As one of the most widely studied conducting polymers, polyaniline (Pani) in its emeraldine oxidation state has been blended with the commercial UF membrane material polysulfone (PSf) to form composite UF membranes with enhanced hydrophilicity and permeability (Fan, Z. et al. (2008) *J. Membr. Sci.* 310, 402-408; Fan, Z., et al. (2008) *J. Membr. Sci.* 320, 363-371; Zhao, S., et al. (2011) *J. Membr. Sci.* 385-386, 251-262; Guillen, G. R., et al. *J. Mater. Chem.* (2010) 20, 4621-4628). Pure Pani can also form UF membranes that exhibit permeabilities 10 times higher than commercial PSf membranes, but no bovine serum albumin (BSA) rejection (Guillen, G. R., et al. *J.*

*Mater. Chem.* (2010) 20, 4621-4628). By adding a secondary amine such as 4-methylpiperidine (4-MP) into the Pani casting solution, the rejection of Pam UF membrane increases, while the hydrophilicity decreases. Sulfonated Pani, a derivative of Pani, can be blended with PSf to form UF membranes which have shown excellent hydrophilicity and very high flux restoration after water washing (Mcverry, B. T., et al. (2013) *Chem. Mater.* 25, 3597-3602).

Several types of n-substituted Pani have been reported in the literature (Chevalier, J. W., et al. (1992) *Macromolecules* 25, 3325-3331; Yang, D. and Mattes, B. R. (2002) *J. Polym. Sci Pol. Phys.* 40, 2702-2713; Yang, D. and Mattes, B. R. (1999) *Synthetic Met.* 101, 746-749; Yang, D., et al. (2002) *Macromolecules* 35, 5304-5313; Manohar, S. K. and Macdiarmid, A. G. (1989) *Synthetic Met.* 29, 349-356). Among these, n-alkyl Pani is the most common form. However, alkyl groups are hydrophobic, so introducing them into Pani will result in some loss of hydrophilicity.

Filtration membranes are traditionally produced using polyvinylidene fluoride (PVDF). In order for these membranes to function properly, PVDF must be blended or co-polymerized with a hydrophilic moiety post membrane formation. While PVDF itself is extremely resilient to acid base, and chlorine, the hydrophilic group is not. Upon exposure to base or chlorine, as during membrane cleaning, the hydrophilic moiety is hydrolyzed and degraded. Over time, this causes the membrane to become more hydrophobic (fouling prone). In addition, the membrane loses miss and compacts thereby becoming less permeable. Despite the known disadvantages caused by blending the polymer with a hydrophilic group, materials for the preparation of filtration membranes that wholly circumvent these issues have yet to be reported. Herein, filtration membranes comprising material that is intrinsically hydrophilic and resistant to oxidative damage are described.

SUMMARY

In accordance with the purposes) of the invention, as embodied and broadly described herein, the invention, in one aspect, relates to a filtration membrane comprising a polymer formed by polymerizing a compound having a structure represented by a formula:

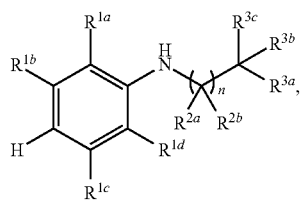

wherein n is selected from 1, 2, and 3; wherein each of $R^{1a}$, $R^{1b}$, $R^{1c}$, and $R^{1d}$ is independently selected from hydrogen, halogen, —CN, —$SR^{20}$, —$OR^{21}$, —$NR^{22a}R^{22b}$, —$NR^{22a}R^{22b}H^+$, —$SO_2R^{23}$, —(C=O)$R^{24}$, and C1-C3 alkyl substituted with 0, 1, 2, or 3 groups selected from halogen, —CN, —$SR^{20}$, —$OR^{21}$, —$NR^{22a}R^{22b}$, —$SO_2R^{23}$, and —(C=O)$R^{24}$; wherein each of $R^{2a}$ and $R^{2b}$ is independently selected from hydrogen, halogen, —CN, —$SR^{30}$, —$OR^{31}$, —$NR^{32a}R^{32b}$, —$NR^{32a}R^{32b}H^+$, —$SO_2R^{33}$, —$SO_2R^{33}$, —(C=O)$R^{34}$, and C1-C3 alkyl substituted with 0, 1, 2, or 3 groups selected from halogen, —CN, —$SR^{30}$, —$OR^{31}$, —$NR^{32a}R^{32b}$, —$SO_2R^{33}$, and —(C=O)$R^{34}$; wherein each of $R^{3a}$, $R^{3b}$, and $R^{3c}$ is independently selected from hydrogen, halogen, —CN, —$SR^{40}$, —$OR^{41}$, —$NR^{42a}R^{42b}$, —$NR^{42a}R^{42b}H^+$, —$SO_2R^{43}$, and —(C=O)$R^{44}$; wherein at least one of $R^{2a}$, $R^{2b}$, $R^{3a}$, $R^{3b}$, and $R^{3c}$ is not hydrogen; wherein each of $R^{20}$, $R^{21}$, $R^{22a}$, $R^{22b}$, $R^{30}$, $R^{31}$, $R^{32a}$, $R^{32b}$, $R^{40}$, $R^{41}$, $R^{42a}$, and $R^{42b}$, when present, is independently selected from hydrogen. C1-C3 alkyl. C1-C3 monohaloalkyl, and C1-C3 polyhaloalkyl; wherein each of $R^{23}$ and $R^{24}$, when present, is independently selected from —$O^-$, —$OR^{25}$, C1-3 alkyl. C1-C3 monohaloalkyl, C1-C3 polyhaloalkyl, and —$NR^{26a}R^{26b}$; wherein each of $R^{25}$, $R^{26a}$, and $R^{26b}$, when present, is independently selected from hydrogen. C1-3 alkyl, C1-C3 monohaloalkyl, and C1-C3 polyhaloalkyl; wherein each of $R^{33}$ and $R^{34}$, when present, is independently selected from —$O^-$, —$OR^{35}$, C1-C3 alkyl, C1-C3 monohaloalkyl, C1-C3 polyhaloalkyl, and —$NR^{36a}R^{36b}$; wherein each of $R^{35}$, $R^{36a}$, and $R^{36b}$, when present, is independently selected from hydrogen, C1-C3 alkyl, C1-C3 monohaloalkyl, and C1-C3 polyhaloalkyl; wherein each of $R^{42}$ and $R^{44}$, when present, is independently selected from —$O^-$, —$OR^{45}$, C1-C3 alkyl, C1-C3 monohaloalkyl, C1-C3 polyhaloalkyl, and —$NR^{46a}R^{46b}$; and wherein each of $R^{45}$, $R^{46b}$, and $R^{46b}$, when present, is selected from hydrogen, C1-C3 alkyl, C1-C3 monohaloalkyl, and C1-C3 polyhaloalkyl.

Also disclosed are filtration membranes comprising a polymer comprising a structure represented by a formula:

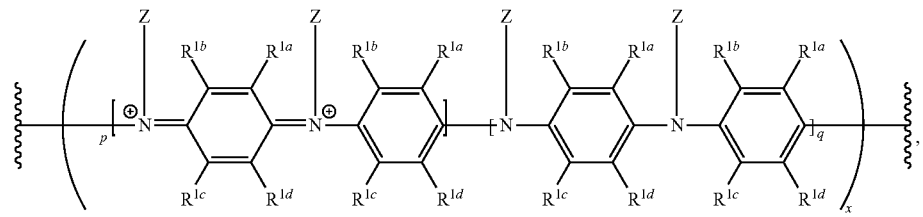

wherein each Z is independently selected from hydrogen and

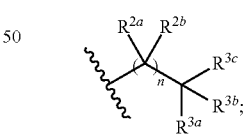

wherein n is an integer selected from 1, 2, and 3; wherein p is independently 0, 0.5, or 1; wherein q is independently 0, 0.5, or 1; wherein, for each x, p+q=1; wherein each of $R^{1a}$, $R^{1b}$, $R^{1c}$, and $R^{1d}$ is independently selected from hydrogen, halogen, —CN, —$SR^{20}$, —$OR^{21}$, —$NR^{22a}R^{22b}$, —$NR^{22a}R^{22b}H^+$, —$SO_2R^{23}$, —(C=O)$R^{24}$, and C1-C3 alkyl substituted with 0, 1, 2, or 3 groups selected from halogen, —CN, —$SR^{26}$, —$OR^{21}$, —$NR^{22a}R^{22b}$, —$SO_2R^{23}$, and —(C=O)$R^{24}$; wherein, each of $R^{2a}$ and $R^{2b}$ is independently selected from hydrogen, halogen, —CN, —$SR^{30}$, —$OR^{31}$, —$NR^{32a}R^{32b}$, —$NR^{32a}R^{32b}H^+$, —$SO_2R^{33}$, —(C=O)$R^{34}$, and C1-C3 alkyl substituted with 0, 1, 2, or 3 groups selected from halogen, —CN, —SR$^{30}$, —OR$^{31}$, —NR$^{32a}$R$^{32b}$, —SO$_2$R$^{33}$, and —(C=O)R$^{34}$; wherein each of R$^{3a}$, R$^{3b}$, and R$^{3c}$ is independently selected from hydrogen, halogen, —CN, —SR$^{40}$, —OR$^{41}$, —NR$^{42a}$R$^{42b}$, —NR$^{42a}$R$^{42b}$H$^+$, —SO$_2$R$^{43}$, and —(C=O)R$^{44}$; wherein each of R$^{20}$, R$^{21}$, R$^{22a}$, R$^{22b}$, R$^{30}$, R$^{31}$, R$^{32a}$, R$^{32b}$, R$^{40}$, R$^{41}$, R$^{42a}$, and R$^{42b}$, when present, is independently selected from hydrogen, C1-C3 alkyl C1-C3 monohaloalkyl, and C1-C3 polyhaloalkyl; wherein each of R$^{23}$ and R$^{24}$, when present, is independently selected from —O$^-$, —OR$^{25}$, C1-C3 alkyl C1-C3 monohaloalkyl, C1-C3 polyhaloalkyl, and —NR$^{26a}$R$^{26b}$; wherein each of R$^{25}$, R$^{26a}$, and R$^{26b}$, when present, is independently selected from hydrogen, C1-C3 alkyl, C1-C3 monohaloalkyl, and C1-C3 polyhaloalkyl: wherein each of R$^{33}$ and R$^{34}$, when present, is independently selected from —O$^-$, —OR$^{35}$, C1-C3 alkyl, C1-C3 monohaloalkyl, C1-C3 polyhaloalkyl, and —NR$^{36a}$R$^{36b}$; wherein each of R$^{35}$, R$^{36a}$, and R$^{36b}$, when present, is independently selected from hydrogen, C1-C3 alkyl, C1-C3 monohaloalkyl, and C1-C3 polyhaloalkyl; wherein each of R$^{43}$ and R$^{44}$, when present, is independently selected from —O$^-$, —OR$^{45}$, C1-C3 alkyl, C1-C3 monohaloalkyl, C1-3 polyhaloalkyl, and —NR$^{46a}$R$^{46b}$; wherein each of R$^{45}$, R$^{46a}$, and R$^{46b}$, when present, is selected from hydrogen, C1-3 alkyl, C1-3 monohaloalkyl, and C1-3 polyhaloalkyl: and wherein at least one Z is a structure represented by a formula:

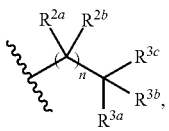

and wherein at least one of R$^{2a}$, R$^{2b}$, R$^{3a}$, and R$^{3c}$ is not hydrogen.

Also disclosed are polymers formed by polymerizing a compound having a structure represented by a formula:

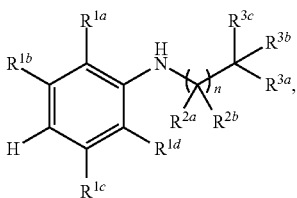

wherein n is selected from 1, 2, and 3; wherein each of R$^{1a}$, R$^{1b}$, R$^{1c}$, and R$^{1d}$ is independently selected from hydrogen, halogen, —CN, —SR$^{20}$, —OR$^{21}$, —NR$^{22a}$R$^{22b}$, —NR$^{22a}$R$^{22b}$H$^+$, —SO$_2$R$^{23}$, —(C=O)R$^{24}$, and C1-C3 alkyl substituted with 0, 1, 2, or 3 groups selected from halogen, —CN, —SR$^{20}$, —OR$^{21}$, —NR$^{22a}$R$^{22b}$, —SO$_2$R$^{23}$, and —(C=O)R$^{24}$; wherein each of R$^{2a}$ and R$^{2b}$ is independently selected from hydrogen, halogen, —CN, —SR$^{30}$, —OR$^{31}$, —NR$^{32a}$R$^{32b}$, —NR$^{32a}$R$^{32b}$H$^+$, —SO$_2$R$^{33}$, —(C=O)R$^{34}$, and C1-C3 alkyl substituted with 0, 1, 2, or 3 groups selected from, halogen, —CN, —SR$^{30}$, —OR$^{31}$, —NR$^{32a}$R$^{32b}$, —SO$_2$R$^{33}$, and —(C=O)R$^{34}$; wherein each of R$^{3a}$, R$^{3b}$, and R$^{3c}$ is independently selected from hydrogen, halogen, —CN, —SR$^{40}$, —OR$^{41}$, —NR$^{42a}$R$^{42b}$, —NR$^{42a}$R$^{42b}$H$^+$, —SO$_2$R$^{43}$, and —(C=O)R$^{44}$; wherein at least one of R$^{2a}$, R$^{2b}$, R$^{3a}$, R$^{3b}$, and R$^{3c}$ is not hydrogen; wherein each of R$^{20}$, R$^{21}$, R$^{22a}$, R$^{22b}$, R$^{30}$, R$^{31}$, R$^{32a}$, R$^{32b}$, R$^{40}$, R$^{41}$, R$^{42a}$, and R$^{42b}$, when present, is independently selected, from hydrogen, C1-C3 alkyl, C1-C3 monohaloalkyl, and C1-C3 polyhaloalkyl; wherein each of R$^{23}$ and R$^{24}$, when present, is independently selected from —O$^-$, —OR$^{25}$, C1-C3 alkyl, C1-C3 monohaloalkyl, C1-C3 polyhaloalkyl, and —NR$^{26a}$R$^{26b}$; wherein each of R$^{25}$, R$^{26a}$, and R$^{26b}$, when present, is independently selected from hydrogen, C1-C3 alkyl, C1-C3 monohaloalkyl, and C1-C3 polyhaloalkyl; wherein each of R$^{33}$ and R$^{34}$, when present, is independently selected from —O$^-$, —OR$^{35}$, C1-C3 alkyl, C1-C3 monohaloalkyl, C1-C3 polyhaloalkyl, and —NR$^{36a}$R$^{36b}$; wherein each of R$^{35}$, R$^{36a}$, and R$^{36b}$, when present, is independently selected from hydrogen. C1-C3 alkyl, C1-C3 monohaloalkyl, and C1-C3 polyhaloalkyl; wherein each of R$^{43}$ and R$^{44}$, when present, is independently selected from —O$^-$, —OR$^{45}$, C1-C3 alkyl, C1-C3 monohaloalkyl, C1-C3 polyhaloalkyl, and —NR$^{46a}$R$^{46b}$; and wherein each of R$^{45}$, R$^{46a}$, and R$^{46b}$, when present, is selected from hydrogen, C1-C3 alkyl, C1-C3 monohaloalkyl, and C1-C3 polyhaloalkyl.

Also disclosed are polymers comprising a structure represented by a formula;

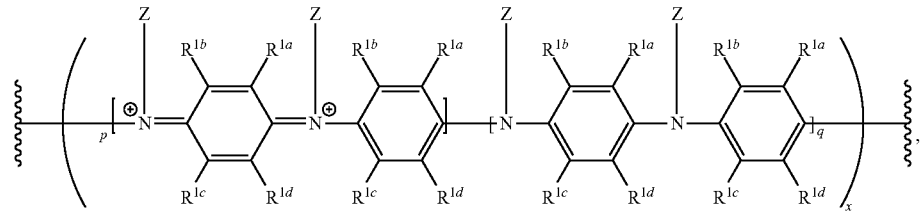

wherein each Z is independently selected from hydrogen and

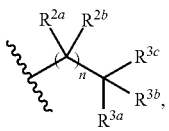

wherein n is an integer selected from 1, 2, and 3; wherein p is independently 0, 0.5, or 1; wherein q is independently 0, 0.5, or 1; wherein, for each x, p+q=1; wherein each of R$^{1a}$, R$^{1b}$, R$^{1c}$, and R$^{1d}$ is independently selected from hydrogen, halogen, —CN, —SR$^{20}$, —OR$^{21}$, —NR$^{22a}$R$^{22b}$, —NR$^{22a}$R$^{22b}$H$^+$, —SO$_2$R$^{23}$, —(C=O)R$^{24}$, and C1-C3 alkyl substituted with 0, 1, 2, or 3 groups selected from halogen, —CN, —SR$^{20}$, —OR$^{21}$, —NR$^{22a}$R$^{22b}$, —SO$_2$R$^{23}$, and —(C=O) R$^{24}$; wherein each of R$^{2a}$ and R$^{2b}$ is independently selected from hydrogen, halogen, —CN, —SR$^{30}$, —OR$^{31}$, —NR$^{32a}$R$^{32b}$, —NR$^{32a}$R$^{32b}$H$^+$, —SO$_2$R$^{33}$, —(C=O)R$^{34}$, and C1-C3 alkyl substituted with 0, 1, 2, or 3 groups selected from halogen, —CN, —SR$^{30}$, —OR$^{31}$, —NR$^{32a}$R$^{32b}$, —SO$_2$R$^{33}$, and —(C=O)R$^{34}$; wherein each of R$^{3a}$, R$^{3b}$, and R$^{3c}$ is independently selected from hydrogen, halogen, —CN, —SR$^{40}$, —OR$^{41}$, —NR$^{42a}$, R$^{42b}$, —NR$^{42a}$R$^{42b}$H$^+$, —SO$_2$R$^{43}$, and —(C=O) R$^{44}$; wherein each of R$^{20}$, R$^{21}$, R$^{22a}$, R$^{22b}$, R$^{30}$, R$^{31}$, R$^{32a}$, R$^{32b}$, R$^{40}$, R$^{41}$, R$^{42a}$, and R$^{42b}$, when present, is independently selected from hydrogen, C1-C3 alkyl, C1-C3 monohaloalkyl, and C1-C3 polyhaloalkyl; wherein each of R$^{23}$ and R$^{24}$, when present, is independently selected from —O$^-$, —OR$^{25}$, C1-C3 alkyl, C1-3 monohaloalkyl, C1-C3 polyhaloalkyl, and —NR$^{26a}$R$^{26b}$; wherein each of R$^{25}$, R$^{26a}$, and R$^{26b}$, when present, is independently selected from hydrogen, C1-C3 alkyl, C1-C3 monohaloalkyl, and C1-C3 polyhaloalkyl; wherein each of R$^{33}$ and R$^{34}$, when present, is independently selected from —O$^-$, —OR$^{35}$, C1-C3 alkyl, C1-C3 monohaloalkyl, C1-C3 polyhaloalkyl, and —NR$^{36a}$R$^{36b}$; wherein each of R$^{35}$, R$^{36a}$, and R$^{36b}$, when present, is independently selected from hydrogen, C1-C3 alkyl, C1-C3 monohaloalkyl, and C1-C3 polyhaloalkyl; wherein each of R$^{43}$ and R$^{44}$, when present, is independently selected from —O$^-$, —OR$^{45}$, C1-C3 alkyl, C1-C3 monohaloalkyl, C1-C3 polyhaloalkyl, and —NR$^{46a}$R$^{46b}$; wherein each of R$^{45}$, R$^{46a}$, and R$^{46b}$, when present, is selected from: hydrogen, C1-C3 alkyl, C1-C3 monohaloalkyl, and C1-C3 polyhaloalkyl; and wherein at least one Z is a structure represented by a formula:

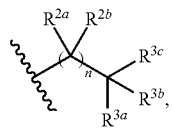

and wherein at least one of R$^{2a}$, R$^{2b}$, R$^{3a}$, R$^{3b}$, and R$^{3c}$ is not hydrogen.

Also disclosed are methods of making filtration membranes.

Also disclosed are methods of filtering water through membranes.

While aspects of the present invention can be described and claimed in a particular statutory class, such as the system statutory class, this is for convenience only and one of skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is in no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

BRIEF DESCRIPTION OF THE FIGURES

The accompanying figures, which are incorporated in and constitute a part of this specification, illustrate several aspects and together with the description serve to explain the principles of the invention.

Figure 1:
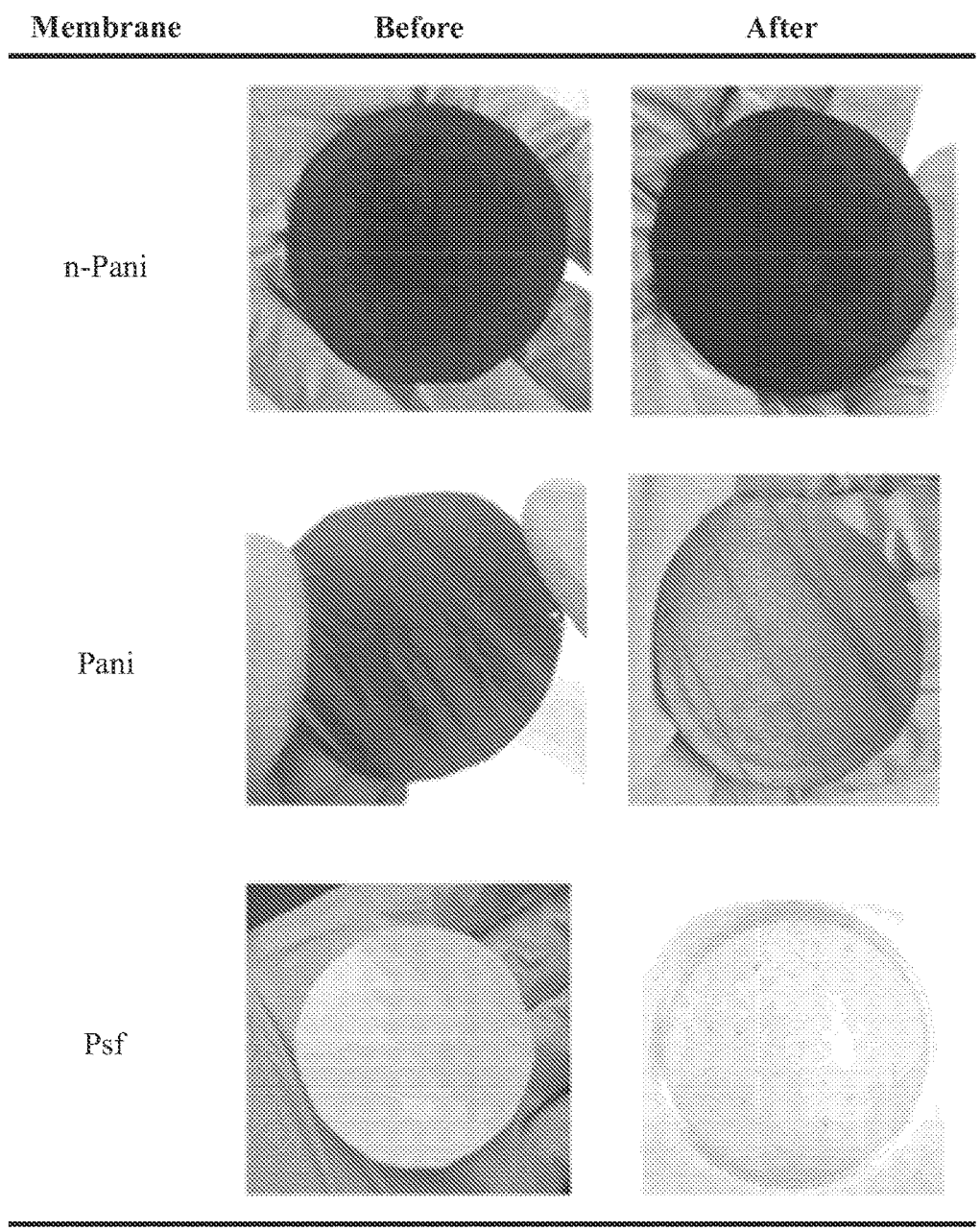
FIG. 1 shows representative data, pertaining to the effect of being soaked in bleach containing 250 ppm free chlorine for 2 days on the physical appearance of n-Pani membranes compared to Pani and PSf membranes.

Additional advantages of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION

The present invention can be understood more readily by reference to the following detailed description of the invention and the Examples included therein.

Before the present compounds, compositions, articles, systems, devices, and/or methods are disclosed and described, it is to be understood that they are not limited to specific synthetic methods unless otherwise specified, or to particular reagents unless otherwise specified, as such may, of course, vary. It is also to be understood that the terminology used herein is for the purpose of describing particular aspects only and is not intended to be limiting. Although any methods and materials similar or equivalent to those described herein can be used in the practice or testing of the present invention, example methods and materials are now described.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided herein can be different from the actual publication dates, which can require independent confirmation.

A. Definition

As used herein, nomenclature for compounds, including organic compounds, can be given using common names, IUPAC, IUBMB, or CAS recommendations for nomenclature. When one or more stereochemical features are present, Cahn-Ingold-Prelog rules for stereochemistry can be employed to designate stereochemical priority, E/Z specification, and the like. One of skill in the art can readily ascertain the structure of a compound if given a name, either by systemic reduction of the compound structure using naming conventions, or by commercially available software, such as CHEMDRA W™ (Cambridgesoft Corporation, U.S.A.).

As used in the specification and the appended claims, the singular forms "a", "an" and "the" include plural referents unless the context clearly dictates otherwise. Thus, for example, reference to "a functional group", "an alkyl", or "a residue" includes mixtures of two or more such functional groups, alkyls, or residues, and the like.

Ranges can be expressed herein as from "about" one particular value, and/or to "about" another particular value. When such a range is expressed, a further aspect includes from the one particular value and/or to the other particular value. Similarly, when values are expressed as approximations, by use of the antecedent "about", it will be understood that the particular value forms a further aspect. It will be further understood that the endpoints of each of the ranges are significant both in relation to the other endpoint, and independently of the other endpoint. If is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 1.5 are disclosed, then 11, 12, 13, and 14 are also disclosed.

References in the specification and concluding claims to parts by weight of a particular element or component in a composition denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight, percent (wt. %) of a component, unless specifically stated to the contrary, is based on the total weight of the formulation or composition in which the component is included.

As used herein, the terms "optional" or "optionally" means that the subsequently described event or circumstance can or cannot occur, and that the description includes instances where said event or circumstance occurs and instances where it does not.

A residue of a chemical species, as used in the specification and concluding claims, refers to the moiety that is the resulting product of the chemical species in a particular reaction scheme or subsequent formulation or chemical product, regardless of whether the moiety is actually obtained from the chemical species. Thus, an ethylene glycol residue in a polyester refers to one or more —$OCH_2CH_2O$— units in fee polyester, regardless of whether ethylene glycol was used to prepare the polyester. Similarly, a sebacic acid residue in a polyester refers to one or more —$CO(CH_2)_8CO$— moieties in the polyester, regardless of whether the residue is obtained by reacting sebacic acid or an ester thereof to obtain the polyester.

As used herein, the term "polymer" refers to a relatively high molecular weight organic compound, natural or synthetic, whose structure can be represented by a repeated small unit, the monomer (e.g., polyethylene, rubber, cellulose). Synthetic polymers are typically formed by addition or condensation polymerization of monomers.

As used herein, the term "copolymer" refers to a polymer formed from two or more different repeating units (monomer residues). By way of example and without limitation, a copolymer can be an alternating copolymer, a random copolymer, a block copolymer, or a graft copolymer. It is also contemplated that, in certain aspects, various block segments of a block copolymer can themselves comprise copolymers.

As used herein, the term "oligomer" refers to a relatively low molecular weight polymer in which the number of repeating units is between two and ten, for example, from two to eight from two to six, or form two to four. In one aspect, a collection of oligomers can have an average number of repeating units of from about two to about ten, for example, from about two to about eight, from about two to about six, or form about two to about four.

As used herein, the term "molecular weight" (MW) refers to the mass of one molecule of that substance, relative to the unified atomic mass unit u (equal to ½ the mass of one atom of carbon-12).

As used herein, the term "number average molecular weight" ($M_n$) refers to the common, mean, average of the molecular weights of the individual polymers. $M_n$ can be determined by measuring the molecular weight of n polymer molecules, summing the weights, and dividing by n. $M_n$ is calculated by:

$$\overline{M}_n = \frac{\sum_i N_i M_i}{\sum_i N_i},$$

wherein $N_i$ is the number of molecules of molecular weight $M_i$. The number average molecular weight of a polymer can be determined by gel permeation chromatography, viscometry (Mark-Houwink equation), light scattering, analytical ultracentrifugation, vapor pressure osmometry, end-group titration, and colligative properties.

As used herein, the term "weight average molecular weight" ($M_w$) refers to an alternative measure of the molecular weight of a polymer. $M_w$ is calculated by:

$$\overline{M}_w = \frac{\sum_i N_i M_i^2}{\sum_i N_i M_i},$$

wherein $N_i$ is the number of molecules of molecular weight $M_i$. Intuitively, if the weight average molecular weight is w, and a random monomer is selected, then the polymer it belongs to will have a weight of w, on average. The weight average molecular weight can be determined by light scattering, small angle neutron scattering (SANS), X-ray scattering, and sedimentation velocity.

As used herein, the terms "polydispersity" and "polydispersity index" refer to the ratio of the weight average to the number average $(M_w/M_n)$.

As used herein, the terms "flash welding" and "flash weld" refer to applying a pulse of light to an absorbing material. Flash welding can provide enhanced photothermal phenomena when performed on polymeric nanofibers. In certain aspects, the material rapidly converts the light to heat and then undergoes a transformation, such as melting. It is understood that, in certain aspects, chemical reactions can take place in the material as a consequence of flash welding. Techniques for performing flash welding are described in U.S. Pat. No. 7,850,798 ("Flash welding of conducting polymers nanofibers"), issued Dec. 14, 2010, to J. Huang and R. B. Kaner.

Certain materials, compounds, compositions, and components disclosed herein can be obtained commercially or readily synthesized using techniques generally known to those of skill in the art. For example, the starting materials and reagents used in preparing the disclosed compounds and compositions are either available from commercial suppliers such as Aldrich Chemical Co., (Milwaukee, Wis.), Acros Organics (Morris Plains, N.J.). Fisher Scientific (Pittsburgh, Pa.), or Sigma (St. Louis, Mo.) or are prepared by methods known to those skilled in the art following procedures set forth in references such as Fieser and Fieser's Reagents for Organic Synthesis, Volumes 1-17 (John Wiley and Sons, 1991); Rodd's Chemistry of Carbon Compounds, Volumes 1-5 and Supplemental volumes (Elsevier Science Publishers, 1989); Organic Reactions, Volumes 1-40 (John Wiley and Sons, 1991); March's Advanced Organic Chemistry, (John Wiley and Sons, 4th Edition); and Larock's Comprehensive Organic Transformations (VCM Publishers Inc., 1989).

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

Disclosed are the components to be used to prepare the compositions of the invention as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule. A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the invention. Thus, if there are a variety of additional steps that can be performed it is understood that each of these additional steps can be performed with any specific embodiment or combination of embodiments of the methods of the invention.

It is understood that the compositions disclosed herein have certain functions. Disclosed herein are certain structural requirements for performing the disclosed functions, and it is understood that there are a variety of structures that can perform the same function that are related to the disclosed structures, and that these structures will typically achieve the same result.

B. Filtration Membranes

In one aspect, the membranes of the invention relates to a filtration membrane comprising a polymer formed by polymerizing a compound having a structure represented by a formula:

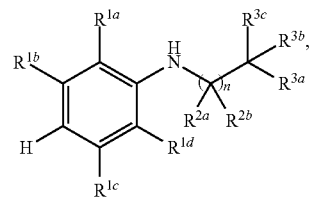

wherein n is selected from 1, 2, and 3; wherein each of $R^{1a}$, $R^{1b}$, $R^{1c}$, and $R^{1d}$ is independently selected from hydrogen, halogen, —CN, —SR$^{20}$, —OR$^{21}$, —NR$^{22a}$R$^{22b}$, —NR$^{22a}$R$^{22b}$H$^+$, —SO$_2$R$^{23}$, —(C=O)R$^{24}$, and C1-C3 alkyl substituted with 0, 1, 2, or 3 groups selected from halogen, —CN, —SR$^{20}$, —OR$^{21}$, —NR$^{22a}$R$^{22b}$, —SO$_2$R$^{23}$, and —(C=O)R$^{24}$; wherein each of $R^{2a}$ and $R^{2b}$ is independently selected from hydrogen, halogen, —CN, —SR$^{30}$, —OR$^{31}$, —NR$^{32a}$R$^{32b}$, —NR$^{32a}$R$^{32b}$H$^+$, —SO$_2$R$^{33}$, —(C=O) R$^{34}$, and C1-C3 alkyl substituted with 0, 1, 2, or 3 groups selected from halogen, —CN, —SR$^{30}$, —OR$^{31}$, —NR$^{32a}$R$^{32b}$, —SO$_2$R$^{33}$, and —(C=O)R$^{34}$; wherein each of $R^{3a}$, $R^{3b}$, and $R^{3c}$ is independently selected from hydrogen, halogen, —CN, —SR$^{40}$, —OR$^{41}$, —NR$^{42a}$R$^{42b}$, —NR$^{42a}$R$^{42b}$H$^+$, —SO$_2$$^{43}$, and —(C=O)R$^{44}$; wherein at least one of $R^{2a}$, $R^{2b}$, $R^{3a}$, $R^{3b}$, and $R^{3c}$ is not hydrogen; wherein each of $R^{20}$, $R^{21}$, $R^{22a}$, $R^{22b}$, $R^{30}$, $R^{31}$, $R^{32a}$, $R^{32b}$, $R^{40}$, $R^{41}$, $R^{42a}$, and $R^{42b}$, when present, is independently selected from hydrogen, C1-C3 alkyl, C1-C3 monohaloalkyl, and C1-C3 polyhaloalkyl; wherein each of $R^{23}$ and $R^{24}$, when present, is independently selected from —O$^-$, —OR$^{25}$, C1-C3 alkyl, C1-C3 monohaloalkyl, C1-C3 polyhaloalkyl, and —NR$^{26a}$R$^{26b}$; wherein each of $R^{25}$, $R^{26a}$, and $R^{26b}$, when present, is independently selected from hydrogen, C1-C3 alkyl, C1-C3 monohaloalkyl, and C1-C3 polyhaloalkyl; wherein each of $R^{33}$ and $R^{34}$, when present, is independently selected from —O⁻, —OR³⁵, C1-C3 alkyl, C1-C3 monohaloalkyl, C1-C3 polyhaloalkyl, and —NR³⁶ᵃR³⁶ᵇ; wherein each of $R^{35}$, $R^{36a}$, and $R^{36b}$, when present, is independently selected from hydrogen, C1-C3 alkyl, C1-C3 monohaloalkyl, and C1-C3 polyhaloalkyl; wherein each of $R^{43}$ and $R^{44}$, when present, is independently selected from —O⁻, —OR⁴⁵, C1-C3 alkyl, C1-C3 monohaloalkyl, C1-C3 polyhaloalkyl, and —N⁴⁶ᵃR⁴⁶ᵇ; and wherein each of $R^{45}$, $R^{46a}$, and $R^{46b}$, when present, is selected from hydrogen, C1-C3 alkyl, C1-C3 monohaloalkyl, and C1-C3 polyhaloalkyl.

In one aspect, the invention relates to filtration membranes comprising a polymer comprising a structure represented by a formula:

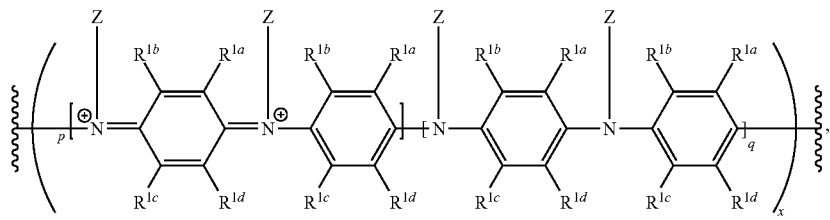

wherein each Z is independently selected from hydrogen and

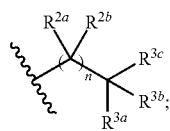

wherein n is an integer selected from 1, 2, and 3; wherein p is independently 0, 0.5, or 1; wherein q is independently 0, 0.5, or 1; wherein, for each x, p+q=1; wherein each of $R^{1a}$, $R^{1b}$, $R^{1c}$, and $R^{1d}$ is independently selected from hydrogen, halogen, —CN, —SR²⁰, —OR²¹, —NR²²ᵃR²²ᵇ, —NR²²ᵃR²²ᵇH⁺, —SO₂R²³, —(C=O)R²⁴, and C1-C3 alkyl substituted with 0, 1, 2, or 3 groups selected from halogen, —CN, —SR²⁰, —OR²¹, —NR²²ᵃR²²ᵇ, —SO₂R²³, and —(C=O) R²⁴; wherein each of $R^{2a}$ and $R^{2b}$ is independently selected from hydrogen, halogen, —CN, —SR³⁰, —OR³¹, —NR³²ᵃR³²ᵇ, —NR³²ᵃR³²ᵇH⁺, —SO₂R³³, —(C=O)R³⁴, and C1-C3 alkyl substituted with 0, 1, 2, or 3 groups selected from halogen, —CN, —SR⁺, —OR³¹, —NR³²ᵃR³²ᵇ, —SO₂R³³, and —(C=O)R³⁴; wherein each of $R^{3a}$, $R^{3b}$, and $R^{3c}$ is independently selected, from hydrogen, halogen, —CN, —SR⁴⁰, —OR⁴¹, —NR⁴²ᵃR⁴²ᵇ, —NR⁴²ᵃR⁴²ᵇH⁻, —SO₂R⁴³, and —(C=O)R⁴⁴; wherein each of $R^{20}$, $R^{21}$, $R^{22a}$, $R^{22b}$, $R^{30}$, $R^{31}$, $R^{32a}$, $R^{32b}$, $R^{40}$, $R^{41}$, $R^{42a}$, and $R^{42b}$, when present, is independently selected from hydrogen, C1-C3 alkyl. C1-C3 monohaloalkyl, and C1-C3 polyhaloalkyl; wherein each of and $R^{23}$ and $R^{24}$, when present, is independently selected from —O⁻, —OR²⁵, C1-C3 alkyl, C1-C3 monohaloalkyl, C1-C3 polyhaloalkyl, and —NR²⁶ᵃR²⁶ᵇ; wherein each of $R^{25}$, $R^{26a}$, and $R^{26b}$, when present, is independently selected from hydrogen, C1-C3 alkyl, C1-C3 monohaloalkyl, and C1-C3 polyhaloalkyl: wherein each of $R^{33}$ and $R^{34}$, when present, is independently selected from —O⁻, —OR³⁵, C1-C3 alkyl, C1-C3 monohaloalkyl, C1-C3 polyhaloalkyl, and —NR³⁶ᵃR³⁶ᵇ; wherein each of $R^{35}$, $R^{36a}$, and $R^{36b}$, when present, is independently selected from hydrogen, C1-C3 alkyl, C1-C3 monohaloalkyl, and C1-C3 polyhaloalkyl; wherein each of $R^{43}$ and $R^4$, when present, is independently selected from —O⁻, —OR⁴⁵, C1-C3 alkyl, C1-C3 monohaloalkyl C1-C3 polyhaloalkyl, and —NR⁴⁶ᵃR⁴⁶ᵇ; wherein each of $R^{45}$, $R^{46a}$, and $R^{46b}$, when present, is selected from hydrogen, C1-C3 alkyl, C1-C3 monohaloalkyl, and C1-C3 polyhaloalkyl: and wherein at least one Z is a structure represented by a formula:

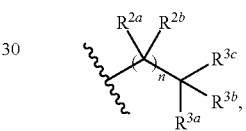

and wherein at least one of $R^{2a}R^{2b}$, $R^{3a}$, $R^{3b}$, and $R^{3c}$ is not hydrogen.

In a further aspect, the filtration membrane is selected from an ultrafiltration membrane, a nanofiltration membrane, a reverse osmosis membrane, a forward osmosis membrane, and a pressure retarded osmosis membrane without thin film coating. In a still further aspect, the filtration membrane is selected from an ultrafiltration membrane, a nanofiltration membrane, a reverse osmosis membrane and a forward osmosis membrane. In yet a further aspect, the filtration membrane is selected from an ultrafiltration membrane and a nanofiltration membrane. In an even further aspect, the filtration membrane is an ultrafiltration membrane. In a still further aspect, the filtration membrane is a nanofiltration membrane.

In a further aspect, the filtration membrane further comprises a thin film polymerized onto a surface of the membrane, thereby providing an osmosis membrane. In a still further aspect, the osmosis membrane is selected from a reverse osmosis membrane and a forward osmosis membrane. In yet a further aspect, the osmosis membrane is a reverse osmosis membrane. In an even further aspect, the osmosis membrane is a forward osmosis membrane.

1. Polymers

In one aspect, the invention relates to polymers useful as components of filtration membranes. In various aspects, the polymers can improve properties of the membrane. For example, the polymers may improve the chlorine-resistance of the membrane and/or the hydrophilicity of the membrane.

In a further aspect, the polymer is present in an amount from about 0.1 wt % to about 40 wt %. In a still further aspect, the polymer is present in an amount from about 0.1 wt % to about 35 wt %. In yet a further aspect, the polymer is present in an amount from about 0.1 wt % to about 30 wt %, in an even further aspect, the polymer is present in an amount from about 0.1 wt % to about 25 wt %. In a still further aspect, the polymer is present in an amount from about 0.1 wt % to about 20 wt %. In yet a further aspect, the polymer is present in an amount from about 0.1 wt % to about 15 wt %. In an even further aspect, the polymer is present in an amount from about 15 wt % to about 40 wt %. In a still further aspect, the polymer is present in an amount from about 15 wt % to about 40 wt %. In yet a further aspect, the polymer is present in an amount from about 20 wt % to about 40 wt %. In an even farther aspect, the polymer is present in an amount from about 25 wt % to about 40 wt %. In a still further aspect, the polymer is present in an amount from about 30 wt % to about 40 wt %.

In a further aspect, the membrane further comprises a second polymer. In a still further aspect, the second polymer is selected from polysulfone, polyurethane, cellulose acetate, sulfonated polysulfone, polyethersulfone, sulfonated polyethersulfone, polyaniline, polyaniline co-polymers, polyacrylonitrile, polyvinylidene fluoride, polytetrafluoroethylene, polyvinyl fluoride, polyvinylidene fluoride, polytrifluoroethylene, polyperfluoroalkyl vinyl ether, polyhexafluoropropylene, cellulose acetate, polyurethane, or a mixture thereof. In yet a further aspect, the second polymer is polysulfone.

It is contemplated that each disclosed derivative can be optionally further substituted. It is also contemplated that any one or more derivative can be optionally omitted from the invention. It is understood that a disclosed compound can be provided by the disclosed methods. It is also understood that the disclosed compounds can be employed in fee disclosed methods of using.

a. Structure

In one aspect, the invention relates to polymers formed, by polymerizing a compound having a structure represented by a formula;

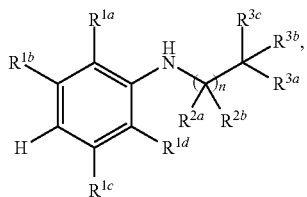

wherein n is selected from 1, 2, and 3; wherein each of $R^1$, $R^{1b}$, $R^{1c}$, and $R^{1d}$ is independently selected from, hydrogen, halogen, —CN, —SR$^{20}$, —OR$^{21}$, —NR$^{22a}$R$^{22b}$, —NR$^{22a}$R$^{22b}$H$^+$, —SO$_2$R$^{23}$, —(C═O)R$^{24}$, and C1-C3 alkyl substituted with 0, 1, 2, or 3 groups selected from halogen, —CN, —SR$^{20}$, —OR$^{21}$, —NR$^{22a}$R$^{22b}$, —SO$_2$R$^{23}$, and —(C═O)R$^{24}$; wherein each of R$^{2a}$ and R$^{2b}$ is independently selected from hydrogen, halogen, —CN, —SR$^{30}$, —OR$^{31}$, —NR$^{32a}$R$^{32b}$, —NR$^{32a}$R$^{32b}$H$^+$, —SO$_2$R$^{33}$, —(C═O)R$^{34}$, and C1-C3 alkyl substituted with 0, 1, 2, or 3 groups selected from halogen, —CN, —SR$^{30}$, —OR$^{31}$, —NR$^{32a}$R$^{32b}$, —SO$_2$R$^{33}$, and —(C═O)R$^{34}$; wherein each of R$^{3a}$, R$^{3b}$, and R$^{3c}$ is independently selected from hydrogen, halogen, —CN, —SR$^{40}$, —OR$^{41}$, —NR$^{42a}$R$^{42b}$, —NR$^{42a}$R$^{42b}$H$^+$, —SO$_2$R$^{41}$, and —(C═O) R$^{44}$; wherein at least one of R$^{2a}$, R$^{2b}$, R$^{3a}$, R$^{3b}$, and R$^{3c}$ is not hydrogen; wherein each of R$^{20}$, R$^{21}$, R$^{22a}$, R$^{22b}$, R$^{30}$, R$^{31}$, R$^{32a}$, R$^{32b}$, R$^{40}$, R$^{41}$, R$^{42a}$, and R$^{42b}$, when present, is independently selected from hydrogen, C1-C3 alkyl, C1-C3 monohaloalkyl, and C1-C3 polyhaloalkyl; wherein each of R$^{23}$ and R$^{24}$, when present, is independently selected from —O$^-$, —OR$^{25}$, C1-C3 alkyl, C1-C3 monohaloalkyl, C1-C3 polyhaloalkyl, and —NR$^{26a}$R$^{26b}$; wherein each of R$^{25}$, R$^{26a}$, and R$^{26b}$, when present, is independently selected from hydrogen, C1-C3 alkyl, C1-C3 monohaloalkyl, and C1-C3 polyhaloalkyl; wherein each of R$^{33}$, and R$^{34}$, when present, is independently selected from —O$^+$, —OR$^{35}$, C1-C3 alkyl, C1-C3 monohaloalkyl, C1-C3 polyhaloalkyl, and —NR$^{36a}$R$^{36b}$; wherein each of R$^{35}$, R$^{36a}$, and R$^{36b}$, when present, is independently selected from hydrogen, C1-C3 alkyl, C1-C3 monohaloalkyl and C1-C3 polyhaloalkyl; wherein each of R$^{43}$ and R$^{44}$, when present, is independently selected from —O$^-$, —OR$^{45}$, C1-C3 alkyl, C1-C3 monohaloalkyl, C1-C3 polyhaloalkyl, and —NR$^{42a}$R$^{46b}$; and wherein each of R$^{45}$, R$^{46a}$, and R$^{46b}$, when present is selected from hydrogen, C1-C3 alkyl, C1-C3 monohaloalkyl, and C1-C3 polyhaloalkyl.

In a further aspect, the polymer comprises at least one residue of a compound having a structure represented by a formula:

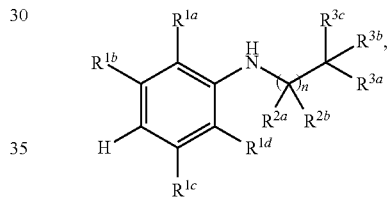

present in an amount of at least 0.1 wt %. In a still further aspect, the at least one residue of a compound is present in an amount of at least 0.5 wt %. In yet a further aspect, the at least one residue of a compound is present in an amount of at least 1 wt %. In an even further aspect, the at least one residue of a compound is present in an amount of at least 5 wt %. In a still further aspect, the at least one residue of a compound is present in an amount of at least 10 wt %. In yet a further aspect, the at least one residue of a compound is present in an amount of at least 15 wt %. In an even further aspect, the at least one residue of a compound is present in an amount of at least 25 wt %. In a still further aspect, the at least one residue of a compound is present in an amount of at least 50 wt %. In yet a further aspect, the at least one residue of a compound is present in an amount of at least 75 wt. %.

In one aspect, the invention relates to polymers comprising a structure represented by a formula:

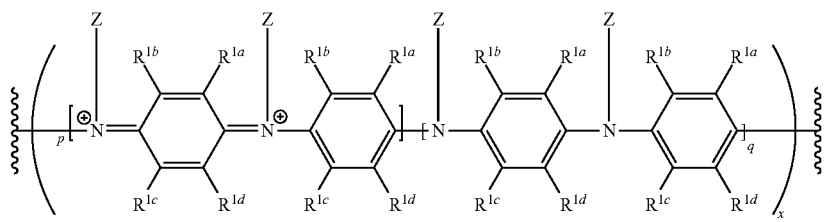

wherein each Z is independently selected from hydrogen and

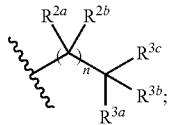

wherein n is an integer selected from 1, 2, and 3; wherein p is independently 0, 0.5, or 1; wherein q is independently 0, 0.5, or 1; wherein, for each x, p+q=1; wherein each of $R^{1a}$, $R^{1b}$, $R^{1c}$, and $R^{14}$ is independently selected from hydrogen, halogen, —CN, —$SR^{20}$, —$OR^{21}$, —$NR^{22a}R^{22b}$, —$NR^{22a}R^{22b}H^+$, —$SO_2R^{23}$, —(C=O) $R^{24}$, and C1-C3 alkyl substituted with 0, 1, 2, or 3 groups selected from halogen, —CN, —$SR^{20}$, —$OR^{21}$, —$NR^{22a}R^{22b}$, —$SO_2R^{23}$, and —(C=O)$R^{24}$; wherein each of $R^{2a}$ is and $R^{2b}$ is independently selected from hydrogen, halogen, —CN, —$SR^{30}$, —$OR^{31}$, —$NR^{32a}R^{32b}$, —$NR^{32a}R^{32b}H^+$, —$SO_2R^{33}$, —(C=O)$R^{34}$, and C1-C3 alkyl substituted with 0, 1, 2, or 3 groups selected from halogen, —CN, —$SR^{30}$, —$OR^{31}$, —$NR^{32a}R^{32b}$, —$SO_2R^{33}$, and —(C=O)$R^{34}$; wherein each of $R^{3a}$, $R^{3b}$, and $R^{3c}$ is independently selected from hydrogen, halogen, —CN, —$SR^{40}$, —$OR^{41}$, —$NR^{42a}R^{42b}$, —$NR^{42a}R^{42b}H^-$, —$SO_2R^{43}$, and —(C=O)$R^{44}$; wherein each of $R^{20}$, $R^{21}$, $R^{22a}$, $R^{22b}$, $R^{30}$, $R^{31}$, $R^{32a}$, $R^{32b}$, $R^{40}$, $R^{41}$, $R^{42a}$, and $R^{42b}$, when present, is independently selected from hydrogen, C1-C3 alkyl, C1-C3 monohaloalkyl, and C1-C3 polyhaloalkyl; wherein each of $R^{23}$ and $R^{24}$, when present, is independently selected from —$O^-$, —$OR^{25}$, C1-C3 alkyl, C1-C3 monohaloalkyl, C1-C3 polyhaloalkyl, and —$NR^{26a}R^{26b}$; wherein each of $R^{25}$, $R^{26a}$, and $R^{26b}$, when present, is independently selected from hydrogen, C1-C3 alkyl, C1-C3 monohaloalkyl, and C1-C3 polyhaloalkyl; wherein each of $R^{33}$ and $R^{34}$, when present, is independently selected from —$O^-$, —$OR^{35}$, C1-C3 alkyl, C1-C3 monohaloalkyl C1-C3 polyhaloalkyl and —$NR^{36a}R^{36b}$; wherein each of $R^{35}$, $R^{36a}$, and $R^{36b}$, when present, is independently selected from hydrogen, C1-C3 alkyl, C1-C3 monohaloalkyl, and C1-C3 polyhaloalkyl; wherein each of $R^{43}$ and $R^{44}$, when present, is independently selected from —$O^-$, —$OR^{45}$, C1-C3 alkyl, C1-C3 monohaloalkyl, C1-C3 polyhaloalkyl, and —$NR^{46a}R^{46b}$; wherein each of $R^{45}$, $R^{46a}$, and $R^{46b}$, when present, is selected from hydrogen, C1-C3 alkyl, C1-C3 monohaloalkyl, and C1-C3 polyhaloalkyl; and wherein at least one Z is a structure represented by a formula:

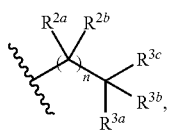

and wherein, at least one of $R^{2aa}$, $R^{2b}$, $R^{3a}$, and $R^{3c}$ is not hydrogen.

In a further aspect, the invention relates to polymers formed by polymerizing a compound having a structure represented by a formula:

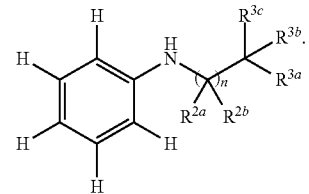

In a still further aspect, the invention relates to polymers formed by polymerizing a compound having a structure represented by a formula selected from:

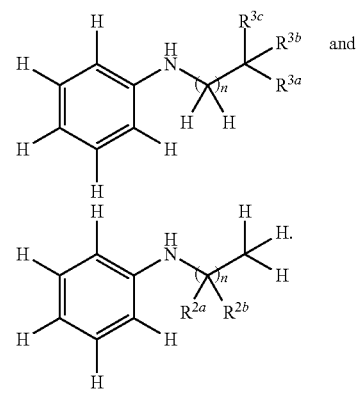

In a further aspect, the invention relates to polymers formed by polymerizing a compound having a structure represented by a formula:

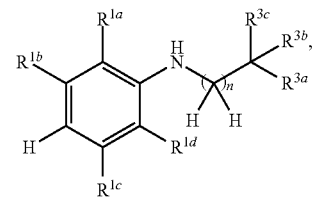

wherein each of $R^{3a}$, $R^{3b}$, and $R^{3c}$ is independently selected from hydrogen, halogen, —CN, —$SR^{40}$, —$OR^{41}$, —$NR^{42a}R^{42b}$, —$NR^{42a}R^{42b}H^+$, —$SO_2R^{43}$, and —(C=O) $R^{44}$; and wherein at least one of $R^{3a}$, $R^{3b}$, and $R^{3c}$ is not hydrogen.

In a still further aspect, the invention relates to polymers formed by polymerizing a compound having a structure represented by a formula:

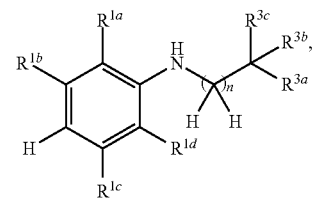

wherein each of $R^{3a}$ and $R^{3b}$ is hydrogen and $R^{3c}$ is selected from halogen, —CN, —$SR^{40}$, —$OR^{43}$, —$NR^{42a}R^{42b}$, —$NR^{42a}R^{42b}H^+$, —$SO_2R^{43}$, and —(C=O)$R^{44}$.

In yet a further aspect, the invention relates to polymers formed by polymerizing a compound having a structure represented by a formula:

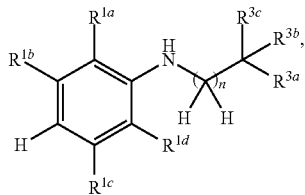

wherein each of $R^{3a}$ and $R^{3b}$ is hydrogen and $R^{3c}$ is selected from halogen, —CN, —SH, 13 OH, —NH$_2$, —NH$_3$, —SO$_2$O$^-$, —SO$_2$OH, —(C=O)O$^-$, and —(C=O)OH.

In an even further aspect, the invention relates to polymers formed by polymerizing a compound having a structure represented by a formula:

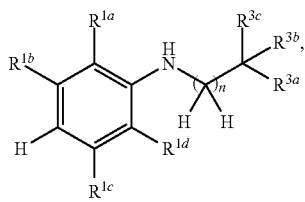

wherein each of $R^{3a}$ and $R^{3b}$ is hydrogen and $R^{3c}$ is selected from —SH, —OH, —NH$_2$, —NH$_3^+$, —SO$_2$O$^-$, —SO$_2$OH, —(C=O)O$^-$, and —(C=O)OH.

In a still further aspect, the invention relates to polymers formed by polymerizing a compound having a structure represented by a formula:

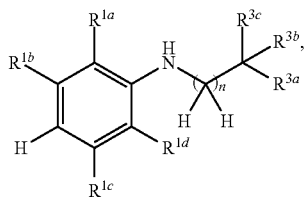

wherein each of $R^{3a}$ and $R^{3b}$ is hydrogen and $R^{3c}$ is selected from —SH, 13 OH, —NH$_2$, —SO$_2$OH, and —(C=O)OH.

In a further aspect, the invention relates to polymers formed by polymerizing a compound having a structure represented by a formula:

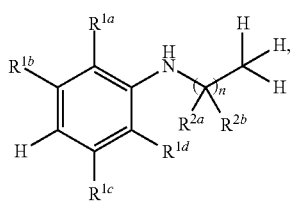

wherein each of $R^{2a}$ and $R^{2b}$ is independently selected from hydrogen, halogen, —CN, —SR$^{30}$, —OR$^{31}$, —NR$^{32a}$R$^{32b}$, —NR$^{32a}$R$^{32b}$H$^+$, —SO$_2$R$^{33}$, —(C=O) R$^{34}$, and C1-C3 alkyl substituted with 0, 1, 2, or 3 groups selected from halogen, —CN, —SR$^{30}$, —OR$^{31}$, —NR$^{32}$R$^{32b}$, —SO$_2$R$^{33}$, and —(C=O)R$^{34}$; and wherein at least one of $R^{2a}$ and $R^{2b}$ is not hydrogen.

In a still further aspect, the invention relates to polymers formed by polymerizing a compound having a structure represented by a formula:

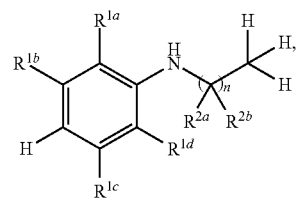

wherein $R^{2a}$ is hydrogen and $R^{2b}$ is selected from halogen, —CN, —SR$^{30}$, —OR$^{31}$, —NR$^{32a}$R$^{32b}$, —NR$^{32a}$R$^{32b}$H$^+$, —SO$_2$R$^{33}$, —(C=O)R$^{34}$, and C1-C3 alkyl substituted with 0, 1, 2, or 3 groups selected, from halogen, —CN, —SR$^{30}$, —OR$^{31}$, —NR$^{32a}$R$^{32b}$, —SO$_2$R$^{33}$, and —(C=O) R$^{34}$.

In yet a further aspect, the invention, relates to polymers formed by polymerizing a compound having a structure represented by a formula:

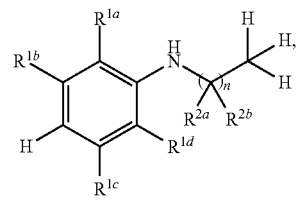

wherein $R^{2a}$ is hydrogen and $R^{2b}$ is selected from halogen, —CN, —SR$^+$, —OR$^-$, —NR$^{32a}$R$^{32b}$, —NR$^{32a}$R$^{32b}$H$^+$, —SO$_2$R$^{33}$, and —(C=O)R$^{34}$.

In an even further aspect, the invention relates to polymers formed by polymerizing a compound having a structure represented by a formula:

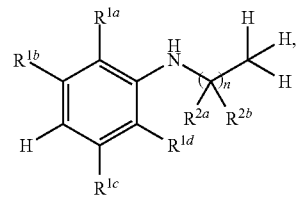

wherein $R^{2a}$ is hydrogen and $R^{2b}$ is selected from halogen, —CN, —SH, —OH, —NH$_2$, —NH$_3^+$, —SO$_2$O$^-$, —SO$_2$OH, —(C=O)O$^-$, and —(C=O)OH.

In a still further aspect, the invention relates to polymers formed by polymerizing a compound having a structure represented by a formula:

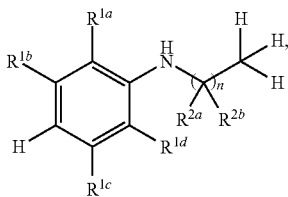

wherein $R^{2a}$ is hydrogen and $R^{2b}$ is selected from —SH, —OH, —NH$_2$, —NH$_3^+$, —SO$_2$O$^-$, —SO$_2$OH, —(C=O)O$^-$, and —(C=O)OH.

In yet a further aspect, the invention relates to polymers formed by polymerizing a compound having a structure represented by a formula:

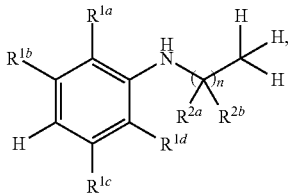

wherein $R^{2a}$ is hydrogen and $R^{2b}$ is selected from —SH, —OH, —NH$_2$, —SO$_2$OH, and —(C=O)OH.

In an even further aspect, the invention relates to polymers formed by polymerizing a compound having a structure represented by a formula:

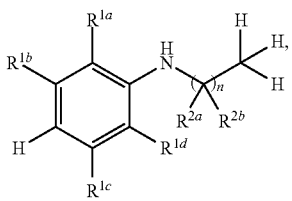

wherein $R^{2a}$ is hydrogen and $R^{2b}$ is C1-C3 alkyl substituted with 0, 1, 2, or 3 groups selected from halogen, —CN, —SR$^{30}$, —OR$^{31}$, —NR$^{32a}$R$^{32b}$, —SO$_2$R$^{33}$, and —(C=O)R$^{34}$.

In a still further aspect, the invention relates to polymers formed by polymerizing a compound having a structure represented by a formula;

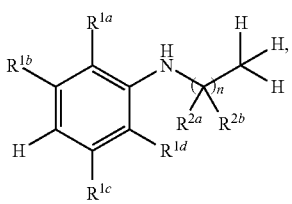

wherein $R^{2a}$ is hydrogen and $R^{2b}$ is selected from methyl and ethyl and substituted with 0, 1, 2, or 3 groups selected from halogen, —CN, —SR$^{30}$, —OR$^{31}$, —NR$^{32a}$R$^{32b}$, —SO$_2$R$^{33}$, and —(C=O)R$^{34}$.

In yet a further aspect, the invention relates to polymers formed by polymerizing a compound having a structure represented by a formula:

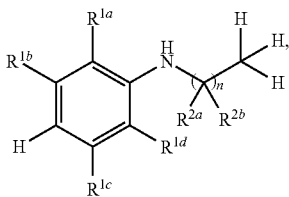

wherein $R^{2a}$ is hydrogen and $R^{2b}$ is methyl substituted with 0, 1, 2, or 3 groups selected from halogen, —CN, —SR$^{30}$, —OR$^{31}$, —NR$^{32a}$R$^{32b}$, —SO$_2$R$^{33}$, and —(C=O)R$^{34}$.

In an even further aspect, the invention relates to polymers formed by polymerizing a compound having a structure represented by a formula:

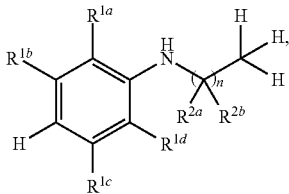

wherein $R^{2a}$ is hydrogen and $R^{2b}$ is C1-C3 alkyl substituted with 0, 1, or 2 groups selected from halogen, —CN, —SR$^{30}$, —OR$^{31}$, —NR$^{32a}$R$^{32b}$, —SO$_2$R$^{33}$, and —(C=O)R$^{34}$.

In a still further aspect, the invention relates to polymers formed by polymerizing a compound having a structure represented by a formula;

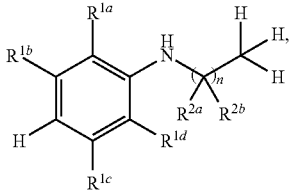

wherein $R^{2a}$ is hydrogen and $R^{2b}$ is C1-C3 alkyl substituted with 0 or 1 group selected from halogen, —CN, —SR$^{30}$, —OR$^{31}$, —NR$^{32a}$R$^{32b}$, —SO$_2$R$^{33}$, and —(C=O) R$^{34}$.

In yet a further aspect, the invention relates to polymers formed by polymerizing a compound having a structure represented by a formula:

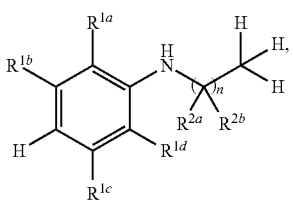

wherein $R^{2a}$ is hydrogen and $R^{2b}$ is unsubstituted C1-C3 alkyl.

In a further aspect, the polymers of the invention further comprise a counterion. Examples of counrerions include, but are not limited to, chloride, fluoride, bromide, carbonate, hydrogen carbonate, phosphate, acetate, formate, oxalate, cyanide, sulfate, perchlorate, and nitrate.

(1) N

In one aspect, n is an integer selected from 1, 2, and 3. In a further aspect, a is as integer selected from 1, and 2. In yet a further aspect, n is 3. In an even further aspect, n is 2. In a still further aspect, n is 1.

(2) P and Q

In one aspect, q is 1 and p is 0. In another aspect, p is 1 and q is 0.

In a further aspect, q is 0.5 and p is 0.5.

(3) Z Groups

In one aspect, each Z is independently selected from hydrogen and

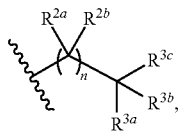

wherein at least one Z is a structure represented by a formula:

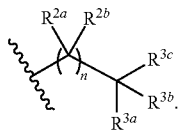

In a further aspect, each Z is a structure represented by a formula:

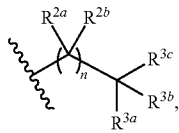

and wherein at least one of $R^{2a}$, $R^{2b}$, $R^{3a}$, $R^{3b}$, and $R^{3c}$ is not hydrogen.

In a further aspect, each Z is a structure represented by a formula:

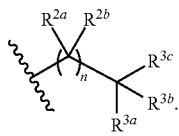

(4) $R^1$ Groups

In one aspect, each of $R^{1a}$, $R^{1b}$, $R^c$, and $R^{1d}$ is independently selected from hydrogen, halogen, —CN, —SR$^{20}$, —OR$^{21}$, —NR$^{22a}$R$^{22b}$, —NR$^{22a}$R$^{22b}$H$^+$, —SO$_2$R$^{23}$, —(C=O)R$^{24}$, and C1-C3 alkyl substituted with 0, 1, 2, or 3 groups selected from halogen, —CN, —SR$^{20}$, —OR$^{21}$, —NR$^{22a}$R$^{22b}$, —SO$_2$R$^{23}$, and —(C=O)R$^{24}$. In a further aspect, each of $R^{1a}$, $R^{1b}$, $R^{1c}$, and $R^{1d}$ is hydrogen.

In a further aspect, each of $R^{1a}$, $R^{1b}$, $R^{1c}$, and $R^{1d}$ is independently selected from hydrogen, halogen, —CN, —SR$^{20}$, —OR$^{21}$, —NR$^{22a}$R$^{22b}$, —NR$^{22a}$R$^{22b}$H$^+$, —SO$_2$R$^{23}$, and —(C=O)R$^{24}$. In a still further aspect, each of $R^{1a}$, $R^{1b}$, $R^{1c}$, and $R^{1c}$ is independently selected from hydrogen, halogen, —CN, —SR$^{20}$, —OR$^{21}$, —SO$_2$R$^{23}$, and —(C=O)R$^{24}$. In yet a further aspect, each of $R^{1a}$, $R^{1b}$, $R^{1c}$, and $R^{1d}$ is independently selected from hydrogen, halogen, —CN, —SR$^{20}$, and —SO$_2$R$^{23}$. In an even further aspect, each of $R^{1a}$, $R^{1b}$, $R^{1c}$, and $R^{1d}$ is independently selected from hydrogen, halogen, —SR$^{20}$, and —SO$_2$R$^{23}$. In a still further aspect, each of $R^{1a}$, $R^{1b}$, $R^{1c}$, and $R^{1d}$ is independently selected from hydrogen, —SR$^{20}$, and —SO$_2$R$^{23}$. In yet a further aspect, each of $R^{1a}$, $R^{1b}$, $R^{1c}$, and $R^{1d}$ is independently selected from hydrogen and —SO$_2$R$^{23}$. In an even further aspect, each of $R^{1a}$, $R^{1b}$, $R^{1c}$, and $R^{1d}$ is independently selected from hydrogen and —SR$^{20}$.

In a further aspect, each of $R^{1a}$, $R^{1b}$, $R^{1c}$, and $R^{1d}$ is independently selected from hydrogen, halogen, —CN, —OR$^{21}$, —NR$^{22a}$R$^{22b}$, —NR$^{22a}$R$^{22b}$H$^+$, and —(C=O)R$^{24}$. In a still further aspect, each of $R^{1a}$, $R^{1b}$, $R^{1c}$, and $R^{1d}$ is independently selected from hydrogen, —CN, —OR$^{21}$, —NR$^{23a}$R$^{22b}$, —NR$^{22a}$R$^{22}$H$^+$, and —(CO)R$^{24}$. In yet a further aspect, each of $R^{1a}$, $R^{1b}$, $R^{1c}$, and $R^{1d}$ is independently selected from hydrogen, —OR$^{21}$, —NR$^{22a}$R$^{22b}$, —NR$^{22a}$R$^{22b}$H$^+$, and —(C=O) R$^{24}$. In an even farther aspect, each of $R^{1a}$, $R^{1b}$, $R^{1c}$, and $R^{1d}$ is independently selected from hydrogen, —NR$^{22a}$R$^{22b}$, and —NR$^{22a}$R$^{22b}$H$^+$. In a still further aspect, each of $R^{1a}$, $R^{1b}$, $R^{1c}$, and $R^{1d}$ is independently selected from hydrogen and —NR$^{22a}$R$^{22b}$H$^+$. In yet a further aspect, each of $R^{1a}$, $R^{1b}$, $R^{1c}$, and $R^{1d}$ is independently selected from hydrogen and —NR$^{22a}$R$^{22b}$.

In a further aspect, each of $R^{1a}$, $R^{1b}$, $R^{1c}$, and $R^{1d}$ is independently selected from hydrogen, halogen, —CN, —OR$^{21}$, and —(C=O)R$^{24}$. In a still further aspect, each of $R^{1a}$, $R^{1b}$, $R^{1c}$, and $R^{1d}$ is independently selected from hydrogen, —CN, —OR$^{21}$, and —(C=O)R$^{24}$. In yet a further aspect, each of $R^{1a}$, $R^{1b}$, $R^{1c}$, and $R^{1d}$ is independently selected from hydrogen, —OR$^{21}$, and —(C=O) R$^{24}$. In an even farther aspect, each of $R^{1a}$, $R^{1b}$, $R^{1c}$, and $R^{1c}$ is independently selected from hydrogen and —(C=O) R$^{24}$. In a still further aspect, each of $R^{1a}$, $R^{1b}$, $R^{1c}$, and $R^{1d}$ is independently selected from hydrogen and —OR$^{21}$.

In a further aspect, each of $R^{1a}$, $R^{1b}$, $R^{1c}$, and $R^{1d}$ is independently selected from hydrogen and halogen. In a still further aspect, each of $R^{1a}$, $R^{1b}$, $R^{1c}$, and $R^{1d}$ is independently selected from hydrogen, —Cl and —F. In yet a further aspect, each of $R^{1a}$, $R^{1b}$, $R^{1c}$, and $R^{1d}$ is independently selected from hydrogen and —Cl. In an even further aspect, each of $R^{1a}$, $R^{1b}$, $R^{1c}$, and $R^{1d}$ is independently selected from hydrogen and —F.

In a further aspect, each of $R^{1a}$, $R^{1b}$, $R^{1c}$, and $R^{1d}$ is independently selected from hydrogen and C1-C3 alkyl substituted with 0, 1, 2, or 3 groups selected from halogen, —CN, —SR$^{20}$, —OR$^{21}$, —NR$^{22a}$R$^{22b}$, —SO$_2$R$^{23}$, and —(C=O) R$^{24}$. In a still further aspect, each of $R^{1a}$, $R^{1b}$, $R^{1c}$, and $R^{1d}$ is independently selected from hydrogen, methyl ethyl, i-propyl, and n-propyl and substituted with 0, 1, 2, or 3 groups selected from halogen, —CN, —SR$^{20}$, —OR$^{21}$, —NR$^{22a}$R$^{22b}$, —SO$_3$R$^{23}$, and —(C=O) R$^{24}$. In yet a further aspect, each of $R^{1a}$, $R^{1b}$, $R^{1c}$, and $R^{1d}$ is independently selected from hydrogen, methyl, and ethyl and substituted with 0, 1, 2, or 3 groups selected from halogen, —CN, —SR$^{20}$, —OR$^{21}$, —NR$^{22a}$R$^{22b}$, —SO$_2$R$^{23}$, and —(C=O) R$^{24}$. In an even further aspect, each of $R^{1a}$, $R^{1b}$, $R^{1c}$, and $R^{1d}$ is independently selected from hydrogen and methyl substituted with 0, 1, 2, or 3 groups selected from halogen, —CN, —SR$^{20}$, —OR$^{21}$, —NR$^{22a}$R$^{22b}$, —SO$_2$R$^{23}$, and —(C=O)R$^{24}$.

In a further aspect, each of $R^{1a}$, $R^{1b}$, $R^{1c}$, and $R^{1d}$ is independently selected from hydrogen and C1-C3 alkyl substituted with 0, 1, or 2 groups selected from halogen, —CN, —SR$^{20}$, —OR$^{21}$, —NR$^{22a}$R$^{22b}$, —SO$_2$R$^{23}$, and —(C═O)R$^{24}$. In a still further aspect, each of R$^{1a}$, R$^{1b}$, R$^{1c}$, and R$^{1d}$ is independently selected from hydrogen and C1-C3 alkyl substituted with 0 or 1 group selected from halogen, —CN, —SR$^{20}$, —OR$^{21}$, —NR$^{22a}$R$^{22b}$, —SO$_2$R$^{23}$, and —(C═O)R$^{24}$. In yet a further aspect, each of R$^{1a}$, R$^{1b}$, R$^{1c}$, and R$^{1d}$ is independently selected from hydrogen and unsubstituted C1-C3 alkyl.

(5) R$^2$ Groups

In one aspect, each of R$^{2a}$, and R$^{2b}$ is independently selected from hydrogen, halogen, —CN, —SR$^{30}$, —OR$^{31}$, —NR$^{32a}$R$^{32b}$, —NR$^{32a}$R$^{32b}$H$^+$, —SO$_2$R$^{33}$, —(C═O)R$^{34}$, and C1-C3 alkyl substituted with 0, 1, 2, or 3 groups selected from halogen, —CN, —SR$^{30}$, —OR$^{31}$, —NR$^{32a}$R$^{32b}$, —SO$_2$R$^{33}$, and —(C═O)R$^{14}$. In a further aspect, each of R$^{2a}$ and R$^{2b}$ is hydrogen.

In a further aspect, each of R$^{2a}$ and R$^{2b}$ is independently selected from hydrogen, halogen, —CN, —SR$^{30}$, —OR$^{31}$, —NR$^{32a}$R$^{32b}$, —NR$^{32a}$R$^{32b}$H$^+$, —SO$_2$R$^{33}$, and —(C═O)R$^{34}$. In a still further aspect, each of R$^{2a}$ and R$^{2b}$ is independently selected from hydrogen, —CN, —SR$^{30}$, —OR$^{31}$, —NR$^{32a}$R$^{32b}$, —NR$^{32a}$R$^{32b}$H$^+$, —SO$_2$R$^{33}$, and —(C═O)R$^{34}$. In yet a further aspect, each of R$^{2a}$ and R$^{2b}$ is independently selected from hydrogen, —SR$^{30}$, —OR$^{31}$, —NR$^{32a}$R$^{32}$, —NR$^{32a}$R$^{32b}$H$^+$, —SO$_2$R$^{33}$, and —(C═O)R$^{34}$. In an even further aspect, each of R$^{2a}$ is and R$^{2b}$ is independently selected from hydrogen, —SR$^{30}$, —OR$^{31}$, —SO$_2$R$^{33}$, and —(C═O)R$^{34}$. In a still further aspect, each of R$^{2a}$ and R$^{2b}$ is independently selected from hydrogen, —SR$^{30}$, and —SO$_2$R$^{33}$. In yet a further aspect, each of R$^{2a}$ and R$^{2b}$ is independently selected from hydrogen and —SO$_2$R$^{33}$. In an even further aspect, each of R$^{2a}$ and R$^{2b}$ is independently selected from hydrogen and —SR$^{30}$.

In a further aspect, each of R$^{2a}$ and R$^{2b}$ is independently selected from hydrogen, halogen, —CN, —OR$^{31}$, —NR$^{32a}$R$^{32b}$, —NR$^{32a}$R$^{32b}$H$^+$, and —(C═O)R$^{34}$. In a still further aspect, each of R$^{2a}$ and R$^{2b}$ is independently selected from hydrogen, —CN, —OR$^{31}$, —NR$^{32a}$R$^{32b}$, —NR$^{32a}$R$^{32b}$H$^+$, and —(C═O)R$^{34}$. In yet a further aspect, each of R$^{2a}$ and R$^{2b}$ is independently selected from hydrogen, —OR$^{31}$, —NR$^{32a}$R$^{32b}$, —NR$^{32a}$R$^{32b}$H$^+$, and —(C═O)R$^{34}$. In an even further aspect, each of R$^{2a}$ and R$^{2b}$ is independently selected from hydrogen, —NR$^{32a}$R$^{32b}$, and —NR$^{32a}$R$^{32b}$H$^+$. In a still further aspect, each of R$^{2a}$ and R$^{2b}$ is independently selected from hydrogen and —NR$^{32a}$R$^{32b}$H$^+$. In yet a further aspect, each of R$^{2a}$ and R$^{2b}$ is independently selected from hydrogen and —NR$^{32a}$R$^{32b}$.

In a further aspect, each of R$^{2a}$ and R$^{2b}$ is independently selected from hydrogen, halogen, —CN, —OR$^{31}$, —(C═O)R$^{34}$. In a still further aspect, each of R$^{2a}$ and R$^{2b}$ is independently selected from hydrogen, —CN, —OR$^{31}$, —(C═O)R$^{34}$. In yet a further aspect, each of R$^{2a}$ and R$^{2b}$ is independently selected from hydrogen, —OR$^{31}$, and —(C═O)R$^{34}$. In an even further aspect, each of R$^{2a}$ and R$^{2b}$ is independently selected from hydrogen and —(C═O)R$^{34}$. In a still further aspect, each of R$^{2a}$ and R$^{2b}$ is independently selected from hydrogen and —OR$^{31}$.

In a further aspect, each of R$^{2a}$ and R$^{2b}$ is independently selected from hydrogen and halogen. In a still further aspect, each of R$^{2a}$ and R$^{2b}$ is independently selected from hydrogen, —Cl, and —F. In yet a further aspect, each of R$^{2a}$ and R$^{2b}$ is independently selected from hydrogen and —Cl. In an even further aspect, each of R$^{2a}$ and R$^{2b}$ is independently selected from, hydrogen and —F.

In a further aspect, each of R$^{2a}$ and R$^{2b}$ is independently selected from hydrogen and C1-C3 alkyl substituted with 0, 1, 2, or 3 groups selected from halogen, —CN, —SR$^{30}$, —OR$^{31}$, —NR$^{32a}$R$^{32b}$, —SO$_2$R$^{33}$, and —(C═O)R$^{34}$. In a still further aspect, each of R$^{2a}$ and R$^{2b}$ is independently selected from hydrogen, methyl, ethyl, t-propyl, and n-propyl and substituted with 0, 1, 2, or 3 groups selected from halogen, —CN, —SR$^{30}$, —OR$^{31}$, —NR$^{32a}$R$^{32b}$, —SO$_2$R$^{33}$, and —(C═O)R$^{34}$. In yet a further aspect, each of R$^{2a}$ and R$^{2b}$ is independently selected from hydrogen, methyl, and ethyl and substituted with 0, 1, 2, or 3 groups selected from halogen, —CN, —SR$^{30}$, —OR$^{31}$, —NR$^{32a}$R$^{32b}$, —SO$_2$R$^{33}$, and —(C═O) R$^{34}$. In an even further aspect, each of R$^{2a}$ and R$^{2b}$ is independently selected from hydrogen and methyl substituted with 0, 1, 2, or 3 groups selected from halogen, —CN, —SR$^{30}$, —OR$^{31}$, —NR$^{32a}$R$^{32b}$, —SO$_3$R$^{33}$, and —(C═O) R$^{34}$.

In a further aspect, each of R$^{2a}$ and R$^{2b}$ s independently selected from hydrogen and C1-C3 alkyl substituted with 0, 1, or 2 groups selected from halogen, —CN, —SR$^{30}$, —OR$^{31}$, —NR$^{32a}$R$^{32b}$, —SO$_2$R$^{33}$, and —(C═O)R$^{34}$. In a still further aspect, each of R$^{2a}$ and R$^{2b}$ is independently selected from hydrogen and C1-C3 alkyl substituted with 0 or 1 group selected from halogen, —CN, —SR$^{30}$, —OR$^{31}$, —NR$^{32a}$R$^{32b}$, —SO$_2$R$^{33}$, and —(C═O))R$^{34}$. In yet a further aspect, each of R$^{2a}$ and R$^{2b}$ is independently selected from hydrogen and unsubstituted C1-C3 alkyl.

In a further aspect, R$^{2a}$ is hydrogen and R$^{2b}$ is selected from halogen, —CN, —SR$^{30}$, —OR$^{31}$, —NR$^{32a}$R$^{32b}$, —NR$^{32a}$R$^{32b}$H$^+$, —SO$_2$R$^{33}$, —(C═O)R$^{34}$, and C1-C3 alkyl substituted with 0, 1, 2, or 3 groups selected from halogen, —CN, —SR$^{30}$, —OR$^{31}$, —NR$^{32a}$R$^{32b}$, —SO$_2$R$^{33}$, and —(C═O)R$^{34}$. In a still further aspect, R$^{2a}$ is hydrogen and R$^{2b}$ is selected from halogen, —CN, —SR$^{30}$, —OR$^{31}$, —NR$^{32a}$R$^{32b}$, —NR$^{32a}$R$^{32b}$H$^+$, —SO$_2$R$^{33}$, and —(C═O) R$^{34}$. In yet a further aspect, R$^{2a}$ is hydrogen and R$^{2b}$ is selected from —CN, —SR$^{30}$, —OR$^{31}$, —NR$^{32}$R$^{32b}$, —NR$^{32a}$R$^{32b}$H$^+$, —SO$_2$R$^{33}$, and —(O═O)R$^{34}$. In an even further aspect, R$^{2a}$ is hydrogen and R$^{2d}$ is selected from —SR$^{30}$, —OR$^{31}$, —NR$^{32a}$R$^{32b}$, —NR$^{32a}$R$^{32b}$H$^+$, —SO$_2$R$^{33}$, and —(C═O)R$^{34}$. In a still further aspect, R$^{2a}$ is hydrogen and R$^{2b}$ is selected from —SR$^{30}$, —OR$^{31}$, —SO$_2$R$^{33}$, and —(C═O)R$^{34}$. In yet a further aspect, R$^{2a}$ is hydrogen and R$^{2b}$ is selected from —SR$^{30}$ and —SO$_2$R$^{33}$. In an even further aspect, R$^{2a}$ is hydrogen and R$^{2b}$ is —SO$_2$R$^{33}$. In a still further aspect, R$^{3a}$ is hydrogen and R$^{2b}$ is —SR$^{30}$.

In a further aspect, R$^{2a}$ is hydrogen and R$^{2b}$ is selected from halogen, —CN, —OR$^{31}$, —NR$^{32a}$R$^{32b}$, —NR$^{32a}$R$^{32b}$H$^+$, and —(C═O)R$^{34}$. In a still further aspect, R$^{2a}$ is hydrogen and R$^{2b}$ is selected from —CN, —OR$^{31}$, —NR$^{32a}$R$^{32b}$, —NR$^{32a}$R$^{32b}$H$^+$, and —(C═O)R$^{34}$. In yet a further aspect, R$^{2a}$ is hydrogen and R$^{2b}$ is selected from —OR$^{31}$, —NR$^{32a}$R$^{32b}$, —NR$^{32a}$R$^{32b}$H$^+$, and —(C═O) R$^{34}$. In an even further aspect R$^{2a}$ is hydrogen and R$^{2b}$ is selected from —NR$^{32a}$R$^{32b}$ and —NR$^{32a}$R$^{32b}$H$^+$. In a still further aspect, R$^{2a}$ is hydrogen and R$^{2b}$ is —NR$^{32a}$R$^{32b}$H$^+$. In yet a further aspect, R$^{2a}$ is hydrogen and R$^{2b}$ is —NR$^{32a}$R$^{32b}$.

In a further aspect, R$^{2a}$ is hydrogen and R$^{2b}$ is selected from halogen, —CN, —OR$^{31}$, and —(C═O)R$^{34}$. In a still further aspect, R$^{2a}$ is hydrogen and R$^{2b}$ is selected from —CN, —OR$^{31}$, and —(C═O)R$^{34}$. In yet a further aspect, R$^{2a}$ is hydrogen and R$^{2b}$ is selected from —OR$^{31}$ and —(C═O)R$^{34}$. In an even further aspect, R$^{2a}$ is hydrogen and R$^{2b}$ is —(C═O)R$^{34}$. In a still further aspect, R$^{2a}$ is hydrogen and R$^{2b}$ is —OR$^{21}$.

In a further aspect, R$^{2a}$ is hydrogen and R$^{2b}$ is halogen. In a still further aspect, R$^{2a}$ is hydrogen and R$^{2b}$ is selected from —Cl, and —F. In yet a further aspect, $R^{2a}$ is hydrogen and $R^{2b}$ is —Cl. In an even further aspect, $R^{2a}$ is hydrogen and $R^{2b}$ is —F.

In a further aspect, $R^{2a}$ is hydrogen and $R^{2b}$ is C1-C3 alkyl substituted with 0, 1, 2, or 3 groups selected from halogen, —CN, —$SR^{30}$, —$OR^{31}$, —$NR^{32a}R^{32b}$, —$SO_2R^{33}$, and —(C=O)$R^{34}$. In a still further aspect, $R^{2a}$ is hydrogen and $R^{2b}$ is selected from, methyl, ethyl, i-propyl, and n-propyl and substituted with 0, 1, 2, or 3 groups selected from halogen, —CN, —$SR^{30}$, —$OR^{31}$, —$NR^{32a}R^{32b}$, —$SO_2R^{33}$, and —(C=O)$R^{34}$. In yet a further aspect, $R^{2a}$ is hydrogen and $R^{2b}$ is selected from methyl and ethyl and substituted with 0, 1, 2, or 3 groups selected from halogen, —CN, —$SR^{30}$, —$OR^{31}$, —$NR^{32a}R^{32b}$, —$SO_2R^{33}$, and —(C=O) $R^{34}$. In an even further aspect, $R^{2a}$ is hydrogen and $R^{2b}$ is methyl substituted with 0, 1, 2, or 3 groups selected from halogen, —CN, —$SR^{30}$, —$OR^{31}$, —$NR^{32a}R^{32b}$, —$SO_2R^{33}$, and —(C=O)$R^{34}$.

In a further aspect, $R^{2a}$ is hydrogen and $R^{2b}$ is C1-C3 alkyl substituted with 0, 1, or 2 groups selected from halogen, —CN, —$SR^{30}$, —$OR^{31}$, —$NR^{32a}R^{32b}$, —$SO_2R^{33}$, and —(C=O) $R^{34}$. In a still further aspect, $R^{2a}$ is hydrogen and $R^{2b}$ is C1-C3 alkyl substituted with 0 or 1 group selected from halogen, —CN, —$SR^{30}$, —$OR^{31}$, —$NR^{32a}R^{32b}$, —$SO_2R^{33}$, and —(C=O)$R^{34}$. In yet a further aspect, $R^{2a}$ is hydrogen and $R^{2b}$ is unsubstituted C1-C3 alkyl.

In one aspect, at least one of $R^{2a}$, $R^{2b}$, $R^{3a}$, $R^{3b}$, and $R^{3c}$ is not hydrogen.

(6) $R^3$ Groups

In one aspect, each of $R^{3a}$, $R^{3b}$, and $R^{3c}$ is independently selected from hydrogen, halogen, —CN, —$SR^{40}$, —$OR^{41}$, —$NR^{42a}R^{42b}$, —$NR^{42a}R^{42b}H^+$, —$SO_2R^{43}$, and —(C=O)$R^{44}$. In a further aspect, each of $R^{3a}$, $R^{3b}$, and $R^{3c}$ is hydrogen.

In a further aspect, each of $R^{3a}$, $R^{3b}$, and $R^{3c}$ is independently selected from hydrogen, —CN, —$SR^{40}$, —$OR^{41}$, —$NR^{42a}R^{42b}$, —$NR^{42a}R^{42b}H^+$, —$SO_2R^{43}$, and —(C=O)$R^{44}$. In a still further aspect, each of $R^{3a}$, $R^{3b}$, and $R^{3c}$ is independently selected from hydrogen, —$SR^{40}$, —$OR^{41}$, —$NR^{42a}R^{42b}$, —$NR^{42a}R^{42b}H^+$, —$SO_2R^{44}$, and —(C=O) $R^{44}$. In yet a further aspect, each of $R^{3a}$, $R^{2b}$, and $R^{3c}$ is independently selected from hydrogen, —$SR^{40}$, —$OR^{41}$, —$SO_2R^{43}$, and —(C=O) $R^{44}$. In an even further aspect, each of $R^{3a}$, $R^{3b}$, and $R^{3c}$ is independently selected from hydrogen, —$SR^{40}$, and —$SO_2R^{41}$. In a still further aspect, each of $R^{3a}$, $R^{3b}$, and $R^{3c}$ is independently selected from hydrogen and —$SO_2R^{43}$. In yet a further aspect each of $R^{3a}$, $R^{3b}$, and $R^{3c}$ is independently selected from hydrogen and —$SR^{40}$.

In a further aspect, each of $R^{3a}$, $R^{3b}$, and $R^{3c}$ is independently selected from hydrogen, —CN, —$OR^{41}$, —$NR^{42a}R^{42b}$, —$NR^{42a}R^{42b}H^+$, and —(C=O) $R^{44}$. In a still, further aspect, each of $R^{3a}R^{3b}$, and $R^{3c}$ is independently selected from hydrogen, —$OR^{41}$, —$NR^{42a}R^{42b}$, —$NR^{42a}R^{42b}H^+$, and —(C=O) $R^{44}$. In yet a further aspect, each of $R^{3a}$, $R^{3b}$, and $R^{3c}$ is independently selected from hydrogen, —$NR^{42a}R^{42b}$, and —$NR^{42a}R^{42b}H^+$. In a still further aspect, each of $R^{3a}$, $R^{3b}$, and $R^{3c}$ is independently selected from hydrogen and —$NR^{42a}R^{42b}H^+$. In yet a further aspect, each of $R^{3a}$, $R^{3b}$, and $R^{3c}$ is independently selected from hydrogen and —$NR^{42a}R^{42b}$.

In a further aspect, each of $R^{3a}$, $R^{3b}$, and $R^{3c}$ is independently selected from hydrogen, —CN, —$OR^{41}$, and —(C=O)$R^{44}$. In a still further aspect, each of $R^{3a}$, $R^{3b}$, and $R^{3c}$ is independently selected from hydrogen, —$OR^{41}$, and —(C=O)$R^{44}$. In yet a farther aspect, each of $R^{3a}$, $R^{3b}$, and $R^{3c}$ is independently selected from hydrogen and —(C=O) $R^{44}$. In an even further aspect, each of $R^{3a}$, $R^{3b}$, and $R^{3c}$ is independently selected from hydrogen and —$OR^{41}$.

In a further aspect, each of $R^{3a}$, $R^{3b}$, and $R^{3c}$ is independently selected from hydrogen and halogen. In a still further aspect, each of $R^{3a}$, $R^{3b}$, and $R^{3c}$ is independently selected from hydrogen, —Cl, and —F. In yet a further aspect, each of $R^{3a}$, $R^{3b}$, and $R^{3c}$ is independently selected from hydrogen and —Cl. In an even further aspect, each of $R^{3a}$, $R^{3b}$, and $R^{3c}$ is independently selected from: hydrogen and —F.

In a further aspect, $R^{3a}$ is hydrogen and each of $R^{3b}$, and $R^{3c}$ is independently selected from halogen, —CN, —$SR^{40}$, —$OR^{41}$, —$NR^{42a}R^{42b}$, —$NR^{42a}R^{42b}H^+$, —$SO_2R^{43}$, and —(C=O)$R^{44}$. In a still further aspect, $R^{3a}$ is hydrogen and each of $R^{3b}$, and $R^{3c}$ is independently selected from —CN, —$SR^{40}$, —$OR^{41}$, —$NR^{42a}R^{42b}$, —$NR^{42a}R^{42b}H^+$, —$SO_2R^{43}$, and —(C=O)$R^{44}$. In yet a further aspect, $R^{3a}$ is hydrogen and each of $R^{3b}$, and $R^{3c}$ is independently selected from —$SR^{40}$, —$OR^{41}$, —$NR^{42a}R^{42b}$, —$NR^{42a}R^{32b}H^+$, —$SO_2R^{43}$, and —(C=O)$R^{44}$. In an even further aspect, $R^{3a}$ is hydrogen and each of $R^{3b}$, and $R^{3c}$ is independently selected from —$SR^{40}$, —$OR^{41}$, —$SO_2R^{43}$, and —(C=O) $R^{44}$. In a still further aspect, $R^{3a}$ is hydrogen and each of $R^{3b}$, and $R^{3c}$ is independently selected from —$SR^{40}$ and —$SO_2R^{43}$.

In a further aspect, $R^{3a}$ is hydrogen and each of $R^{3b}$, and $R^{3c}$ is independently selected from halogen, —CN, —$OR^{41}$, —$NR^{42a}R^{42b}$, —$NR^{42a}R^{42b}H^+$, and —(C=O)$R^{44}$. In a still further aspect, $R^{3a}$ is hydrogen and each of $R^{3b}$, and $R^{3c}$ is independently selected from —CN, —$OR^{41}$, —$NR^{42a}R^{42b}$, —$NR^{42a}R^{42b}H^+$, and —(C=O)$R^{44}$. In yet a further aspect, $R^{3a}$ is hydrogen and each of $R^{3b}$, and $R^{3c}$ is independently selected from —$OR^{41}$, —$NR^{42a}R^{42b}$, —$NR^{42a}R^{42b}H^+$, and —(C=O)$R^{44}$. In an even further aspect, $R^{3a}$ is hydrogen and each of $R^{3b}$, and $R^{3c}$ is independently selected from —$NR^{42a}R^{42b}$ and —$NR^{42a}R^{42b}H^+$.

In a further aspect, $R^{3a}$ is hydrogen and each of $R^{3b}$, and $R^{3c}$ is independently selected from halogen, —CN, —$OR^{41}$, and —(C=O)$R^{44}$. In a still further aspect, $R^{3a}$ is hydrogen and each of $R^{3b}$, and $R^{3c}$ is independently selected from —CN, —$OR^{41}$, and —(C=O)$R^{44}$. In yet a further aspect, $R^{3a}$ is hydrogen and each of $R^{3b}$, and $R^{3c}$ is independently selected from —$OR^{41}$ and —(C=O)$R^{44}$.

In a further aspect, $R^{3a}$ is hydrogen and each of $R^{3b}$, and $R^{3c}$ is halogen. In a still further aspect, $R^{3a}$ is hydrogen and each of $R^{3b}$, and $R^{3c}$ is selected from —Cl and —F. In yet a further aspect, $R^{3a}$ is hydrogen and each of $R^{3b}$, and $R^{3c}$ is —Cl. In an even further aspect, $R^{3a}$ is hydrogen and each of $R^{3b}$, and $R^{3c}$ is —F.

In a further aspect, each of $R^{3a}$ and $R^{3b}$ is hydrogen and $R^{3c}$ is selected from halogen, —CN, —$SR^{40}$, —$OR^{41}$, —$NR^{42a}R^{42b}$, —$NR^{42a}R^{42b}H^+$, —$SO_2R^{43}$, and —(C=O) $R^{44}$. In a still further aspect, each of $R^{3a}$ and $R^{3b}$ is hydrogen and $R^{3c}$ is selected from —CN, —$SR^{40}$, —$OR^{41}$, —$NR^{42a}R^{42b}$, —$NR^{42a}R^{42b}H^+$, —$SO_2R^{43}$, and —(C=O) $R^{44}$. In yet a further aspect, each of $R^{3a}$ and $R^{3b}$ is hydrogen and $R^{3c}$ is selected from —$SR^{40}$, —$OR^{41}$, —$NR^{42a}R^{42b}$, —$NR^{42a}R^{42b}H^+$, —$SO_2R^{43}$, and —(C=O)$R^{44}$. In an even further aspect, each of $R^{3a}$ and $R^{3b}$ is hydrogen and $R^{3c}$ is selected from —$SR^{40}$, —$OR^{41}$, —$SO_2R^{43}$, and —(C=O) $R^{44}$. In a still further aspect, each of $R^{3a}$ and $R^{3b}$ is hydrogen and $R^{3c}$ is selected from —$SR^{40}$ and —$SO_2R^{43}$. In yet a further aspect, each of $R^{3a}$ and $R^{3b}$ is hydrogen and $R^{3c}$ is —$SO_2R^{43}$. In an even further aspect, each of $R^{3a}$ and $R^{3b}$ is hydrogen and $R^{3c}$ is —$SR^{40}$.

In a further aspect, each of $R^{3a}$ and $R^{3b}$ is hydrogen and $R^{3c}$ is selected from halogen, —CN, —$OR^{41}$, —$NR^{42a}R^{42b}$, —$NR^{42a}R^{42b}H^+$, and —(C=O) $R^{44}$. In a still further aspect, each of $R^{3a}$ and $R^{3b}$ is hydrogen and $R^{3c}$ is selected from —CN, —OR$^{41}$, —NR$^{42a}$R$^{42b}$, —NR$^{42a}$R$^{42b}$H$^+$, and —(C=O)R$^{44}$. In yet a further aspect, each of $R^{3a}$ and $R^{3b}$ is hydrogen and $R^{3c}$ is selected from —OR$^{41}$, —NR$^{42a}$R$^{42b}$, —NR$^{42a}$R$^{42b}$H$^+$, and —(C=O)R$^{44}$. In an even further aspect, each of $R^{3a}$ and $R^{3b}$ is hydrogen and $R^{3c}$ is selected from —NR$^{42a}$R$^{42b}$ and —NR$^{42a}$R$^{42b}$H$^+$. In a still further aspect, each of $R^{3a}$ and $R^{3b}$ is hydrogen and $R^{3c}$ is —NR$^{42a}$R$^{42b}$H$^+$. In yet a further aspect, each of $R^{3a}$ and $R^{3b}$ is hydrogen and $R^{3c}$ is —NR$^{42a}$R$^{42b}$.

In a further aspect, each of $R^{3a}$ and $R^{3b}$ is hydrogen and $R^{3c}$ is selected from halogen, —CN, —OR$^{41}$, and —(C=O)R$^{44}$. In a still further aspect, each of $R^{3a}$ and $R^{3b}$ is hydrogen and $R^{3c}$ is selected from —CN, —OR$^{41}$, and —(C=O)R$^{44}$. In yet a further aspect, each of $R^{3a}$ and $R^{3b}$ is hydrogen and $R^{3c}$ is selected from —OR$^{41}$ and —(C=O)R$^{44}$. In an even further aspect, each of $R^{3a}$ and $R^{3b}$ is hydrogen and $R^{3c}$ is —(C=O)R$^{44}$. In a still further aspect, each of $R^{3a}$ and $R^{3b}$ is hydrogen and $R^{3c}$ is —OR$^{41}$.

In a further aspect, each of $R^{3a}$ and $R^{3b}$ is hydrogen and $R^{3c}$ is halogen. In a still further aspect, each of $R^{3a}$ and $R^{3c}$ is hydrogen and $R^{3c}$ is selected from —Cl and —F. In yet a further aspect, each of $R^{3a}$ and $R^{3b}$ is hydrogen and $R^{3c}$ is —Cl. In an even further aspect, each of $R^{3a}$ and $R^{3b}$ is hydrogen and $R^{3c}$ is —F.

In one aspect, at least one of $R^{2a}$, $R^{2b}$, $R^{3a}$, $R^{3b}$, and $R^{3c}$ is not hydrogen.

(7) $R^{20}$, $R^{21}$, and $R^{22}$ Groups

In one aspect, each of $R^{20}$, $R^{21}$, $R^{22a}$, and $R^{22b}$, when present, is independently selected from hydrogen, C1-C3 alkyl, C1-C3 monohaloalkyl, and C1-C3 polyhaloalkyl. In a further aspect, each of $R^{20}$, $R^{21}$, $R^{22a}$, and $R^{22b}$, when present, is hydrogen.

In a further aspect, each of $R^{20}$, $R^{21}$, $R^{22a}$, and $R^{22b}$, when present, is independently selected from hydrogen, C1-C3 monohaloalkyl, and C1-C3 polyhaloalkyl. In a still further aspect, each of $R^{20}$, $R^{21}$, $R^{22a}$, and $R^{22b}$, when present, is independently selected from hydrogen, —CH$_2$F, —CH$_2$Cl, —CH$_2$CH$_2$F, —CH$_2$CH$_2$Cl, —CHF$_2$, —CH$_2$CHF$_2$, —CF$_3$, —CH$_2$CF$_3$, —CHCl$_2$, —CH$_2$CHCl$_2$, —CCl$_3$, and —CH$_2$CCl$_3$. In yet a further aspect, each of $R^{20}$, $R^{21}$, $R^{22a}$, and $R^{22b}$, when present, is independently selected from hydrogen, —CHF$_2$, —CH$_2$CHF$_2$, —CF$_3$, —CH$_2$CF$_3$, —CHCl$_2$, —CH$_2$CHCl$_2$, —CCl$_3$, and —CH$_2$CCl$_3$. In an even further aspect, each of $R^{20}$, $R^{21}$, $R^{22a}$, and $R^{22b}$, when present, is independently selected from hydrogen, —CF$_3$, —CH$_2$CF$_3$, —CCl$_3$, and —CH$_2$CCl$_3$.

In a further aspect, each of $R^{20}$, $R^{21}$, $R^{22a}$, and $R^{22b}$, when present, is independently selected from, hydrogen and C1-C3 alkyl. In a still further aspect, each of $R^{20}$, $R^{21}$, $R^{22a}$, and $R^{22b}$, when present, is independently selected from hydrogen, methyl, and ethyl. In yet a further aspect, each of $R^{20}$, $R^{21}$, $R^{22a}$, and $R^{22b}$, when present, is independently selected from hydrogen and methyl.

In a further aspect, $R^{20}$, when present, is hydrogen and each of $R^{21}$, $R^{22a}$, and $R^{22b}$, when present, is independently selected from C1-C3 alkyl, C1-C3 monohaloalkyl, and C1-C3 polyhaloalkyl. In a still further aspect, $R^{20}$, when present, is hydrogen and each of $R^{21}$, $R^{22a}$, and $R^{22b}$, when present, is independently selected from C1-C3 monohaloalkyl, and C1-C3 polyhaloalkyl. In yet a further aspect, $R^{20}$, when present, is hydrogen and each of $R^{21}$, $R^{22a}$, and $R^{22b}$, when present, is independently selected from —CH$_2$F, —CH$_2$Cl, —CH$_2$CH$_2$F, —CH$_2$CH$_2$Cl, —CHF$_2$, —CH$_2$CHF$_2$, —CF$_3$, —CH$_2$CF$_3$, —CHCl$_2$, —CH$_2$CHCl$_2$, —CCl$_3$, and —CH$_2$CCl$_3$. In an even further aspect, $R^{20}$, when present, is hydrogen and each of $R^{21}$, $R^{22a}$, and $R^{22b}$, when present, is independently selected from —CHF$_2$, —CH$_2$CHF$_2$, —CF$_3$, —CH$_2$CF$_3$, —CHCl$_2$, —CH$_2$CHCl$_2$, —Cl$_3$, and —CH$_2$CCl$_3$. In a still further aspect, $R^{20}$, when present, is hydrogen and each of $R^{21}$, $R^{22a}$, and $R^{22b}$, when present, is independently selected from —CF$_3$, —CH$_2$CF$_3$, —CCl$_3$, and —CH$_2$CCl$_3$.

In a further aspect, $R^{20}$, when present, is hydrogen and each of $R^{21}$, $R^{22a}$, and $R^{22b}$, when present, is C1-C3 alkyl. In a still further aspect, $R^{20}$, when present, is hydrogen and each of $R^{21}$, $R^{22a}$, and $R^{22b}$, when present, is selected from methyl and ethyl. In yet a further aspect, $R^{20}$, when present, is hydrogen and each of $R^{21}$, $R^{22a}$, and $R^{22b}$, when present, is methyl.

In a further aspect, $R^{21}$, when present, is hydrogen and each of $R^{20}$, $R^{22a}$, and $R^{22b}$, when present, is independently selected from C1-C3 alkyl, C1-C3 monohaloalkyl, and C1-C3 polyhaloalkyl. In a still further aspect, $R^{21}$, when present, is hydrogen and each of $R^{20}$, $R^{22a}$, and $R^{22b}$, when present, is independently selected from C1-C3 monohaloalkyl, and C1-C3 polyhaloalkyl. In yet a further aspect, $R^{21}$, when present, is hydrogen and each of $R^{20}$, $R^{22a}$, and $R^{22b}$, when present, is independently selected from —CH$_2$F, —CH$_2$Cl, —CH$_2$CH$_2$F, —CH$_2$CH$_2$Cl, —CHF$_2$, —CH$_2$CHF$_2$, —CF$_3$, —CH$_2$CF$_3$, —CHCl$_2$, —CH$_2$CHCl$_2$, —CCl$_3$, and —CH$_2$CCl$_3$. In an even further aspect, $R^{21}$, when present, is hydrogen and each of $R^{20}$, $R^{22a}$, and $R^{22b}$, when present, is independently selected from —CHF$_2$, —CH$_2$CHF$_2$, —CF$_3$, —CH$_2$CF$_3$, —CHCl$_2$, —CH$_2$CHCl$_2$, —CCl$_3$, and —CH$_2$CCl$_3$. In a still further aspect, $R^{21}$, when present, is hydrogen and each of $R^{20}$, $R^{22a}$, and $R^{22b}$, when present, is independently selected from —CF$_3$, —CH$_2$CF$_3$, —CCl$_3$, and —CH$_2$CCl$_3$.

In a further aspect, $R^{21}$, when present, is hydrogen and each of $R^{20}$, $R^{22a}$, and $R^{22b}$, when present, is C1-C3 alkyl. In a still further aspect, $R^{21}$, when present, is hydrogen and each of $R^{50}$, $R^{22a}$, and $R^{22b}$, when present, is selected from methyl and ethyl. In yet a further aspect, $R^{21}$, when present, is hydrogen and each of $R^{20}$, $R^{22a}$, and $R^{22b}$, when present, is methyl.

In a further aspect, $R^{22a}$, when present, is hydrogen and each of $R^{20}$, $R^{21}$, and $R^{22b}$, when present, is independently selected from C1-C3 alkyl, C1-C3 monohaloalkyl, and C1-C3 polyhaloalkyl. In a still further aspect, $R^{22a}$, when present, is hydrogen and each of $R^{20}$, $R^{21}$, and $R^{22b}$, when present, is independently selected from C1-C3 monohaloalkyl, and C1-C3 polyhaloalkyl. In yet a further aspect, when present, is hydrogen and each of $R^{20}$, $R^{21}$, and $R^{22b}$, when present, is independently selected from —CH$_2$F, —CH$_2$Cl, —CH$_2$CH$_2$F, —CH$_2$CH$_2$Cl, —CHF$_2$, —CH$_2$CHF$_2$, —CF$_3$, —CH$_3$CF$_3$, —CHCl$_2$, —CH$_2$CHCl$_2$, —CCl$_3$, and —CH$_2$CCl$_3$. In an even further aspect, $R^{22a}$, when present, is hydrogen and each of $R^{20}$, $R^{21}$, and $R^{22b}$, when present, is independently selected from: —CHF$_2$, —CH$_2$CHF$_2$, —CF$_3$, —CH$_2$CF$_3$, —CHCl$_2$, —CH$_2$CHCl$_2$, —CCl$_3$, and —CH$_2$CCl$_3$. In a still further aspect, $R^{22a}$, when present, is hydrogen and each of $R^{20}$, $R^{21}$, and $R^{22b}$, when present, is independently selected from —CF$_3$, —CH$_2$CF$_3$, —CCl$_3$, and —CH$_2$CCl$_3$.

In a further aspect, $R^{22a}$, when present, is hydrogen and each of $R^{20}$, $R^{21}$, and $R^{22b}$, when present, is C1-C3 alkyl. In a still further aspect, $R^{22a}$, when present, is hydrogen and each of $R^{20}$, $R^{21}$, and $R^{22b}$, when present, is selected from methyl and ethyl. In yet a further aspect, $R^{22a}$, when present, is hydrogen and each of $R^{20}$, $R^{21}$, and $R^{22b}$, when present, is methyl.

In a further aspect, each of $R^{20}$ and $R^{21}$, when present, is hydrogen and each of $R^{22a}$ and $R^{22b}$, when present, is independently selected from C1-C3 alkyl, C1-C3 monohaloalkyl, and C1-C3 polyhaloalkyl. In a still further aspect, each of $R^{20}$ and $R^{21}$, when present, is hydrogen and each of $R^{22a}$ and $R^{22b}$, when present, is independently selected from C1-C3 monohaloalkyl, and C1-C3 polyhaloalkyl. In yet a further aspect, each of $R^{20}$ and $R^{21}$, when present, is hydrogen and each of $R^{22a}$ and $R^{22b}$, when present, is independently selected from —CH$_2$F, —CH$_2$Cl, —CH$_2$CH$_2$F, —CH$_2$CH$_2$Cl, —CHF$_2$, —CH$_2$CHF$_2$, —CF$_3$, —CH$_2$CF$_3$, —CHCl$_2$, —CH$_2$CHCl$_2$, —CCl$_3$, and —CH$_2$CCl$_3$. In an even further aspect, each of $R^{20}$ and $R^{21}$, when present, is hydrogen and each of $R^{22a}$ and $R^{22b}$, when present, is independently selected from —CHF$_2$, —CH$_2$CHF$_2$, —CF$_3$, —CH$_2$CF$_3$, —CHCl$_2$, —CH$_2$CHCl$_2$, —CCl$_3$, and —CH$_2$CCl$_3$. In a still further aspect, each of $R^{20}$ and $R^{21}$, when present, is hydrogen and each of $R^{22a}$ and $R^{22b}$, when present, is independently selected from —CF$_3$, —CH$_2$CF$_3$, —CCl$_3$, and —CH$_2$CCl$_3$.

In a further aspect, each of $R^{20}$ and $R^{21}$, when present, is hydrogen and each of $R^{22a}$ and when present, is C1-C3 alkyl. In a still further aspect, each of $R^{20}$ and $R^{21}$, when present, is hydrogen and each of $R^{22a}$ and $R^{22b}$, when present, is independently selected from methyl and ethyl. In yet a further aspect, each of $R^{20}$ and $R^{21}$, when present, is hydrogen and each of $R^{22a}$ and $R^{22b}$, when present, is methyl.

In a further aspect, each of $R^{20}$, $R^{21}$, and $R^{22a}$ is hydrogen and $R^{22b}$ is selected from C1-C3 alkyl, C1-C3 monohaloalkyl and C1-C3 polyhaloalkyl. In a still further aspect, each of $R^{20}$, $R^{21}$, and $R^{22a}$ is hydrogen and $R^{22b}$ is selected from C1-C3 monohaloalkyl, and C1-C3 polyhaloalkyl. In yet a further aspect, each of $R^{20}$, $R^{21}$, and $R^{22a}$ is hydrogen and $R^{22b}$ is selected from —CH$_2$F, —CH$_2$Cl, —CH$_2$CH$_2$F, —CH$_2$CH$_2$Cl, —CHF$_2$, —CH$_2$CHF$_2$, —CF$_3$, —CH$_2$CF$_3$, —CHCl$_2$, —CH$_2$CHCl$_2$, —CCl$_3$, and —CH$_2$CCl$_3$. In an even further aspect, each of $R^{20}$, $R^{21}$, and $R^{22a}$ is hydrogen and $R^{22b}$ is selected from —CHF$_2$, —CH$_2$CHF$_2$, —CF$_3$, —CH$_2$CF$_3$, —CHCl$_2$, —CH$_2$CHCl$_2$, —CCl$_3$, and —CH$_2$CCl$_3$. In a still further aspect, each of $R^{20}$, $R^{21}$, and $R^{22}$ is hydrogen and $R^{22b}$ is selected from —CF$_5$, —CH$_2$CF$_3$, —CCl$_3$, and —CH$_2$CCl$_3$.

In a further aspect, each of $R^{20}$, $R^{21}$, and $R^{22a}$ is hydrogen and $R^{22b}$ is C1-C3 alkyl. In a still further aspect, each of $R^{20}$, $R^{21}$, and $R^{22a}$ is hydrogen and $R^{22b}$ is selected from methyl and ethyl. In yet a further aspect, each of $R^{20}$, $R^{21}$, and $R^{22b}$ is hydrogen and $R^{22b}$ is methyl.

(8) $R^{23}$ and $R^{24}$ Groups

In one aspect, each of $R^{23}$ and $R^{24}$, when present, is independently selected from —O⁻, —OR$^{25}$, C1-C3 alkyl, C1-C3 monohaloalkyl, C1-C3 polyhaloalkyl, and —NR$^{26a}$R$^{26b}$. In a further aspect, each of $R^{23}$ and $R^{24}$, when present, is independently selected from —O⁻, —OR$^{25}$, and —NR$^{22a}$R$^{26b}$. In a still further aspect, each of $R^{23}$ and $R^{24}$, when present, is independently selected from —OR$^{25}$ and —NR$^{22a}$R$^{26b}$. In yet a further aspect, each of $R^{23}$ and $R^{24}$, when present, is —OR$^{25}$. In an even further aspect, each of $R^{23}$ and $R^{24}$, when present, is —NR$^{26a}$R$^{26b}$.

In a further aspect, each of $R^{23}$ and $R^{24}$, when present, is independently selected from C1-C3 alkyl, C1-C3 monohaloalkyl, and C1-C3 polyhaloalkyl. In a still further aspect, each of $R^{23}$ and $R^{24}$, when present, is independently selected from methyl, ethyl, —CH$_2$F, —CH$_2$Cl, —CH$_2$CH$_2$F, —CH$_2$CH$_2$Cl, —CHF$_2$, —CH$_2$CHF$_2$, —CF$_3$, —CH$_2$CF$_3$, —CHCl$_2$, —CH$_2$CHCl$_2$, —CCl$_3$, and —CH$_2$CCl$_3$. In yet a further aspect, each of $R^{23}$ and $R^{24}$, when present, is independently selected from methyl, —CH$_2$F, —CH$_2$Cl, —CHF$_2$, —CF$_3$, —CHCl$_2$, and —CCl$_3$.

(9) $R^{25}$ and $R^{26}$ Groups

In one aspect, each of $R^{25}$, $R^{26a}$, and $R^{26b}$, when present, is independently selected from hydrogen, C1-C3 alkyl, C1-C3 monohaloalkyl, and C1-C3 polyhaloalkyl. In a further aspect, each of $R^{25}$, $R^{26a}$, and $R^{26b}$, when present, is hydrogen.

In a further aspect, each of $R^{25}$, $R^{26a}$, and $R^{26b}$, when present, is independently selected from hydrogen, C1-C3 monohaloalkyl, and C1-C3 polyhaloalkyl. In a still further aspect, each of $R^{25}$, $R^{26a}$, and $R^{26b}$, when present, is independently selected from hydrogen, —CH$_2$F, —CH$_2$Cl, —CH$_2$CH$_2$F, —CH$_2$CH$_2$Cl, —CHF$_2$, —CH$_2$CHF$_2$, —CF$_3$, —CH$_2$CF$_3$, —CHCl$_2$, —CH$_2$CHCl$_2$, —CCl$_3$, and —CH$_2$CCl$_3$. In yet a further aspect, each of $R^{25}$, $R^{26a}$, and $R^{26b}$, when present, is independently selected from hydrogen, —CH$_2$F, —CH$_2$Cl, —CHF$_2$, —CF$_3$, —CHCl$_2$, and —CCl$_3$.

In a further aspect, each of $R^{25}$, $R^{26a}$, and $R^{26b}$, when present, is independently selected from hydrogen and C1-C3 alkyl. In a still further aspect, each of $R^{25}$, $R^{26a}$, and $R^{26b}$, when present, is independently selected from hydrogen, methyl and ethyl. In yet a further aspect, each of $R^{25}$, $R^{26a}$, and $R^{26b}$ when, present, is independently selected from hydrogen and methyl.

In a further aspect, $R^{25}$ is hydrogen and each of $R^{26a}$ and $R^{26b}$ is independently selected from C1-C3 alkyl, C1-C3 monohaloalkyl, and C1-C3 polyhaloalkyl. In a still further aspect, $R^{25}$ is hydrogen and each of $R^{26a}$ and $R^{26b}$ is independently selected from C1-C3 alkyl, C1-C3 monohaloalkyl and C1-C3 polyhaloalkyl. In yet a further aspect, $R^{25}$ is hydrogen and each of $R^{26a}$ and $R^{26b}$ is independently selected from methyl ethyl, —CH$_2$F, —CH$_2$Cl, —CH$_2$CH$_2$F, —CH$_2$CH$_2$Cl, —CHF$_2$, —CH$_2$CHF$_1$, —CF$_3$, —CH$_2$CF$_3$, —CHCl$_2$, —CH$_2$CHCl$_2$, —CCl$_3$, and —CH$_2$CCl$_3$. In an even further aspect, $R^{25}$ is hydrogen and each of $R^{26a}$ and $R^{26b}$ is independently selected from methyl —CH$_2$F, —CH$_2$Cl, —CHF$_2$, —CF$_3$, —CHCl$_2$, —CCl$_3$.

In a further aspect, $R^{26a}$ is hydrogen and each of $R^{25}$ and $R^{26b}$ is independently selected from C1-C3 alkyl C1-C3 monohaloalkyl, and C1-C3 polyhaloalkyl. In a still further aspect, $R^{26a}$ is hydrogen and each of $R^{14}$ and $R^{26b}$ is independently selected from C1-C3 alkyl, C1-C3 monohaloalkyl, and C1-C3 polyhaloalkyl. In yet a further aspect, $R^{26a}$ is hydrogen and each of $R^{24}$ and $R^{26b}$ is independently selected from methyl ethyl, —CH$_2$F, —CH$_2$Cl, —CH$_2$CH$_2$F, —CH$_2$CH$_2$Cl, —CHF$_2$, —CH$_2$CHF$_2$, —CF$_3$, —CH$_2$CF$_3$, —CHCl$_1$, —CH$_2$CHCl$_2$, —CCl$_3$, and —CH$_2$CCl$_3$. In an even further aspect, $R^{26a}$ is hydrogen and each of $R^{25}$ and $R^{26b}$ is independently selected from methyl —CH$_2$F, —CH$_2$Cl, —CHF$_2$, —CF$_3$, —CHCl$_2$, and —CCl$_3$.

In a further aspect, each of $R^{25}$ and $R^{26a}$ is hydrogen and $R^{26b}$ is selected from C1-C3 alkyl, C1-C3 monohaloalkyl and C1-C3 polyhaloalkyl. In a still further aspect, each of $R^{25}$ and $R^{26a}$ is hydrogen and $R^{26b}$ is selected from methyl, ethyl, —CH$_2$F, —CH$_2$Cl, —CH$_2$CH$_2$F, —CH$_2$CH$_2$Cl, —CHF$_2$, —CH$_2$CHF$_2$, —CF$_3$, —CH$_2$CF$_3$, —CHCl$_2$, —CH$_2$CHCl$_2$, —CCl$_3$, and —CH$_2$CCl$_3$. In yet a further aspect, each of $R^{25}$ and $R^{26a}$ is hydrogen and $R^{26b}$ is selected from methyl, —CH$_2$F, —CH$_2$Cl, —CHF$_2$, —CF$_3$, —CHCl$_2$, and —CCl$_3$.

(10) $R^{30}$, $R^{31}$, and $R^{32}$ Groups

In one aspect, each of $R^{30}$, $R^{31}$, $R^{32a}$, and $R^{32b}$, when present, is independently selected from hydrogen, C1-C3 alkyl, C1-C3 monohaloalkyl, and C1-C3 polyhaloalkyl. In a further aspect, each of $R^{30}$, $R^{31}$, $R^{32a}$, and $R^{32b}$, when present, is hydrogen.

In a further aspect, each of $R^{30}$, $R^{31}$, $R^{32a}$, and $R^{32b}$, when present, is independently selected from hydrogen, C1-C3 monohaloalkyl, and C1-C3 polyhaloalkyl. In a still further aspect, each of $R^{30}$, $R^{31}$, $R^{32a}$, and $R^{32b}$, when present, is independently selected from hydrogen, —$CH_2F$, —$CH_2Cl$, —$CH_2CH_2F$, —$CH_2CH_2Cl$, —$CHF_2$, —$CH_2CHF_2$, —$CF_3$, —$CH_2CF_3$, —$CHCl_2$, —$CH_2CHCl_2$, —$CCl_3$, and —$CH_2CCl_3$. In yet a further aspect, each of $R^{30}$, $R^{31}$, $R^{32a}$, and $R^{32b}$, when present, is independently selected from hydrogen, —$CHF_2$, —$CH_2CHF_2$, —$CF_3$, —$CH_2CF_3$, —$CHCl_2$, —$CH_2CHCl_2$, —$CCl_3$, and —$CH_2CCl_3$. In an even further aspect, each of $R^{30}$, $R^{31}$, $R^{32a}$, and $R^{32b}$, when present, is independently selected from hydrogen, —$CF_3$, —$CH_2CF_3$, —$CCl_3$, and —$CH_2CCl_3$.

In a further aspect, each of $R^{30}$, $R^{31}$, $R^{32a}$, and $R^{32b}$, when present, is independently selected from hydrogen and C1-C3 alkyl. In a still further aspect, each of $R^{30}$, $R^{31}$, $R^{32a}$, and $R^{32b}$, when present, is independently selected from hydrogen, methyl, and ethyl. In yet a further aspect, each of $R^{30}$, $R^{31}$, $R^{32a}$, and $R^{32b}$, when present, is independently selected from hydrogen and methyl.

In a further aspect, $R^{30}$, when present, is hydrogen and each of $R^{31}$, $R^{32a}$, and $R^{32b}$, when present, is independently selected from C1-C3 alkyl, C1-C3 monohaloalkyl, and C1-C3 polyhaloalkyl. In a still further aspect, $R^{30}$, when present, is hydrogen and each of $R^{31}$, $R^{32a}$, and $R^{32b}$, when present, is independently selected from C1-C3 monohaloalkyl, and C1-C3 polyhaloalkyl. In yet a further aspect, $R^{30}$, when present, is hydrogen and each of $R^{31}$, $R^{32a}$, and $R^{32b}$, when present, is independently selected from —$CH_2F$, —$CH_2Cl$, —$CH_2CH_2F$, —$CH_2CH_2Cl$, —$CHF_2$, —$CH_2CHF_2$, —$CF_3$, —$CH_2CF_3$, —$CHCl_2$, —$CH_2CHCl_2$, —$CCl_3$, and —$CH_2CCl_3$. In an even further aspect, $R^{30}$, when present, is hydrogen and each of $R^{31}$, $R^{32a}$, and $R^{32b}$, when present, is independently selected from —$CHF_2$, —$CH_2CHF_2$, —$CF_3$, —$CH_2CF_3$, —$CHCl_2$, —$CH_2CHCl_2$, —$CCl_3$, and —$CH_2CCl_3$. In a still further aspect, $R^{30}$, when present, is hydrogen and each of $R^{31}$, $R^{32a}$, and $R^{32b}$, when present, is independently selected from —$CF_2$, —$CH_2CF_3$, —$CCl_3$, and —$CH_2CCl_3$.

In a further aspect, $R^{30}$, when present, is hydrogen and each of $R^{31}$, $R^{32a}$, and $R^{32b}$, when present, is C1-C3 alkyl. In a still further aspect, $R^{30}$, when present, is hydrogen and each of $R^{31}$, $R^{32a}$, and $R^{32b}$, when present, is selected from methyl and ethyl. In yet a further aspect, $R^{30}$, when present, is hydrogen and each of $R^{31}$, $R^{32a}$, and $R^{32b}$, when present, is methyl.

In a further aspect, $R^{31}$, when present, is hydrogen and each of $R^{30}$, $R^{32a}$, and $R^{32b}$, when present, is independently selected from C1-C3 alkyl, C1-C3 monohaloalkyl and C1-C3 polyhaloalkyl. In a still further aspect, $R^{31}$, when present, is hydrogen and each of $R^{30}$, $R^{32a}$, and $R^{32b}$, when present, is independently selected from C1-C3 monohaloalkyl, and C1-C3 polyhaloalkyl. In yet a further aspect, $R^{31}$, when present, is hydrogen and each of $R^{30}$, $R^{32a}$, and $R^{32b}$, when present, is independently selected from —$CH_2F$, —$CH_2Cl$, —$CH_2CH_2F$, —$CH_2CH_2Cl$, —$CHF_2$, —$CH_2CHF_2$, —$CF_3$, —$CH_2CF_3$, —$CHCl_2$, —$CH_2CHCl_2$, —$CCl_3$, and —$CH_2CCl_3$. In an even further aspect, $R^{31}$, when present, is hydrogen and each of $R^{30}$, $R^{32a}$, and $R^{32b}$, when present, is independently selected from —$CHF_2$, —$CH_2CHF_2$, —$CF_3$, —$CH_2CF_3$, —$CHCl_2$, —$CH_2CHCl_2$, —$CCl_3$, and —$CH_2CCl_3$. In a still further aspect, $R^{31}$, when present, is hydrogen and each of $R^{30}$, $R^{32a}$, and $R^{32b}$, when present, is independently selected from —$CF_3$, —$CH_2CF_3$, —$CCl_3$, and —$CH_2CCl_3$.

In a further aspect, $R^{31}$, when present, is hydrogen and each of $R^{30}$, $R^{32a}$, and $R^{32b}$, when present, is C1-C3 alkyl. In a still further aspect, $R^{31}$, when present, is hydrogen and each of $R^{30}$, $R^{32a}$, and $R^{32b}$, when present, is selected from methyl and ethyl. In yet a further aspect, $R^{31}$, when present, is hydrogen and each of $R^{30}$, $R^{32a}$, and $R^{32b}$, when present, is methyl.

In a further aspect, $R^{32a}$, when present, is hydrogen and each of $R^{30}$, $R^{31}$, and $R^{32b}$, when present, is independently selected from C1-C3 alkyl, C1-C3 monohaloalkyl and C1-C3 polyhaloalkyl. In a still further aspect, $R^{32a}$, when present, is hydrogen and each of $R^{30}$, $R^{31}$, and $R^{32b}$, when present, is independently selected from C1-C3 monohaloalkyl, and C1-C3 polyhaloalkyl. In yet a further aspect, $R^{32a}$, when present, is hydrogen and each of $R^{30}$, $R^{31}$, and $R^{32b}$, when present, is independently selected from —$CH_2F$, —$CH_2Cl$, —$CH_2CH_2F$, —$CH_2CH_2Cl$, —$CHF_2$, —$CH_2CHF_2$, —$CF_3$, —$CH_2CF_3$, —$CHCl_2$, —$CH_2CHCl_2$, —$CCl_3$, and —$CH_2CCl_3$. In an even further aspect, $R^{32a}$, when present, is hydrogen and each of $R^{30}$, $R^{31}$, and $R^{32b}$, when present, is independently selected from —$CHF_2$, —$CH_2CHF_2$, —$CF_3$, —$CH_2CF_3$, —$CHCl_2$, —$CH_2CHCl_2$, —$CCl_3$ and —$CH_2CCl_3$. In a still further aspect, $R^{32a}$, when present, is hydrogen and each of $R^{30}$, $R^{31}$, and $R^{32b}$, when present, is independently selected from —$CF_3$, —$CH_2CF_3$, —$CCl_2$, and —$CH_2CCl_3$.

In a further aspect, $R^{32a}$, when present, is hydrogen and each of $R^{30}$, $R^{31}$, and $R^{32b}$, when present, is C1-C3 alkyl. In a still further aspect, $R^{32a}$, when present, is hydrogen and each of $R^{30}$, $R^{31}$, and $R^{32b}$, when present, is selected from methyl and ethyl. In yet a further aspect, $R^{32a}$, when present, is hydrogen and each of $R^{30}$, $R^{31}$, and $R^{32b}$, when present, is methyl.

In a further aspect, each of $R^{30}$ and $R^{31}$, when present, is hydrogen and each of $R^{32a}$ and $R^{32b}$, when present, is independently selected from C1-C3 alkyl, C1-C3 monohaloalkyl, and C1-C3 polyhaloalkyl. In a still further aspect, each of $R^{30}$ and $R^{31}$, when present, is hydrogen and each of $R^{32a}$ and $R^{32b}$, when present, is independently selected from C1-C3 monohaloalkyl, and C1-C3 polyhaloalkyl. In yet a further aspect, each of $R^{30}$ and $R^{31}$, when present, is hydrogen and each of $R^{32a}$ and $R^{32b}$, when present, is independently selected from —$CH_2F$, —$CH_2Cl$, —$CH_2CH_2F$, —$CH_2CH_2Cl$, —$CHF_2$, —$CH_2CHF_2$, —$CF_3$, —$CH_2CF_3$, —$CHCl_2$, —$CH_2CHCl_2$, —$CCl_3$, and —$CH_2CCl_3$. In an even further aspect, each of $R^{30}$ and $R^{31}$, when present, is hydrogen and each of $R^{32a}$ and $R^{32b}$, when present, is independently selected from —$CHF_2$, —$CH_2CHF_2$, —$CF_3$, —$CH_2CF_2$, —$CHCl_2$, —$CH_2CHCl_3$, —$CCl_3$, and —$CH_2CCl_3$. In a still further aspect, each of $R^{30}$ and $R^{31}$, when present, is hydrogen and each of $R^{32a}$ and $R^{32b}$ when present, is independently selected from —$CF_3$, —$CH_2CF_3$, —$CCl_3$, and —$CH_2CCl_3$.

In a further aspect, each of $R^{30}$ and $R^{31}$, when present, is hydrogen and each of $R^{32a}$ and $R^{32b}$, when present, is C1-C3 alkyl. In a still farther aspect, each of $R^{30}$ and $R^{31}$, when present, is hydrogen and each of $R^{32a}$ and $R^{32b}$, when present, is independently selected from methyl and ethyl. In yet a further aspect, each of $R^{30}$ and $R^{31}$, when present, is hydrogen and each of $R^{32a}$ and $R^{32b}$, when present, is methyl.

In a further aspect, each of $R^{30}$, $R^{31}$, and $R^{32a}$ is hydrogen and $R^{32b}$ is selected from C1-C3 alkyl, C1-C3 monohaloalkyl, and C1-C3 polyhaloalkyl. In a still further aspect, each of $R^{30}$, $R^{31}$, and $R^{32a}$ is hydrogen and $R^{32b}$ is selected from C1-C3 monohaloalkyl and C1-C3 polyhaloalkyl. In yet a further aspect, each of $R^{30}$, $R^{31}$, and $R^{32a}$ is hydrogen and $R^{32b}$ is selected from —$CH_2F$, —$CH_2Cl$, —$CH_2CH_2F$, —$CH_2CH_2Cl$, —$CHF_2$, —$CH_2CHF_2$, —$CF_3$, —$CH_2CF_3$, —$CHCl_2$, —$CH_2CHCl_2$, —$CCl_3$, and —$CH_2CCl_3$. In an even further aspect, each of $R^{30}$, $R^{31}$, and $R^{32a}$ is hydrogen and $R^{32b}$ is selected from —$CHF_2$, —$CH_2CHF_2$, —$CF_3$, —$CH_2CF_3$, —$CHCl_2$, —$CH_2CHCl_1$, —$CCl_3$, and —$CH_2CCl_3$. In a still further aspect, each of $R^{30}$, $R^{31}$, and $R^{32a}$ is hydrogen and $R^{32b}$ is selected from —$CF_3$, —$CH_2CF_3$, —$CCl_3$, and —$CH_2CCl_3$.

In a further aspect, each of $R^{30}$, $R^{31}$, and $R^{32a}$ is hydrogen and $R^{32b}$ is C1-C3 alkyl. In a still further aspect, each of $R^{30}$, and $R^{31}$, and $R^{32a}$ is hydrogen and $R^{32b}$ is selected from methyl and ethyl. In yet a further aspect, each of $R^{30}$, $R^{31}$, and $R^{32a}$ is hydrogen and $R^{32b}$ is methyl.

(11) $R^{33}$ and $R^{34}$ Groups

In one aspect, each of $R^{33}$ and $R^{34}$ when present, is independently selected from —$O^-$, —$OR^{35}$, C1-C3 alkyl, C1-C3 monohaloalkyl, C1-C3 polyhaloalkyl, and —$NR^{36a}R^{36b}$. In a further aspect, each of $R^{33}$ and $R^{34}$, when present, is independently selected from —$O^-$, —$OR^{35}$, and —$NR^{36a}R^{36b}$. In a still further aspect, each of $R^{33}$ and $R^{34}$, when present, is independently selected from —$OR^{35}$ and —$NR^{36a}R^{36b}$. In yet a further aspect, each of $R^{33}$ and $R^{34}$, when present, is —$OR^{35}$. In an even further aspect, each of $R^{33}$ and $R^{34}$, when present, is —$NR^{36a}R^{36b}$.

In a further aspect, each of $R^{33}$ and $R^{34}$, when present, is independently selected from C1-C3 alkyl, C1-C3 monohaloalkyl and C1-C3 polyhaloalkyl. In a still further aspect, each of $R^{33}$ and $R^{34}$, when present, is independently selected from methyl, ethyl, —$CH_2F$, —$CH_2Cl$, —$CH_2CH_2F$, —$CH_2CH_2Cl$, —$CHF_2$, —$CH_2CHF_2$, —$CF_3$, —$CH_2CF_3$, —$CHCl_2$, —$CH_2CHCl_2$, —$CCl_3$, and —$CH_2CCl_3$. In yet a further aspect, each of $R^{33}$ and $R^{34}$, when present, is independently selected from methyl —$CH_2F$, —$CH_2Cl$, —$CHF_2$, —$CF_3$, —$CHCl_2$, —$CCl_3$, and —$CH_2CCl_3$.

(12) $R^{35}$ and $R^{36}$ Groups

In one aspect, each of $R^{35}$, $R^{36a}$, and $R^{36b}$, when present, is independently selected from hydrogen, C1-C3 alkyl, C1-C3 monohaloalkyl, and C1-C3 polyhaloalkyl. In a further aspect, each of $R^{35}$, $R^{36a}$, and $R^{36b}$, when present, is hydrogen.

In a further aspect, each of $R^{35}$, $R^{36a}$, and $R^{36b}$, when present, is independently selected from hydrogen, C1-C3 monohaloalkyl, and C1-C3 polyhaloalkyl. In a still further aspect, each of $R^{35}$, $R^{36a}$ and $R^{36b}$, when present, is independently selected from hydrogen, —$CH_2F$, —$CH_2Cl$, —$CH_2CH_2F$, —$CH_2CH_2Cl$, —$CHF_2$, —$CH_2CHF_2$, —$CF_3$, —$CH_2CF_3$, —$CHCl_2$, —$CH_2CHCl_2$, —$CCl_2$, and —$CH_2CCl_3$. In yet a further aspect, each of $R^{35}$, $R^{36a}$, and $R^{36b}$, when present, is independently selected from hydrogen, —$CH_2F$, —$CH_2Cl$, —$CHF_2$, —$CF_3$, —$CHCl_2$, and —$CCl_3$.

In a further aspect, each of $R^{35}$, $R^{36a}$, and $R^{36b}$, when present, is independently selected from hydrogen and C1-C3 alkyl. In a still further aspect, each of $R^{35}$, $R^{36a}$, and $R^{36b}$, when present, is independently selected from hydrogen, methyl and ethyl. In yet a further aspect, each of $R^{35}$, $R^{36a}$, and $R^{36b}$, when present, is independently selected from hydrogen and methyl.

In a further aspect, $R^{35}$ is hydrogen and each of $R^{36a}$ and $R^{33b}$ is independently selected from C1-C3 alkyl, C1-C3 monohaloalkyl and C1-C3 polyhaloalkyl. In a still further aspect, $R^{35}$ is hydrogen and each of $R^{36a}$ and $R^{36b}$ is independently selected from C1-C3 alkyl, C1-C3 monohaloalkyl, and C1-C3 polyhaloalkyl. In yet a further aspect, $R^{35}$ is hydrogen and each of $R^{36a}$ and $R^{36b}$ is independently selected from methyl ethyl —$CH_2F$, —$CH_2Cl$, —$CH_2CH_2F$, —$CH_2CH_2Cl$, —$CHF_2$, —$CH_2CHF_2$, —$CF_3$, —$CH_2CF_3$, —$CHCl_2$, —$CH_2CHCl_2$, —$CCl_3$, and —$CH_2CCl_3$. In an even further aspect, $R^{35}$ is hydrogen and each of $R^{36a}$ and $R^{36b}$ is independently selected from methyl, —$CH_2F$, —$CH_2Cl$, —$CHF_2$, —$CF_3$, —$CHCl_2$, —$CCl_3$.

In a further aspect, $R^{36a}$ is hydrogen and each of $R^{35}$ and $R^{36b}$ is independently selected from C1-C3 alkyl, C1-C3 monohaloalkyl, and C1-C3 polyhaloalkyl. In a still further aspect, $R^{36a}$ is hydrogen and each of $R^{35}$ and $R^{36b}$ is independently selected from C1-C3 alkyl, C1-C3 monohaloalkyl and C1-C3 polyhaloalkyl. In yet a further aspect, $R^{36a}$ is hydrogen and each of $R^{35}$ and $R^{36b}$ is independently selected from methyl, ethyl, —$CH_2F$, —$CH_2Cl$, —$CH_2CH_2F$, —$CH_2CH_2Cl$, —$CHF_2$, —$CH_2CHF_2$, —$CF_3$, —$CH_2CF_3$, —$CHCl_2$, —$CH_2CHCl_2$, —$CCl_3$, and —$CH_2CCl_3$. In an even further aspect, $R^{36a}$ is hydrogen and each of $R^{35}$ and $R^{36b}$ is independently selected from methyl, —$CH_2F$, —$CH_2Cl$, —$CHF_2$, —$CF_3$, —$CHCl_2$, and —$CCl_3$.

In a further aspect, each of $R^{35}$ and $R^{36a}$ is hydrogen and $R^{36b}$ is selected from C1-C3 alkyl, C1-C3 monohaloalkyl, and C1-C3 polyhaloalkyl. In a still further aspect, each of $R^{35}$ and $R^{24a}$ is hydrogen and $R^{36b}$ is selected from methyl, ethyl, —$CH_2F$, —$CH_2Cl$, —$CH_2CH_2F$, —$CH_2CH_2Cl$, —$CHF_2$, —$CH_2CHF_2$, —$CF_3$, —$CH_2CF_3$, —$CHCl_2$, —$CH_2CHCl_2$, —$CCl_3$, and —$CH_2CCl_3$. In yet a further aspect, each of $R^{35}$ and $R^{36a}$ is hydrogen and $R^{36b}$ is selected from methyl, —$CH_2F$, —$CH_2Cl$, —$CHF_2$, —$CF_3$, —$CHCl_2$, and —$CCl_3$.

(13) $R^{40}$, $R^{41}$, and $R^{42}$ Groups

In one aspect, each of $R^{40}$, $R^{41}$, $R^{42a}$, and $R^{42b}$, when present, is independently selected from hydrogen, C1-C3 alkyl, C1-C3 monohaloalkyl, and C1-C3 polyhaloalkyl. In a further aspect, each of $R^{40}$, $R^{41}$, $R^{42a}$, and $R^{42b}$, when present, is hydrogen.

In a further aspect, each of $R^{40}$, $R^{41}$, $R^{42a}$, and $R^{42b}$, when present, is independently selected from hydrogen, C1-C3 monohaloalkyl, and C1-C3 polyhaloalkyl. In a still further aspect, each of $R^{40}$, $R^{41}$, $R^{42a}$, and $R^{42b}$, when present, is independently selected from hydrogen, —$CH_2F$, —$CH_2Cl$, —$CH_2CH_2F$, —$CH_2CH_2Cl$, —$CHF_2$, —$CH_2CHF_2$, —$CF_3$, —$CH_2CF_3$, —$CHCl_2$, —$CH_2CHCl_2$, —$CCl_3$, and —$CH_2CCl_3$. In yet a further aspect, each of $R^{40}$, $R^{41}$, $R^{42a}$, and $R^{42b}$, and when present, is independently selected from hydrogen, —$CHF_2$, —$CH_2CHF_2$, —$CF_3$, —$CH_2CF_3$, —$CHCl_2$, —$CH_2CHCl_2$, —$CCl_3$, and —$CH_2CCl_3$. In an even further aspect, each of $R^{40}$, $R^{41}$, $R^{42a}$, and $R^{42b}$, when present, is independently selected from hydrogen, —$CF_3$, —$CH_2CF_3$, —$CCl_3$, and —$CH_2CCl_3$.

In a further aspect, each of $R^{40}$, $R^{41}$, $R^{42a}$, and $R^{42b}$, when present, is independently selected from hydrogen and C1-C3 alkyl. In a still further aspect, each of $R^{40}$, $R^{41}$, $R^{42a}$, and $R^{42b}$, when present, is independently selected from hydrogen, methyl, and ethyl. In yet a further aspect, each of $R^{40}$, $R^{41}$, $R^{42a}$, and $R^{42b}$, when present, is independently selected from hydrogen and methyl.

In a further aspect, $R^{40}$, when present, is hydrogen and each of $R^{41}$, $R^{42a}$, and $R^{42b}$ when present, is independently selected from C1-C3 alkyl, C1-C3 monohaloalkyl, and C1-C3 polyhaloalkyl. In a still further aspect, $R^{40}$, when present, is hydrogen and each of $R^{41}$, $R^{42a}$, and $R^{42b}$, when present, is independently selected from C1-C3 monohaloalkyl, and C1-C3 polyhaloalkyl. In yet a further aspect, $R^{40}$, when present, is hydrogen and each of $R^{41}$, $R^{42a}$, and $R^{42b}$, when present, is independently selected from —$CH_2F$, —$CH_2Cl$, —$CH_2CH_2F$, —$CH_2CH_2Cl$, —$CHF_2$, —$CH_2CHF_2$, —$CF_3$, —$CH_2CF_3$, —$CHCl_2$, —$CH_2CHCl_2$, —$CCl_3$, and —$CH_2CCl_3$. In an even further aspect, $R^{40}$, when present is hydrogen and each of $R^{41}$, $R^{42a}$, and $R^{42b}$, when present, is independently selected from —CHF$_2$, —CH$_2$CHF$_2$, —CF$_3$, —CH$_2$CF$_3$, —CHCl$_2$, —CH$_2$CHCl$_2$, —CCl$_3$, and —CH$_2$CCl$_3$. In a still further aspect $R^{40}$, when present, is hydrogen and each of $R^{41}$, $R^{42a}$, and $R^{42b}$, when present, is independently selected from —CF$_3$, —CH$_2$CF$_3$, —CCl$_3$, and —CH$_3$CCl$_3$.

In a further aspect, $R^{40}$, when present, is hydrogen and each of $R^{41}$, $R^{42a}$, and $R^{42b}$, when present, is C1-C3 alkyl. In a still further aspect, $R^{40}$, when present, is hydrogen and each of $R^{41}$, $R^{42a}$, and $R^{42b}$, when present, is selected from methyl and ethyl. In yet a further aspect, $R^{40}$, when present, is hydrogen and each of $R^{41}$, $R^{42a}$, and $R^{42b}$, when present, is methyl.

In a further aspect, $R^{41}$, when present, is hydrogen and each of $R^{40}$, $R^{42a}$, and $R^{42b}$, when present, is independently selected from C1-C3 alkyl, C1-C3 monohaloalkyl, and C1-C3 polyhaloalkyl. In a still further aspect, $R^{41}$, when present, is hydrogen and each of $R^{40}$, $R^{42a}$, and $R^{42b}$, when present, is independently selected from C1-C3 monohaloalkyl, and C1-C3 polyhaloalkyl. In yet a further aspect, $R^{41}$, when present, is hydrogen and each of $R^{41}$, $R^{42a}$, and $R^{42b}$, when present, is independently selected from —CH$_2$F, —CH$_2$Cl, —CH$_2$CH$_2$F, —CH$_2$CH$_2$Cl, —CHF$_2$, —CH$_2$CHF$_2$, —CF$_3$, —CH$_2$CF$_3$, —CHCl$_2$, —CH$_2$CHCl$_2$, —CCl$_3$, and —CH$_2$CCl$_3$. In an even further aspect, $R^{41}$, when present, is hydrogen and each of $R^{40}$, $R^{42a}$, and $R^{42b}$, when present, is independently selected from —CHF$_2$, —CH$_2$CHF$_2$, —CF$_3$, —CH$_2$CF$_3$, —CHCl$_2$, —CH$_2$CHCl$_2$, —CCl$_3$, and —CH$_2$CCl$_3$. In a still further aspect, $R^{41}$, when present, is hydrogen and each of $R^{40}$, $R^{42a}$, and $R^{42b}$, when present, is independently selected from —CF$_3$, —CH$_2$CF$_3$, —CCl$_3$, and —CH$_2$CCl$_3$.

In a further aspect, $R^{41}$, when present, is hydrogen and each of $R^{40}$, $R^{42a}$, and $R^{42b}$, when present, is C1-C3 alkyl. In a still further aspect, $R^{41}$, when present, is hydrogen and each of $R^{40}$, $R^{42a}$, and $R^{42b}$, when present, is selected from methyl and ethyl. In yet a further aspect, $R^{41}$, when present, is hydrogen and each of $R^{40}$, $R^{42a}$, and $R^{42b}$, when present, is methyl.

In a further aspect, $R^{42a}$, when present, is hydrogen and each of $R^{40}$, $R^{41}$, and $R^{42b}$, when present, is independently selected from C1-C3 alkyl, C1-C3 monohaloalkyl, and C1-C3 polyhaloalkyl. In a still further aspect, $R^{42a}$, when present, is hydrogen and each of $R^{40}$, $R^{41}$, and $R^{42b}$, when present, is independently selected from C1-C3 monohaloalkyl, and C1-C3 polyhaloalkyl. In yet a further aspect, $R^{42a}$, when present, is hydrogen and each of $R^{40}$, $R^{41}$, and $R^{42b}$, when present, is independently selected from —CH$_2$F, —CH$_2$Cl, —CH$_2$CH$_2$F, —CH$_2$CH$_2$Cl, —CHF$_2$, —CH$_2$CHF$_2$, —CF$_3$, —CH$_2$CF$_3$, —CHCl$_2$, —CH$_2$CHCl$_2$, —CCl$_3$, and —CH$_2$CCl$_3$. In an even further aspect, $R^{42b}$, when present, is hydrogen and each of $R^{40}$, $R^{41}$, and $R^{42b}$, when present, is independently selected from —CHF$_2$, —CH$_2$CHF$_2$, —CF$_3$, —CH$_2$CF$_3$, —CHCl$_2$, —CH$_2$CHCl$_2$, —CCl$_3$, and —CH$_2$CCl$_3$. In a still further aspect, $R^{42a}$, when present, is hydrogen and each of $R^{40}$, $R^{41}$, and $R^{42b}$ when present, is independently selected from —CF$_3$, —CH$_2$CF$_3$, —CCl$_3$, and —CH$_2$CCl$_3$.

In a further aspect, $R^{42a}$, when present, is hydrogen and each of $R^{40}$, $R^{41}$, and $R^{42b}$, when present, is C1-C3 alkyl. In a still further aspect, $R^{42a}$, when present, is hydrogen and each of $R^{40}$, $R^{41}$, and $R^{42b}$, when present. Is selected from methyl and ethyl. In yet a further aspect, $R^{42a}$, when present, is hydrogen and each of $R^{40}$, $R^{41}$, and $R^{42b}$, when present, is methyl.

In a further aspect, each of $R^{40}$ and $R^{41}$, when present, is hydrogen, and each of $R^{42a}$ and $R^{42b}$ when present, is independently selected from C1-C3 alkyl, C1-C3 monohaloalkyl, and C1-C3 polyhaloalkyl. In a still further aspect, each of $R^{40}$ and $R^{41}$, when present, is hydrogen and each of $R^{42a}$ and $R^{4b}$, when present, is independently selected from C1-C3 monohaloalkyl, and C1-C3 polyhaloalkyl. In yet a further aspect, each of $R^{40}$ and $R^{41}$, when present, is hydrogen and each of $R^{42a}$ and $R^{42b}$, when present, is independently selected from —CH$_2$F, —CH$_2$Cl, —CH$_2$CH$_2$F, —CH$_2$CH$_2$Cl, —CHF$_2$, —CH$_2$CHF$_2$, —CF$_3$, —CH$_2$CF$_3$, —CHCl$_2$, —CH$_2$CHCl$_2$, —CCl$_3$, and —CH$_2$CCl$_3$. In an even further aspect, each of $R^{40}$ and $R^{41}$, when present, is hydrogen and each of $R^{42a}$ and $R^{42b}$, when present, is independently selected from —CHF$_2$, —CH$_2$CHF$_2$, —CF$_3$, —CH$_2$CF$_3$, —CHCl$_2$, —CH$_2$CHCl$_2$, —CCl$_3$, and —CH$_2$CCl$_3$. In a still further aspect, each of $R^{40}$ and $R^{41}$, when present, is hydrogen and each of $R^{42a}$ and $R^{42b}$, when present, is independently selected from —CF$_3$, —CH$_2$CF$_3$, —CHCl$_2$, —CH$_2$CHCl$_2$, —CCl$_3$, and —CH$_2$CCl$_3$.

In a further aspect, each of $R^{40}$ and $R^{41}$, when present, is hydrogen and each of $R^{42a}$ and $R^{42b}$, when present, is C1-C3 alkyl. In a still further aspect, each of $R^{40}$ and $R^{41}$, when present, is hydrogen and each of $R^{42a}$ and $R^{42b}$, when present, is independently selected from methyl and ethyl. In yet a further aspect, each of $R^{40}$ and $R^{41}$, when present, is hydrogen and each of $R^{42a}$ and $R^{42b}$, when present, is methyl.

In a further aspect, each of $R^{40}$, $R^{41}$, and $R^{42a}$ is hydrogen and $R^{42b}$ is selected from C1-C3 alkyl, C1-C3 monohaloalkyl, and C1-C3 polyhaloalkyl. In a still further aspect, each of $R^{40}$, $R^{41}$, and $R^{42a}$ is hydrogen and $R^{42b}$ is selected from C1-C3 monohaloalkyl, and C1-C3 polyhaloalkyl. In yet a further aspect, each of $R^{40}$, $R^{41}$, and $R^{42a}$ is hydrogen and $R^{42b}$ is selected from —CH$_2$F, —CH$_2$Cl, —CH$_2$CH$_2$F, —CH$_2$CH$_2$Cl, —CHF$_2$, —CH$_2$CHF$_2$, —CF$_3$, —CH$_2$CF$_3$, —CHCl$_2$, —CH$_2$CHCl$_2$, —CCl$_3$, and —CH$_2$CCl$_3$. In an even further aspect, each of $R^{40}$, $R^{41}$, and $R^{42a}$ is hydrogen and $R^{42b}$ is selected from —CHF$_2$, —CH$_2$CHF$_2$, —CF$_3$, —CH$_2$CF$_3$, —CHCl$_2$, —CH$_2$CHCl$_2$, —CCl$_3$, and —CH$_2$CCl$_3$. In a still further aspect, each of $R^{40}$, $R^{41}$, and $R^{42a}$ is hydrogen and $R^{42b}$ is selected from —CF$_3$, —CH$_2$CF$_3$, —CCl$_3$, and —CH$_2$CCl$_3$.

In a further aspect, each of $R^{40}$, $R^{41}$, and $R^{42a}$ is hydrogen and $R^{42b}$ is C1-C3 alkyl. In a still further aspect, each of $R^{40}$, $R^{41}$, and $R^{42a}$ is hydrogen and $R^{42b}$ is selected from methyl and ethyl. In yet a further aspect, each of $R^{40}$, $R^{41}$, and $R^{42a}$ is hydrogen and $R^{42b}$ is methyl.

(14) $R^{45}$ and $R^{44}$ Groups

In one aspect, each of $R^{43}$ and $R^{44}$, when present, is independently selected from —O$^-$, —OR$^{45}$, C1-C3 alkyl, C1-C3 monohaloalkyl C1-C3 polyhaloalkyl, and —NR$^{46a}$R$^{46b}$. In a further aspect, each of $R^{43}$ and $R^{44}$, when present, is independently selected from —O$^-$, —OR$^{45}$, and —NR$^{46a}$R$^{46b}$. In a still further aspect, each of $R^{42}$ and $R^{44}$, when present, is independently selected from —OR$^{45}$ and —NR$^{46a}$R$^{46b}$. In yet a further aspect, each of $R^{43}$ and $R^{44}$, when present, is —OR$^{45}$. In an even further aspect, each of $R^{43}$ and $R^{44}$, when present, is —NR$^{46a}$R$^{46b}$.

In a further aspect, each of $R^{43}$ and $R^{44}$, when present, is independently selected from C1-C3 alkyl, C1-C3 monohaloalkyl, and C1-C3 polyhaloalkyl. In a still further aspect, each of $R^{43}$ and $R^{44}$ when present, is independently selected from methyl, ethyl, —CH$_2$F, —CH$_2$Cl, —CH$_2$CH$_2$F, —CH$_2$CH$_2$Cl, —CHF$_2$, —CH$_2$CHF$_2$, —CF$_3$, —CH$_2$CF$_3$, —CHCl$_2$, —CH$_2$CHCl$_2$, —CCl$_3$, and —CH$_2$CCl$_3$. In yet a further aspect, each of $R^{43}$ and $R^{44}$, when present, is independently selected from methyl —CH$_2$F, —CH$_2$Cl, —CHF$_2$, —CF$_3$, —CHCl$_2$, —CCl$_2$, and —CH$_2$CCl$_3$.

(15) R$^{45}$ and R$^{46}$ Groups

In one aspect, each of R$^{45}$, R$^{46a}$, and R$^{46b}$, when present, is independently selected from hydrogen, C1-C3 alkyl C1-C3 monohaloalkyl, and C1-C3 polyhaloalkyl. In a further aspect, each of R$^{45}$, R$^{46a}$, and R$^{46b}$, when present, is hydrogen.

In a further aspect, each of R$^{45}$, R$^{46a}$, and R$^{46b}$, when present, is independently selected from hydrogen, C1-C3 monohaloalkyl, and C1-C3 polyhaloalkyl. In a still further aspect, each of R$^{45}$, R$^{46a}$, and R$^{46b}$, when present, is independently selected from hydrogen, —CH$_2$F, —CH$_2$Cl, —CH$_2$CH$_2$F, —CH$_2$CH$_2$Cl, —CHF$_2$, —CH$_2$CHF$_2$, —CF$_3$, —CH$_2$CF$_3$, —CHCl$_2$, —CH$_2$CHCl$_2$, —CCl$_3$, and —CH$_2$CCl$_3$. In yet a further aspect, each of R$^{45}$, R$^{46a}$, and R$^{46b}$, when present, is independently selected from hydrogen, —CH$_2$F, —CH$_2$Cl, —CHF$_2$, —CF$_3$, —CHCl$_3$, and —CCl$_3$.

In a further aspect, each of R$^{45}$, R$^{46a}$, and R$^{46b}$, when present, is independently selected from hydrogen and C1-C3 alkyl. In a still further aspect, each of R$^{45}$, R$^{46a}$, and R$^{46b}$, when present, is independently selected from hydrogen, methyl and ethyl. In yet a further aspect, each of R$^{45}$, R$^{46a}$, and R$^{46b}$, when present, is independently selected from hydrogen and methyl.

In a further aspect, R$^{43}$ is hydrogen and each of R$^{46a}$ and R$^{46b}$ is independently selected from C1-C3 alkyl, C1-C3 monohaloalkyl, and C1-C3 polyhaloalkyl. In a still further aspect, R$^{45}$ is hydrogen and each of R$^{46a}$ and R$^{46b}$ is independently selected from C1-C3 alkyl, C1-C3 monohaloalkyl and C1-C3 polyhaloalkyl. In yet a further aspect R$^{45}$ is hydrogen and each of R$^{46a}$ and R$^{46b}$ is independently selected from methyl, ethyl, —CH$_2$F, —CH$_2$Cl, —CH$_2$CH$_2$F, —CH$_2$CH$_2$Cl, —CHF$_2$, —CH$_2$CHF$_2$, —CF$_3$, —CH$_2$CF$_3$, —CHCl$_2$, —CH$_2$CHCl$_2$, —CCl$_3$, and —CH$_2$CCl$_3$. In an even further aspect, R$^{45}$ is hydrogen and each, of R$^{46a}$ and R$^{46b}$ is independently selected from methyl, —CH$_2$F, —CH$_2$Cl, —CHF$_2$, —CF$_3$, —CHCl$_3$, —CCl$_3$.

In a further aspect, R$^{46a}$ is hydrogen and each of R$^{45}$ and R$^{46b}$ is independently selected from C1-C3 alkyl, C1-C3 monohaloalkyl, and C1-C3 polyhaloalkyl. In a still further aspect R$^{46a}$ is hydrogen and each of R$^{45}$ and R$^{46b}$ is independently selected from C1-C3 alkyl, C1-C3 monohaloalkyl and C1-C3 polyhaloalkyl. In yet a further aspect, R$^{46a}$ is hydrogen and each of R$^{45}$ and R$^{46b}$ is independently selected from methyl, ethyl, —CH$_2$F, —CH$_2$Cl, —CH$_2$CH$_2$F, —CH$_2$CH$_2$Cl, —CHF$_2$, —CH$_2$CHF$_2$, —CF$_3$, —CH$_2$CF$_3$, —CHCl$_2$, —CH$_2$CHCl$_2$, —CCl$_2$, and —CH$_2$CCl$_2$. In an even further aspect, R$^{46a}$ is hydrogen and R$^{46b}$ is independently selected from methyl, —CH$_2$F, —CH$_2$Cl, —CHF$_2$, —CF$_3$, —CHCl$_2$, and —CCl$_3$.

In a further aspect, each of R$^{45}$ and R$^{46a}$ is hydrogen and R$^{46b}$ is selected from C1-C3 alkyl, C1-C3 monohaloalkyl, and C1-C3 polyhaloalkyl. In a still further aspect each of R$^{45}$ and R$^{46a}$ is hydrogen and R$^{46b}$ is selected from methyl, ethyl, —CH$_2$F, —CH$_2$Cl, —CH$_2$CH$_2$F, —CH$_2$CH$_2$Cl, —CHF$_2$, —CH$_2$CHF$_2$, —CF$_3$, —CH$_2$CF$_3$, —CHCl$_2$, —CH$_2$CHCl$_2$, —CCl$_3$, and —CH$_2$CCl$_3$. In yet a further aspect, each of R$^{45}$ and R$^{46a}$ is hydrogen and R$^{46b}$ is selected from methyl, —CH$_2$F, —CH$_2$Cl, —CHF$_2$, —CF$_3$, —CHCl$_2$, and —CCl$_3$.

(16) X

In one aspect, x is an integer greater than 1. In another aspect, x is an integer greater than 10. In a further aspect, x is an integer greater than 100,

(17) Counterions

In certain embodiments, the polymer further comprises an acceptable counterion. In one embodiment, the counterion is selected from iodide, bromide, chloride, fluoride, sulfate, hydrogen sulfate, perchlorate, nitrate, carbonate, hydrogen carbonate, phosphate, hydrogen phosphate, dihydrogen phosphate, acetate, and formate.

b. Example Polymers

In one aspect, the polymer is formed by polymerizing a compound having a structure:

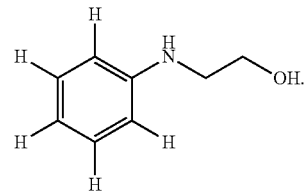

In one aspect, the polymer has a structure represented by a formula:

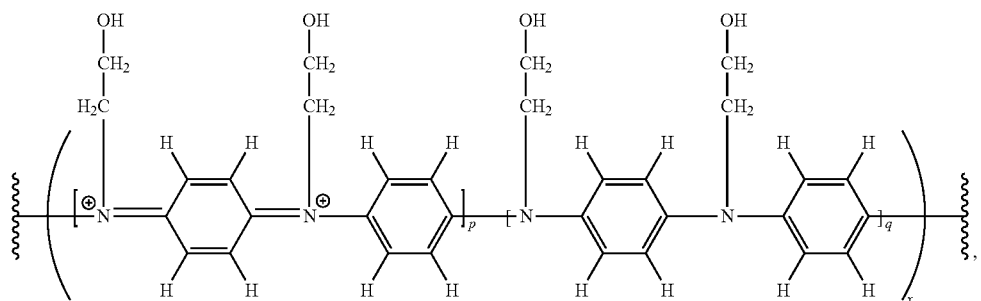

wherein p is independently 0, 0.5, or 1; q is independently 0, 0.5, or 1; and, for each x, p+q=1.

2. Support Structure

In a further aspect, the membrane is cast onto a support structure. In a still further aspect, the support structure is a nonwoven support fabric. In a preferred embodiment, the support structure is a nonwoven polyester fabric.

3. Ultrafiltrations Membranes

In various aspects, the membranes of the invention are ultrafiltration membranes. Examples of high-performance synthetic polymers commonly used in the formation of ultrafiltration membranes include polysulfone, polyethersulfone, and polyacrylonitrile.

One advantage of ultrafiltration membranes comprising the disclosed polymers involves the potential to impart passive fouling resistance to the support layer. Passive fouling resistance, sometimes referred to as "passivation," describes modification of a surface to reduce surface reactivity and promote hydrophilicity. Passive fouling resistance can prevent unwanted deposition of dissolved, colloidal, or microbial matter on the membrane surface, which, tends to foul the membrane and negatively influence flux and rejection.

The present invention provides a new class of ultrafiltration membranes with improved hydrophilicity and chlorine-resistance over conventional ultrafiltration membranes. Development: of more efficient, more selective membranes with tunable surface properties holds great promise for advanced protein separation, dialysis, water filtration, and other macro molecular separations.

4. Nanofiltration Membranes

In various aspects, the membranes of the invention are nanofiltration membranes. Typical high-performance synthetic polymers commonly used in the formation of nanofiltration membranes include polysulfone, polyethersulfone, and polyacrylonitrile. These nanofiltration membranes can be prepared, for example, by non-solvent induced phase separation (NIPS).

Another advantage of nanofiltration membranes comprising the disclosed polymers involves the potential to impart passive fouling resistance to fee support layer, Passive fouling resistance, sometimes referred to as "passivation," describes modification of a surface to reduce surface reactivity and promote hydrophilicity. Passive fouling resistance can prevent unwanted deposition of dissolved, colloidal, or microbial matter on the membrane surface, which tends to foul the membrane and negatively influence flux and rejection.

The present invention provides a new class of nanofiltration membranes with improved hydrophilicity and chlorine-resistance over conventional nanofiltration membranes. Development of more efficient, more selective membranes with tunable surface properties holds great promise for advanced protein separation, dialysis, water filtration, and other macro molecular separations.

5. Osmosis Membranes

In various aspects, the membranes of the invention can be osmosis membranes, for example, forward osmosis membranes, reverse osmosis membranes, or pressure retarded osmosis membranes without thin film coating. Among particularly useful membranes for osmosis applications are those in which the discriminating layer is a polyamide.

Composite polyamide membranes are typically prepared by coating a porous support with a poly functional amine monomer, most commonly coated from an aqueous solution. Although water is a preferred solvent, non-aqueous solvents can be utilized, such as acetonitrile and dimethylformamide (DMF). A poly functional acyl halide monomer (also referred to as acid halide) is subsequently coated on the support, typically coated first on the porous support followed by the acyl halide solution. Although one or both of the polyfunctional amine and acyl halide can be applied to the porous support From a solution, they can alternatively be applied by other means such as by vapor deposition, or heat.

In a further aspect, the membranes of the invention can further comprise a thin film polymerized onto a surface of the membrane, and the membrane is an osmosis membrane. In a still further aspect, the osmosis membrane is selected from a reverse osmosis membrane and a forward osmosis membrane.

6. Film

In various aspects, the membranes of the invention further comprise a thin film polymerized onto a surface of the membrane. The thin film can be a semi-permeable polymer matrix, e.g. with a three-dimensional polymer network, substantially permeable to water and substantially impermeable to solutes. For example, the polymer network can be a cross-linked polymer formed from reaction of at least one polyfunctional monomer with a difunctional or polyfunctional monomer.

The polymer matrix film can be a three-dimensional polymer network such as an aliphatic or aromatic polyamide, aromatic polyhydrazide, poly-bensimidazolone, polyepiamine/amide, polyepiamine/urea, a polyester, or a polyimide or a copolymer thereof or a mixture thereof. Preferably, the polymer matrix film can be formed by an interfacial polymerization reaction or can be cross-linked subsequent to polymerization.

Tire polymer matrix film can be an aromatic or non-aromatic polyamide such as residues of a phthaloyl (e.g., isophthaloyl or terephthaioyl) halide, a trimesyl halide, or a mixture thereof. In another example, the polyamide can be residues of diaminobenzene, triaminohenzene, polyetherimine, piperazine or poly-piperazine or residues of a trimesoyl halide and residues of a diaminobenzene. The film can also be residues of trimesoyl chloride and m-phenylenediamine. Further, the film can be the reaction product of trimesoyl chloride and m-phenylenediamine.

The polymer matrix film can have a thickness of from about 1 nm to about 1000 nm. For example, the film can have a thickness of from about 10 nm to about 1000 nm, from about 100 nm to about 1000 nm, from about 1 nm to about 500 nm, from about 10 nm to about 500 nm, from about 50 nm to about 500 nm, from about 50 nm to about 200 nm, from about 50 nm to about 250 nm, from about 50 nm, to about 300 nm, or from about 200 nm to about 300 nm.

7. Properties

In various aspects, the composite filtration membranes of the invention can have various properties that provide the superior function of the membranes, including improved hydrophilicity, improved resistance to chlorine, excellent permeability, and improved salt rejection. It is also understood that the membranes have other properties.

a. Hydrophilicity

The hydrophilicity of the membranes can be expressed in terms of the pure water equilibrium contact angle. The contact angles of the membranes of the invention can be measured using a contact angle goniometer (DSAI0, KRUSS GmbH).

In various aspects, a membrane of the invention can have a pure water equilibrium contact angle of less than about 90°. In a further aspect, a membrane of the invention can have a pure water equilibrium contact angle of less than about 80°. In a still further aspect, a membrane of the invention can have a pure water equilibrium, contact angle of less than about 70°. In yet a further aspect, a membrane of the invention can have a pure water equilibrium contact angle of less than about 60°. In an even further aspect, a membrane of the invention can have a pure water equilibrium contact angle of less than about 50°. In a still further aspect, a membrane of the invention can have a pure water equilibrium contact angle of less than about 40°. In yet a further aspect, a membrane of the invention can have a pure water equilibrium contact angle of less than about 30°. In certain embodiments, a membrane of the invention can have a pure water equilibrium contact angle of about 20°, about 30°, about 31°, about 32°, about 33°, about 34°, about 35°, about 36°, about 37°, about 38°, about 39°, or about 40°.

b. Permeability

The permeability of the membranes can be expressed in terms of the pure water permeability. The permeability of the disclosed membranes can be measured, for example, using a dead-end stirred cell (Sterlitech).

Membrane permeability can be affected by, for example, the amount of polymer present. Thus, in various aspects, the polymer is present in an amount of about 30 wt % and the membrane has a pure water permeability of less than about 5.00 gfd/psi, in a further aspect, the polymer is present in an amount of about 30 wt % and the membrane has a pure water permeability of less than about 4.50 gfd/psi. In a still further aspect, the polymer is present in an amount of about 30 wt % and the membrane has a pure water permeability of less than about 4.00 gfd/psi. In yet a further aspect, the polymer is present in an amount of about 30 wt % and the membrane has a pure water permeability of less than about 3.50 gfd/psi. In certain embodiments, the polymer is present in an amount of about 30 wt % and the membrane has a pure water permeability of about 3.0 gfd/psi, about 3.1 gfd/psi, about 3.2 gfd/psi, about 3.3 gfd/psi, about 3.4 gfd/psi, about 3.5 gfd/psi, about 3.6 gfd/psi, about 3.7 gfd/psi, about 3.8 gfd/psi, about 3.9 gfd/psi, or about 4.0 gfd/psi.

c. Rejection

The rejection of the membranes can be expressed in terms of bovine serum albumin (BSA) rejection. The salt rejection of the disclosed membranes can be measured, for example, using a dead-end stirred cell (Sterlitech).

The salt rejection of the membranes can be affected by, for example, the amount of polymer present. Thus, in various aspects, the polymer is present in an amount of about 30 wt % and the membrane has a BSA rejection of at least about 50%. In a further aspect, the polymer is present in an amount of about 30 wt % and the membrane has a BSA rejection of at least about 55%. In a still further aspect, the polymer is present in an amount of about 30 wt % and the membrane has a BSA rejection of at least about 60%. In yet a further aspect, the polymer is present in an amount of about 30 wt % and the membrane has a BSA rejection of at least about 65%. In an even further aspect, the polymer is present in an amount of about 30 wt % and the membrane has a BSA rejection of at least about 70%, In certain embodiments, the polymer is present in an amount of about 30 wt % and the membrane has a BSA rejection of about 60%, about 62%, about 64%, about 66%, about 68%, about 70%, about 72%, about 74%, about 76%, about 78%, or about 80%.

C. Methods for Making Filtration Membranes

In one aspect, the invention relates to a method of making a filtration membrane, the method comprising the step of providing a polymer formed by polymerizing a compound having a structure represented by a formula;

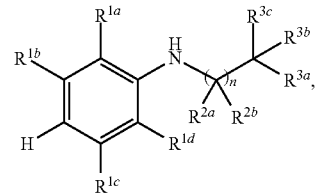

wherein n is selected from 1, 2, and 3; wherein each of $R^{1a}$, $R^{1b}$, $R^{1c}$, and $R^{1d}$ is independently selected from hydrogen, halogen, —CN, —SR$^{20}$, —OR$^{21}$, —NR$^{22a}$R$^{22b}$, —NR$^{22a}$R$^{22b}$H$^+$, —SO$_2$R$^{23}$, —(C=O)R$^{24}$, and C1-C3 alkyl substituted with 0, 1, 2, or 3 groups selected from halogen, —CN, —SR$^{20}$, —OR$^{21}$, —NR$^{22a}$R$^{22b}$, —SO$_2$R$^{23}$, and —(C=O)R$^{24}$; wherein each of $R^{2a}$ and $R^{2b}$ is independently selected from hydrogen, halogen, —CN, —SR$^{30}$, —OR$^{31}$, —NR$^{32a}$R$^{32b}$, —NR$^{32a}$R$^{32b}$H$^+$, —SO$_2$R$^{33}$, —SO$_2$R$^{33}$, —(C=O)R$^{34}$, and C1-C3 alkyl substituted with 0, 1, 2, or 3 groups selected from halogen, —CN, —SR$^{30}$, —OR$^{31}$, —NR$^{32a}$R$^{32b}$, —SO$_2$R$^{33}$, and —(C=O)R$^{34}$; wherein each of $R^{3a}$, $R^{3b}$, and $R^{3c}$ is independently selected from hydrogen, halogen, —CN, —SR$^{40}$, —OR$^{41}$, —NR$^{42a}$R$^{42b}$, —NR$^{42a}$R$^{42b}$H$^+$, —SO$_2$R$^{43}$, and —(C=O)R$^{44}$; wherein at least one of $R^{2a}$, $R^{2b}$, $R^{3a}$, $R^{3b}$, and $R^{3c}$ is not hydrogen; wherein each of $R^{20}$, $R^{21}$, $R^{22a}$, $R^{22b}$, $R^{30}$, $R^{31}$, $R^{32a}$, $R^{32b}$, $R^{40}$, $R^{41}$, $R^{42a}$, and $R^{42b}$, when present, is independently selected from hydrogen. C1-C3 alkyl, C1-C3 monohaloalkyl, and C1-C3 polyhaloalkyl; wherein each of $R^{23}$ and $R^{24}$, when present, is independently selected from —O$^{31}$, —OR$^{25}$, C1-3 alkyl, C1-C3 monohaloalkyl, C1-C3 polyhaloalkyl, and —NR$^{26a}$R$^{26b}$; wherein each of $R^{25}$, $R^{26a}$, and $R^{26b}$, when present, is independently selected from hydrogen. C1-3 alkyl, C1-C3 monohaloalkyl, and C1-C3 polyhaloalkyl; wherein each of $R^{33}$ and $R^{34}$, when present, is independently selected from —O$^-$, —OR$^{35}$, C1-C3 alkyl, C1-C3 monohaloalkyl, C1-C3 polyhaloalkyl, and —NR$^{36a}$R$^{36}$; wherein each of $R^{35}$, $R^{36a}$, and $R^{36b}$, when present, is independently selected from hydrogen, C1-C3 alkyl, C1-C3 monohaloalkyl, and C1-C3 polyhaloalkyl; wherein each of $R^{42}$ and $R^{44}$, when present, is independently selected from —O$^-$, —OR$^{45}$, C1-C3 alkyl, C1-C3 monohaloalkyl, C1-C3 polyhaloalkyl, and —NR$^{46a}$R$^{46b}$; and wherein each of $R^{45}$, $R^{46b}$, and $R^{46b}$, when present is selected from hydrogen, C1-C3 alkyl, C1-C3 monohaloalkyl, and C1-C3 polyhaloalkyl; and casting a solution or a suspension of the polymer.

In one aspect, the invention relates to a method of making a filtration membrane, the method comprising the step of providing a polymer comprising a structure represented by a formula:

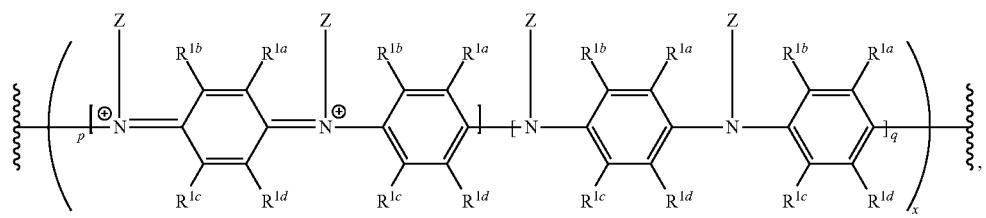

wherein each Z is independently selected from hydrogen and

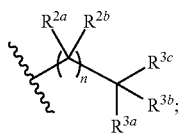

wherein n is an integer selected from 1, 2, and 3; wherein p is independently 0, 0.5, or 1; wherein q is independently 0, 0.5, or 1; wherein, for each x, p+q=1; wherein each of $R^{1a}$, $R^{1b}$, $R^{1c}$, and $R^{1d}$ is independently selected from hydrogen, halogen, —CN, —$SR^{20}$, —$OR^{21}$, —$NR^{22a}R^{22b}$, —$NR^{22a}R^{22b}H^+$, —$SO_2R^{23}$, —(C=O)$R^{24}$, and C1-C3 alkyl substituted with 0, 1, 2, or 3 groups selected from halogen, —CN, —$SR^{26}$, —$OR^{21}$, —$NR^{22a}R^{22b}$, —$SO_2R^{23}$, and —(C=O)$R^{24}$; wherein, each of $R^{2a}$ and $R^{2b}$ is independently selected from hydrogen, halogen, —CN, —$SR^{30}$, —$OR^{31}$, —$NR^{32a}R^{32b}$, —$NR^{32a}R^{32b}H^+$, —$SO_2R^{33}$, —(C=O)$R^{34}$, and C1-C3 alkyl substituted with 0, 1, 2, or 3 groups selected from halogen, —CN, —$SR^{30}$, —$OR^{31}$, —$NR^{32a}R^{32b}$, —$SO_2R^{33}$, and —(C=O)$R^{34}$; wherein each of $R^{3a}$, $R^{3b}$, and $R^{3c}$ is independently selected from hydrogen, halogen, —CN, —$SR^{40}$, —$OR^{41}$, —$NR^{42a}R^{42b}$, —$NR^{42a}R^{42b}H^+$, —$SO_2R^{43}$, and —(C=O)$R^{44}$; wherein each of $R^{20}$, $R^{21}$, $R^{22a}$, $R^{22b}$, $R^{30}$, $R^{31}$, $R^{32a}$, $R^{32b}$, $R^{40}$, $R^{41}$, $R^{42a}$, and $R^{42b}$, when present, is independently selected from hydrogen, C1-C3 alkyl C1-C3 monohaloalkyl, and C1-C3 polyhaloalkyl; wherein each of $R^{23}$ and $R^{24}$, when present, is independently selected from —O⁻, —$OR^{25}$, C1-C3 alkyl C1-C3 monohaloalkyl, C1-C3 polyhaloalkyl, and —$NR^{26a}R^{26b}$; wherein each of $R^{25}$, $R^{26a}$, and $R^{26b}$, when present, is independently selected from hydrogen, C1-C3 alkyl, C1-C3 monohaloalkyl, and C1-C3 polyhaloalkyl: wherein each of $R^{33}$ and $R^{34}$, when present, is independently selected from —O⁻, —$OR^{35}$, C1-C3 alkyl, C1-C3 monohaloalkyl, C1-C3 polyhaloalkyl, and —$NR^{36a}R^{36b}$; wherein each of $R^{35}$, $R^{36a}$, and $R^{36b}$, when present, is independently selected from hydrogen, C1-C3 alkyl, C1-C3 monohaloalkyl, and C1-C3 polyhaloalkyl; wherein each of $R^{43}$ and $R^{44}$, when present, is independently selected from —O⁻, —$OR^{45}$, C1-C3 alkyl, C1-C3 monohaloalkyl, C1-3 polyhaloalkyl, and —$NR^{46a}R^{46b}$; wherein each of $R^{45}$, $R^{46a}$, and $R^{46b}$, when present, is selected from hydrogen,

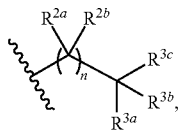

and
wherein at least one of $R^{2a}$, $R^{2b}$, $R^{3a}$, $R^{3b}$, and $R^{3c}$ is not hydrogen; and casting a solution or a suspension of the polymer.

In a further aspect, the solution or the suspension is cast onto a support structure. In a still further aspect, the support structure is a nonwoven support fabric. In a preferred embodiment, the support structure is a nonwoven polyester fabric.

In a further aspect, the membrane is selected from an ultrafiltration membrane, a nanofiltration membrane, a reverse osmosis membrane, a forward osmosis membrane, and a pressure retarded osmosis membrane without thin film coating. In a still further aspect, the filtration membrane is selected from an ultrafiltration membrane, a nanofiltration membrane, a reverse osmosis membrane and a forward osmosis membrane. In yet a further aspect, the filtration membrane is selected from an ultrafiltration membrane and a nanofiltration membrane. In an even further aspect, the filtration membrane is an ultrafiltration membrane. In a still further aspect, the filtration membrane is a nanofiltration membrane.

In a further aspect, the polymer is in a suspension. In a still further aspect, the polymer is in a solvent solution.

In a further aspect, the method further comprises the step of solution casting a second polymer selected from polysulfone, sulfonated polysulfone, polyethersulfone, sulfonated polyethersulfone, polyaniline, polyaniline co-polymers, polyacrylonitrile, polyvinylidene fluoride, polytetrafluoroethylene, polyvinyl fluoride, polyvinylidene fluoride, polytrifluoroethylene, polyperfluoroalkyl vinyl ether, polyhexafluoropropylene, cellulose acetate, polyurethane, or a mixture thereof. In a still further aspect, the second polymer is polysulfone.

In a further aspect, the method further comprises the step of polymerizing a thin film onto a surface of the membrane, thereby providing an osmosis membrane. In a still further aspect, the osmosis membrane is selected from a reverse osmosis membrane and a forward osmosis membrane, in yet a further aspect, the osmosis membrane is a reverse osmosis membrane. In an even further aspect, the osmosis membrane is a forward osmosis membrane.

It is understood that the disclosed methods can be used to provide the disclosed membranes.

In various aspects, the polymers of this invention can be prepared by employing reactions as shown in the following schemes, in addition to other standard manipulations that are known in the literature, exemplified in the experimental sections or clear to one skilled in the art. For clarity, examples having a single substituent are shown where multiple substitutents are allowed under the definitions disclosed herein.

Reactions used to generate the compounds of this invention are prepared by employing reactions as shown in the following Reaction Schemes, as described and exemplified below. The following examples are provided so that the invention might be more fully understood, are illustrative only, and should not be construed as limiting.

1. Route I

In one aspect, substituted halobenzene derivatives can be prepared as shown below.

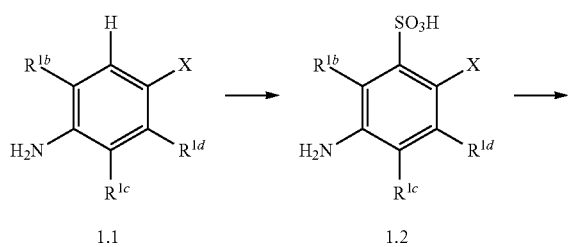

-continued

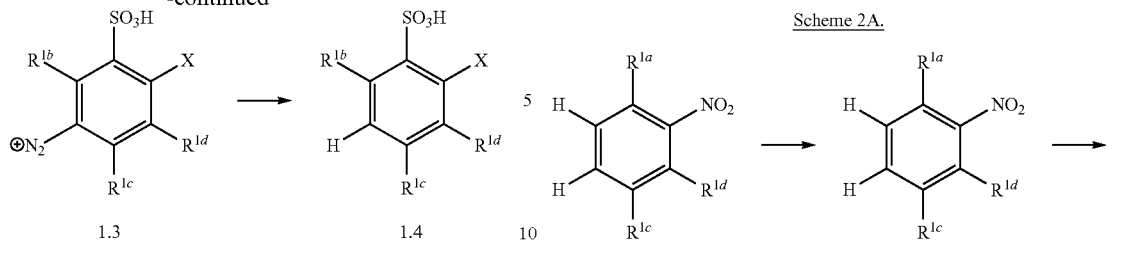

Compounds are represented in generic form, with substituents as noted in compound descriptions elsewhere herein. A more specific example is set forth below.

Scheme IB.

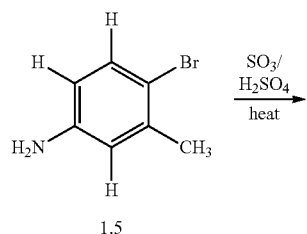

1.5

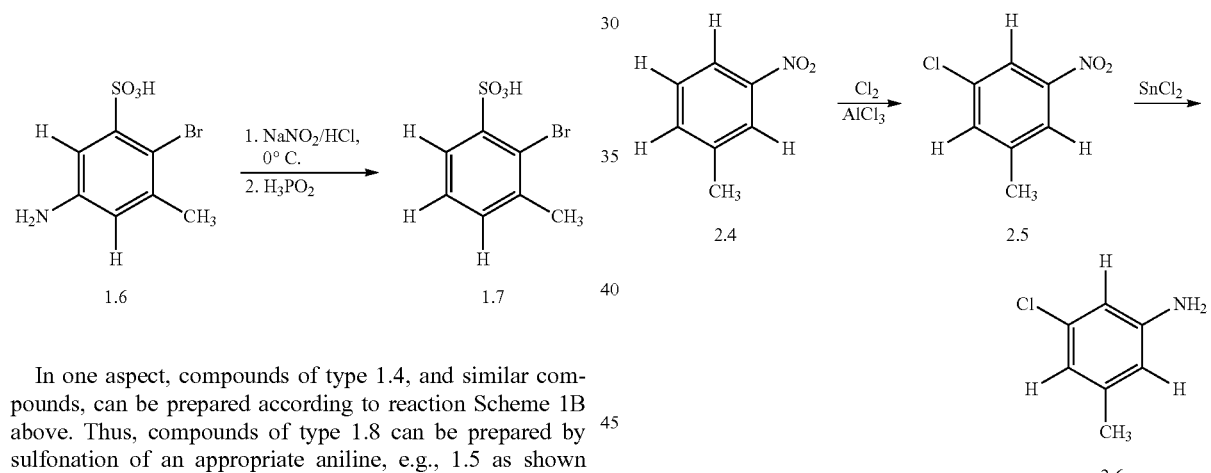

In one aspect, compounds of type 1.4, and similar compounds, can be prepared according to reaction Scheme 1B above. Thus, compounds of type 1.8 can be prepared by sulfonation of an appropriate aniline, e.g., 1.5 as shown above. Appropriate anilines are commercially available or prepared by methods known to one skilled in the art. The sulfonation is carried out in the presence of an appropriate acid, e.g. fuming sulphuric acid. Compounds of type 1.7 can be prepared by reduction of an appropriate aniline, e.g., 1.6 as shown above. The reduction is carried out in the presence of an appropriate acid, e.g., hydrochloric acid (HQ), and an appropriate salt, e.g., sodium nitrite, at an appropriate temperature, e.g., 0° C., followed by addition of an appropriate acid, e.g., hypophosphorous acid. As can be appreciated by one skilled in the art, the above reaction provides an example of a generalized approach wherein compounds similar in structure to the specific reactants above (compounds similar to compounds of type 1.5 and 1.6), can be substituted in the reaction to provide substituted diarylacetylenes similar to Formula 1.7.

2. Route II

In one aspect, substituted aniline derivatives useful in the present invention can be prepared as shown below.

Compounds are represented in generic form, with substituents as noted in compound descriptions elsewhere herein. A more specific example is set forth below.

In one aspect, compounds of type 2.3, and similar compounds, can be prepared according to reaction Scheme 2B above. Thus, compounds of type 2.5 can be prepared by alkylation of an appropriate nitrobenzene, e.g., 2.4 as shown above. Appropriate nitrobenzenes are commercially available or prepared by methods known to one skilled in the art. The alkylation is earned out in the presence of an appropriate halide source, e.g. dichlorine, and an appropriate Lewis acid, e.g. Aluminum chloride. Compounds of type 2.6 can be prepared by reduction of an appropriate nitrobenzene, e.g., 2.5 as shown above. The reduction is carried out in the presence of an appropriate Lewis acid, e.g., tin (II) chloride. As can be appreciated by one skilled in the art, the above reaction provides an example of a generalized approach wherein compounds similar in structure to the specific reactants above (compounds similar to compounds of type 2.1 and 2.2), can be substituted in the reaction to provide substituted diarylacetylenes similar to Formula 2.3.

3. Route III

In one aspect, n-substituted aniline derivatives of the present invention can be prepared as shown below.

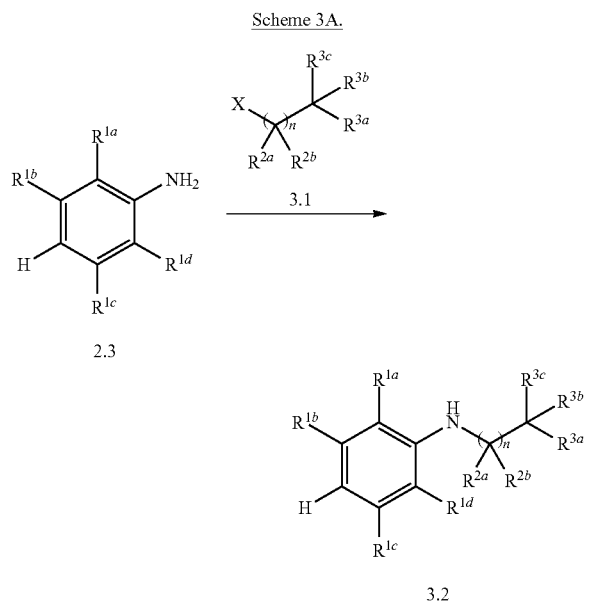

Compounds are represented in generic form, with substituents as noted in compound descriptions elsewhere herein, A more specific example is set forth below.

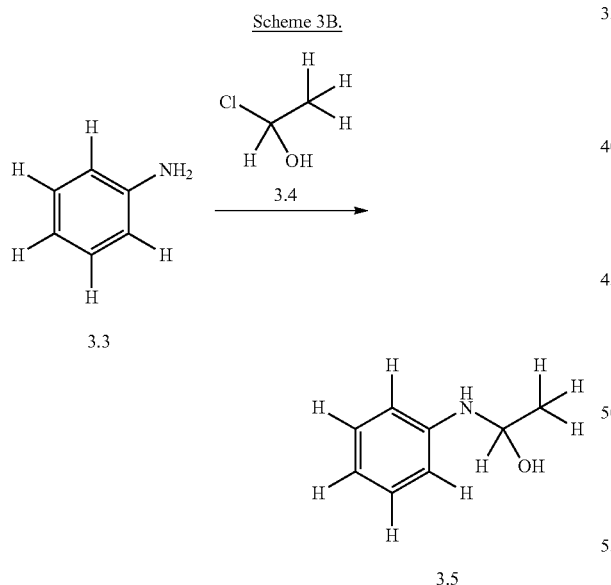

In one aspect, compounds of type 3.2, and similar compounds, can be prepared according to reaction Scheme 3B above. Thus, compounds of type 3.5 can be prepared by alkylation of an appropriate aniline, e.g., 3.3 as shown above. Appropriate anilines are commercially available or prepared by methods known to one skilled in the art. The alkylation is earned out in the presence of an appropriate alkyl halide, e.g. 1-chloroethanol (3.4). As can be appreciated by one skilled in the art, the above reaction provides an example of a generalized approach wherein compounds similar in structure to the specific reactants above (compounds similar to compounds of type 2.3), can be substituted in the reaction to provide substituted diarylacetylenes similar to Formula 3.2.

4. Route IV

In one aspect, n-substituted aniline derivatives of the present invention can be prepared as shown below.

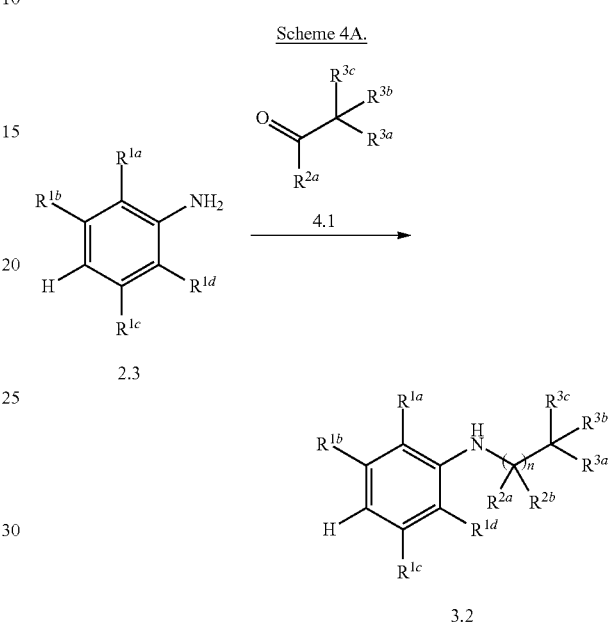

Compounds are represented in generic form, with substituents as noted in compound descriptions elsewhere herein. A more specific example is set forth below.

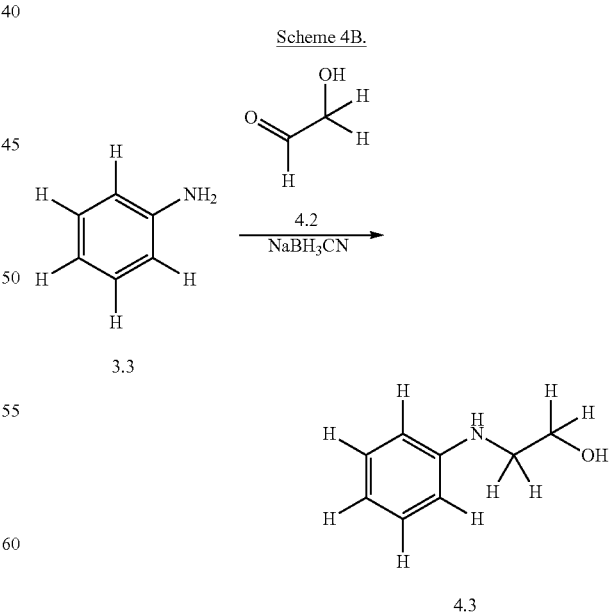

In one aspect, compounds of type 3.2, and similar compounds, can be prepared according to reaction Scheme 4B above. Thus, compounds of type 4.3 can be prepared by reductive animation of an appropriate aniline, e.g., 3.3 as shown above. Appropriate anilines are commercially available or prepared by methods known to one skilled in the art. The reductive amination is carried out in the presence of an appropriate carbonyl derivative, e.g. 2-hydroxyacetaldehyde (4.2) and an appropriate salt, e.g., sodium cyanoborohydride. As can be appreciated by one skilled in the art, the above reaction provides an example of a generalized approach wherein compounds similar in structure to the specific reactants above (compounds similar to compounds of type 2.3 and 4.1), can be substituted in the reaction to provide substituted diarylacetylenes similar to Formula 3.2.

5. Route V

In one aspect, n-substituted aniline derivatives of the present invention can be prepared as shown below.

Scheme 5A.

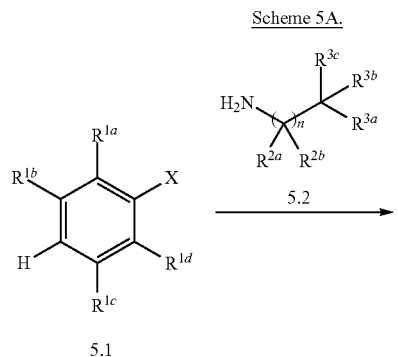

3.2

Compounds are represented in generic form, with substituents as noted in compound descriptions elsewhere herein, A more specific example is set forth below.

Scheme 5B.

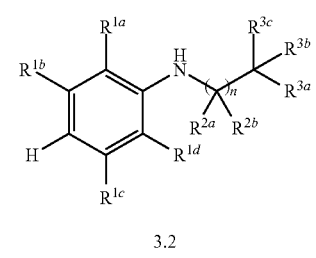

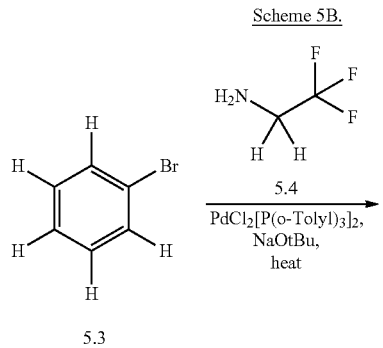

5.3

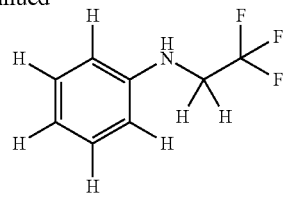

5.5

In one aspect, compounds of type 3.2, and similar compounds, can be prepared according to reaction Scheme 5B above. Thus, compounds of type 5.5 can be prepared by coupling of an appropriate aryl halide, e.g., 5.3 as shown above, and an appropriate amine, e.g., 2,2,2-trifluoroethanamine (5.4). Appropriate aryl halides are commercially available or prepared by methods known to one skilled in the art. The coupling is carried out in the presence of an appropriate palladium catalyst, e.g., $PdCl_2[P(o-Toyl)_3]_2$, and an appropriate base, e.g., sodium t-butoxide, at an appropriate temperature, e.g., above room temperature. As can be appreciated by one skilled in the art, the above reaction pro vides an example of a generalized approach wherein compounds similar in structure to the specific reactants above (compounds similar to compounds of type 5.1 and 5.2), can be substituted in the reaction to provide substituted diarylacetylenes similar to Formula 3.2.

D. Methods for Purifying Water

In various aspects, the invention can be used as a filtration membrane for performing water purification, bioseparations, protein purification, oil-water separations, etc.

Thus, in one aspect, the invention relates to a method for purifying water, the method comprising the step of filtering water through a membrane comprising a polymer formed by polymerizing a compound having a structure represented by a formula.

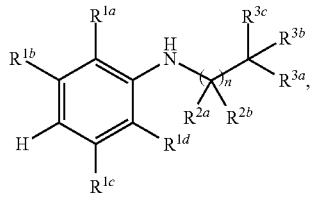

wherein n is selected from 1, 2, and 3; wherein each of $R^{1a}$, $R^{1b}$, $R^{1c}$, and $R^{1d}$ is independently selected from hydrogen, halogen. —CN, —$SR^{20}$, —$OR^{21}$, —$NR^{22a}R^{22b}$, —$NR^{22a}R^{22b}H^+$, —$SO_2R^{23}$, —(C=O)$R^{24}$, and C1-C3 alkyl substituted with 0, 1, 2, or 3 groups selected from halogen, —CN, —$SR^{20}$, —$OR^{21}$, —$NR^{22a}R^{22b}$, —$SO_2R^{23}$, and —(C=O)$R^{24}$; wherein each of $R^{2a}$ and $R^{2b}$ is independently selected from hydrogen, halogen, —CN, —$SR^{30}$, —$OR^{31}$, —$NR^{32a}R^{32b}$, —$NR^{32a}R^{32b}H^+$, —$SO_2R^{33}$, —$SO_2R^{33}$, —(C=O)$R^{34}$, and C1-C3 alkyl substituted with 0, 1, 2, or 3 groups selected from halogen, —CN, —$SR^{30}$, —$OR^{31}$, —$NR^{32a}R^{32b}$, —$SO_2R^{33}$, and —(C=O)$R^{34}$; wherein each of $R^{3a}$, $R^{3b}$, and $R^{3c}$ is independently selected from hydrogen, halogen, —CN, —$SR^{40}$, —$OR^{41}$, —$NR^{42a}R^{42b}$, —$NR^{42a}R^{42b}H^+$, —$SO_2R^{43}$, and —(C=O) $R^{44}$; wherein at least one of $R^{2a}$, $R^{2b}$, $R^{3a}$, $R^{3b}$, and $R^{3c}$ is not hydrogen; wherein each of $R^{20}$, $R^{21}$, $R^{22a}$, $R^{22b}$, $R^{30}$, $R^{31}$, $R^{32a}$, $R^{32b}$, $R^{40}$, $R^{41}$, $R^{42a}$, and $R^{42b}$, when present, is independently selected from hydrogen. C1-C3 alkyl. C1-C3 monohaloalkyl, and C1-C3 polyhaloalkyl; wherein each of $R^{23}$ and $R^{24}$, when present, is independently selected from —O$^{31}$, —OR$^{25}$, C1-3 alkyl. C1-C3 monohaloalkyl, C1-C3 polyhaloalkyl, and —NR$^{26a}$R$^{26b}$; wherein each of $R^{25}$, $R^{26a}$, and $R^{26b}$, when present, is independently selected from hydrogen. C1-3 alkyl, C1-C3 monohaloalkyl, and C1-C3 polyhaloalkyl; wherein each of $R^{33}$ and $R^{34}$, when present, is independently selected from —O$^-$, —OR$^{35}$, C1-C3 alkyl, C1-C3 monohaloalkyl, C1-C3 polyhaloalkyl, and —NR$^{36a}$R$^{36}$; wherein each of $R^{35}$, $R^{36a}$, and $R^{36b}$, when present, is independently selected from hydrogen, C1-C3 alkyl, C1-C3 monohaloalkyl, and C1-C3 polyhaloalkyl; wherein each of $R^{42}$ and $R^{44}$, when present, is independently selected from —O$^-$, —OR$^{45}$, C1-C3 alkyl, C1-C3 monohaloalkyl, C1-C3 polyhaloalkyl, and —NR$^{46a}$R$^{46b}$; and wherein each of $R^{45}$, $R^{46b}$, and $R^{46b}$, when present, is selected from hydrogen, C1-C3 alkyl, C1-C3 monohaloalkyl, and C1-C3 polyhaloalkyl.

In one aspect, the invention relates to a method for purifying water, the method comprising the step of filtering water through a membrane comprising a polymer comprising a structure represented by a formula:

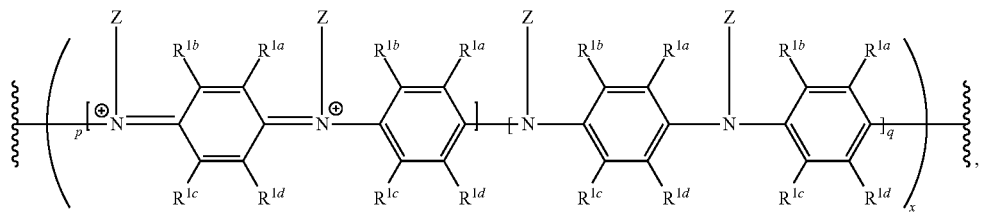

wherein each Z is independently selected from hydrogen and

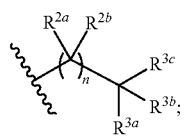

wherein n is an integer selected from 1, 2, and 3; wherein p is independently 0, 0.5, or 1; wherein q is independently 0, 0.5, or 1; wherein, for each x, p+q=1; wherein each of $R^{1a}$, $R^{1b}$, $R^{1c}$, and $R^{1d}$ is independently selected from hydrogen, halogen, —CN, —SR$^{20}$, —OR$^{21}$, —NR$^{22a}$R$^{22b}$, —NR$^{22a}$R$^{22b}$H$^+$, —SO$_2$R$^{23}$, —(C═O)R$^{24}$, and C1-C3 alkyl substituted with 0, 1, 2, or 3 groups selected from halogen, —CN, —SR$^{26}$, —OR$^{21}$, —NR$^{22a}$R$^{22b}$, —SO$_2$R$^{23}$, and —(C═O)R$^{24}$; wherein, each of $R^{2a}$ and $R^{2b}$ is independently selected from hydrogen, halogen, —CN, —SR$^{30}$, —OR$^{31}$, —NR$^{32a}$R$^{32b}$, —NR$^{32a}$R$^{32b}$H$^+$, —SO$_2$R$^{33}$, —(C═O)R$^{34}$, and C1-C3 alkyl substituted with 0, 1, 2, or 3 groups selected from halogen, —CN, —SR$^{30}$, —OR$^{31}$, —NR$^{32a}$R$^{32b}$, —SO$_2$R$^{33}$, and —(C═O)R$^{34}$; wherein each of $R^{3a}$, $R^{3b}$, and $R^{3c}$ is independently selected from hydrogen, halogen, —CN, —SR$^{40}$, —OR$^{41}$, —NR$^{42a}$R$^{42b}$, —NR$^{42a}$R$^{42b}$H$^+$, —SO$_2$R$^{43}$, and —(C═O)R$^{44}$; wherein each of $R^{20}$, $R^{21}$, $R^{22a}$, $R^{22b}$, $R^{30}$, $R^{31}$, $R^{32a}$, $R^{32b}$, $R^{40}$, $R^{41}$, $R^{42a}$, and $R^{42b}$, when present, is independently selected from hydrogen, C1-C3 alkyl C1-C3 monohaloalkyl, and C1-C3 polyhaloalkyl; wherein each of $R^{23}$ and $R^{24}$, when present, is independently selected from —O$^-$, —OR$^{25}$, C1-C3 alkyl C1-C3 monohaloalkyl, C1-C3 polyhaloalkyl, and —NR$^{26a}$R$^{26b}$; wherein each of $R^{25}$, $R^{26a}$, and $R^{26b}$, when present, is independently selected from hydrogen, C1-C3 alkyl, C1-C3 monohaloalkyl, and C1-C3 polyhaloalkyl; wherein each of $R^{33}$ and $R^{34}$, when present, is independently selected from —O$^-$, —OR$^{35}$, C1-C3 alkyl, C1-C3 monohaloalkyl, C1-C3 polyhaloalkyl, and —NR$^{36a}$R$^{36b}$; wherein each of $R^{35}$, $R^{36a}$, and $R^{36b}$, when present, is independently selected from hydrogen, C1-C3 alkyl, C1-C3 monohaloalkyl, and C1-C3 polyhaloalkyl; wherein each of $R^{43}$ and $R^{44}$, when present, is independently selected from —O$^-$, —OR$^{45}$, C1-C3 alkyl, C1-C3 monohaloalkyl, C1-3 polyhaloalkyl, and —NR$^{46a}$R$^{46b}$; wherein each of $R^{45}$, $R^{46a}$, and $R^{46b}$, when present, is selected from hydrogen, C1-3 alkyl, C1-3 monohaloalkyl, and C1-C3 polyhaloalkyl: and wherein at least one Z is a structure represented by a formula;

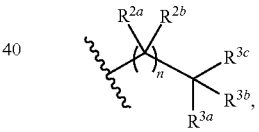

and wherein at least one of $R^{2a}$, $R^{2b}$, $R^{3a}$, and $R^{3c}$ is not hydrogen.

In a further aspect, filtering comprises applying pressure to the water.

In a further aspect, the membrane further comprises a thin polymerized onto a surface of the membrane, and wherein filtering is reverse osmosis filtering.

It is understood, that the disclosed purification methods can be used in connection with the disclosed membranes, it is also understood that the disclosed purification methods can be used in connection with the products of the disclosed methods.

In a further aspect, the water further comprises at least one solute.

Typically, the membranes of the invention can be prepared so as to be substantially impermeable to solutes. As used herein, "solute" generally refers to materials dissolved, dispersed, or suspended in a liquid. The materials can be undesired; in such a case, the membranes can be used to remove the undesired solute from the liquid, thereby purifying the liquid, and the liquid can be subsequently collected. The materials can be desired; in such a case, the membranes can be used to decrease the volume of the liquid, thereby concentrating the solute, and the solute can be subsequently collected. In one aspect, the membranes can be provided to be substantially impermeable to particular solutes, which can be selected from among solutes known to those of skill in the art. In a further aspect, the solutes can comprise at least one of sodium ions, potassium ions, magnesium ions, calcium ions, silicates, organic acids, or nonionized dissolved solids with a molecular weight of greater than about 200 Daltons or a mixture thereof. The solutes can be dissolved or dispersed within a liquid. The solutes can be hydrophobic or hydrophilic or neither or a mixture thereof. Exemplary solutes can include ions, neutral species, silicates, and organic compounds, for example, amines or carboxylic acids.

Ions can be monovalent ions, divalent ions, trivalent ions, higher valent ions, or a mixture thereof. In one aspect, the solutes comprise monovalent ions. The ions can be positive ions, negative ions, or a mixture thereof. Monovalent metal ions include lithium ions, sodium ions, potassium ions, rubidium ions, cesium ions, francium ions, ammonium ions, protonated primary amine ions, protonated secondary amine ions, and protonated tertiary amine ions. In addition, monovalent ions can be dissociated mineral or organic acids. In a further aspect, one or more of these types of ions are not among the solutes wherein a membrane of the invention is substantially impermeable.

In a further aspect, the solutes comprise di valent ions. The ions can be positive ions, negative ions, or a mixture thereof. Divalent ions include beryllium ions, magnesium ions, calcium ions, strontium ions, radium ions, ferrous iron, barium ions, and protonated diamines. In addition, divalent ions can be dissociated mineral or organic acids. In a further aspect, one or more of these types of ions are not among the solutes wherein a membrane of the invention is substantially impermeable.

In a further aspect, the solutes comprise higher valent ions. The ions can be positive ions, negative ions, or a mixture thereof. Higher valent ions include aluminum ions, ferric iron ions, or silica ions. In a further aspect, one or more of these types of ions are not among the solutes wherein a membrane of the invention is substantially impermeable.

Neutral species can include, for example, nonionized solids with, a molecular weight of greater than about 200 Daltons. The molecular weight can be, for example, at least about 200 Daltons, at least about 250 Daltons, at least about 300 Daltons, at least about 250 Daltons, at least about 400 Daltons, at least about 500 Daltons, at least about 600 Daltons, at least about 700 Daltons, at least about BOO Daltons, at least about 900 Daltons, or at least about 1,000 Daltons. The neutral species can be dissolved or suspended. The neutral species can be hydrophobic, hydrophilic, both, or neither. In a further aspect, one or more of these types of neutral species are not among the solutes wherein a membrane of the invention is substantially impermeable.

Silicates can include all known compounds of Silicon and Oxygen based upon the $SiO_4$ tetrahedron-shaped anionic group, with or without one or more metal ions present. It is understood that the silicates can be present as solids with a molecular weight of greater than about 200 Daltons and can be dissolved or suspended. The molecular weight can be, for example, at least about 250 Daltons, at least about 300 Daltons, at least about 250 Daltons, at least about 400 Daltons, at least about 500 Daltons, at least about 600 Daltons, at least about 700 Daltons, at least about 500 Daltons, at least about 900 Daltons, or at least about 5,000 Daltons. In a further aspect, one or more of these types of silicates are not among the solutes wherein a membrane of the invention is substantially impermeable.

Organic acids can include formic acid, acetic acid, propionic acid, butyric acid, pentanoic acid, hexanoic acid, heptanoic acid, octanoic acid, nonanoic acid, decanoic acid, and lactic acid and derivatives and mixtures thereof. Also included are phenols and derivatives and mixtures thereof in addition to naturally occurring humic and fulvic acids or biopolymers comprising amino acids, proteins, or complex polysaccharidic acids. The acids can be protonated or deprotonated. In a further aspect, one or more of these types of organic acids are not among the solutes wherein a membrane of the invention is substantially impermeable.

In a further aspect, the solutes can be the product of a chemical or biological reaction, screening assay, or isolation technique. For example, the solutes can be a chemically active agent, a pharmaceutically active agent, or a biologically active agent or a mixture thereof. In yet a further aspect, one or more of these types of agents are not among the solutes wherein a membrane of the invention is substantially impermeable.

E. Examples

The following examples are put forth so as to provide those of ordinary skill in the art with a complete disclosure and description of how the compounds, compositions, articles, devices and/or methods claimed herein are made and evaluated, and are intended to be purely exemplary of the invention and are not intended to limit the scope of what the inventors regard as their invention. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

1. General Experimental Methods

A. Materials

N-Hydroxyethyl aniline (n-Pani), aniline, bovine serum albumin (BSA), n-methyipyroilidone (NMP), 4-methylpiperidine (4-MP), ammonium persulfate (APS), polysulfone (PSf) beads (22 kDa), *Escherichia coli* (*E. coli*) and Luria-Bertani (LB) broth were purchased from Sigma Aidrich. Hydrochloric acid (HCl), dimethyl sulfoxide (DMSO) and sodium hydroxide (NaOH) pellets were purchased from Fisher, Dimethyl sulfoxide-$D_6$ (DMAO-$d_6$) was purchased from Cambridge Isotope Laboratories. Bleach (sodium hypochlorite, NaClO) was purchased from Clorox. All materials were used as received.

b. Preparation of Polymer Solutions

An n-Pani casting solution was prepared by dissolving 30 wt % of n-Pani powder in 70 wt % NMP. The Pani casting solution was made by dissolving 21 wt % of Pani in 11.67 wt % of 4-MP and 67.33 wt % of NMP as a co-solvent. The weight percent of Pani and 4-MP were chosen so as to maintain a 2:1 molar ratio of 4-MP:Pani base tetramer (0.547 g 4-MP: 1 g Pani base). A PSf casting solution was made by dissolving 18 wt % of PSf beads in 82 wt % of NMP.

c. Membrane Fabrication

Membranes were hand-cast by spreading polymer solutions onto nonwoven polyester fabric (Hirose, Japan) using a Gardco Adjustable Micrometer Film Applicator with a blade height of 152 µm. Cast membranes were immediately immersed in a DI water bath to induce polymer precipitation based on the phase inversion process. Membranes were left in a water bath overnight before being transferred to a Zip-lock bag filled with DI water and stored in the refrigerator at 4° C.

d. Permeability and BSA Rejection

Membrane permeability and rejection tests were carried out using a dead-end stirred cell (Sterlitech) with a membrane area of 7.917 cm². Permeate flow rates were measured using a digital flow meter. Pristine membranes were compacted first using DI water at 20 psi until their flux change became smaller than 5% over 30 min. Flux data were measured under pressures of 20, 15, 10 and 5 psi. Pure water permeability data were determined by plotting the flux as a function of pressure, BSA was used to evaluate the membrane rejection properties. Concentrations were determined using a UV-Vis spectrophotometer. BSA rejection was calculated from $$R=1-c_p/c_f$$

where $c_p$ is the BSA concentration in the permeate and $c_f$ is that in the feed solution. For bleach tolerance tests, pristine membranes were compacted as described above before being soaked in bleach containing 250 ppm of free chlorine (measured using an EACH Pocket Colorimeter™ II chlorine test kit) for 1 or 2 days. Pure water permeability and BSA rejection were measured as described above for pristine membranes.

e. Surface Contact Angle

Membrane surface contact angle measurements were carried out with a KRUSS DSA 10 goniometer using the captive bubble method. This method was chosen instead of the sessile drop method so that membranes could remain wet during the measurement, which leads to more realistic results, especially for hydrophilic membranes.

f. Fourier Transform Infrared Spectrometry (FT-IR)

FT-IR was performed on a JASCO FT/IR-5300, Membrane samples were cut into small pieces and dried in a vacuum oven overnight before carrying out the measurements.

g. UV-Vis

An Agilent 8453 UV-Visible Spectrophotometer was used for UV-Vis characterization with DMSO as a blank solvent. Unsupported membranes were cast on glass substrates using the same casting polymer solutions with the same casting procedures. The unsupported membranes were later peeled off and dried in the vacuum oven overnight and ground to a powder using a mortar and pestle before being dissolved in DMSO.

h. NMR Characterization

¹H Nuclear Magnetic Resonance (¹H NMR) characterization was carried out in a Broker Avance AV300 (300 MHz) instrument at room: temperature. DMSO-$d_6$ was used as the solvent. Unsupported membrane powder was also used for this study. The ¹H NMR chemical shifts are reported relative to the deuterated DMSO solvent signal.

i. Bacterial Adhesion Tests

Bacterial adhesion tests were performed on n-Pani, Pani and PSf membranes using *E. coli* as a model microorganism. Pure bacterial cell cultures were suspended in LB broth and grown at 35° C., shaken at 150 rpm and incubated until a mid-exponential phase was reached, at which time the cells were harvested by centrifugation at 3800×g for 8 min. The cells were then re-suspended with fresh LB medium to a concentration of 4×10⁷ eells/mL. Sample coupons of approximately 1 cm² were incubated in the bacterial suspension for 24 hours at 25 rpm and 35° C. using a New Brunswick Scientific 124 Incubator Shaker followed by being rinsed with fresh LB broth. Coupons were then immersed and stained in SYTO 9 and propidium iodide (live/dead Baclight Bacterial Viability Kit L13152, Molecular Probes) for 15 min. Coupon Images were taken using a microscope (Olympus BX51 microscope) equipped with, a fluorescent lamp, green/red fluorescence filters and 4×CCD camera (FVIEW-II, Soft Imaging System, USA).

j. Fouling Test Using BSA Solution

A cross-flow system was used to determine the fouling behaviour of the membranes. A 19 cm² cutout of each supported membrane was placed in the cross-flow cell. A computer connected to a balance recorded the mass change of the permeate with time, enabling the flux to be monitored in real-time. The membranes were compacted using DI water at 16 psi until the flux, stabilized. The flux was then normalized to 68 lmb (40 gfd) by manually reducing the operational pressure. Once stable, DI water in the feed tank was replaced by 1.5 g/L BSA solution to observe flux decline due to BSA fouling. The fouling test was continued for 25 min followed by flushing with DI water for 25 min.

2. General Synthetic Methods

A. Synthesis of Pani

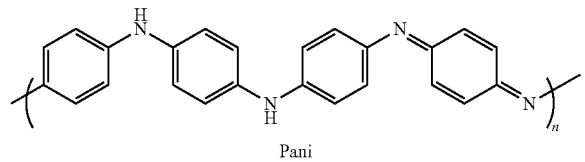

Pani

Pani was synthesized following the procedure described by Guillen et al. (Guillen, G. R., et al. (2010) *J. Mater. Chem.* 20, 4621-4628). Pani was dedoped by eentrifugation against a 1M NaOH aqueous solution at 3000 rpm for 5 minutes followed by dialysis against deionized (DI) water until the pH of the water bath reached neutral. Pani powder was obtained using a rotovap at 60° C. (yield=50%).

b. Synthesis of N-Pani

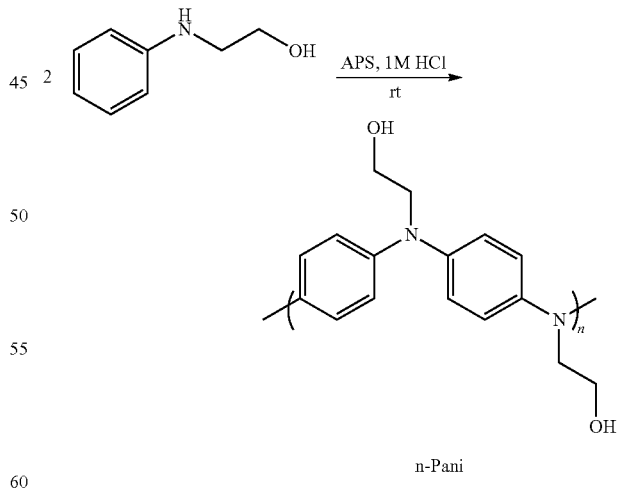

n-Pani

N-Pani was polymerized from its monomer, n-hydroxyethyl aniline, via chemical oxidative polymerization. The monomer and APS were dissolved in a 1M HCl aqueous solution. A solution of APS was added drop-wise at room temperature into the monomer solution with vigorous stirring. The reaction was allowed to proceed overnight, n-Pani was purified using eentrifugation at 3000 rpm for 5 minutes followed by dialysis against DI water until the pH of the water bath reached neutral. Polymer powder was obtained by drying the polymer dispersion from a dialysis bag using a rotovap at 60° C. (yield=65%).

3. Processability of N-pani and Pani

Due to the side chains in the polymer structure, s-Pani is more polar than pure Pani, and thus more soluble in polar solvents like NMP, DMSO, etc, (Chevalier, J, W., et al. (1992) *Macnmolecules* 25, 3325-3331). Moreover, Pani gels rapidly at concentrations as low as 5 wt % (Scheme I) (Yang, D. and Mattes, B. R. (2002) *J. Polym. Sci. Pol. Phsy.* 40, 2702-2713). In order to achieve a high enough concentration for casting membranes, secondary amines such as 4-MP have been used to prevent Pani solutions from gelling (Scheme II) (Yang, D. and Mattes, B. R. (1999) *Synthetic Met* 101, 746-749; Yang, D., et al. (2002) *Macromolecuks* 35, 5304-5313). However, the addition of 4-MP results in a loss of hydrophilicity.

SCHEME I.

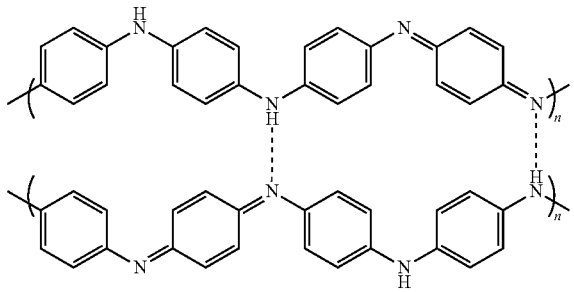

SCHEME II.

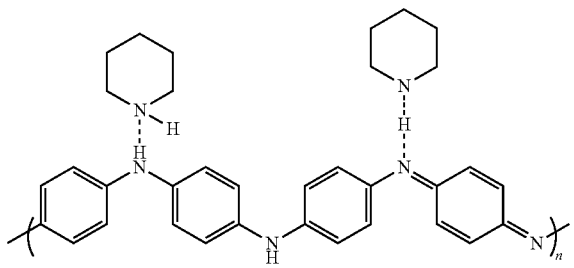

Unlike Pani, n-Pari solutions don't gel even at concentrations as high, as 30 wt %. n-Pani's backbone is made up of 75% benzenoid rings (Scheme II and II above) which leads to its flexible chain structure. Such flexibility makes it less likely for two adjacent polymer chains to form a sufficient number of hydrogen bonds to cause gelation. Additionally, the long flexible side chains attached to the nitrogen atoms make it even less likely for two adjacent polymer chains to get close enough to each other to form bonds.

4. Permeability and BSA Rejection of Membranes

The n-PANi membrane exhibited a permeability of 86.8 lmh/bar (3.53 gfd/psi), while rejecting 65.8% BSA. The pore PANi membrane possessed a higher permeability (280.4 lmh/bar), but lower BSA rejection (12.9%).

After soaking in the 250 ppm sodium hypochlorite solution, the permeability of the pure PANi membrane increased drastically from 280.4 lmh/bar to 1328.4 lmh/bar (Table 1). The BSA rejection of the pure PANi membrane also decreased significantly from 12.9% to 0 indicating that exposure to chlorine damaged the PANi membrane. On the other hand, the permeability of the n-PANi membrane changes only slightly from 86.9 lmh/bar to 100.6 lmh/bar upon chlorine exposure, with little change in BSA rejection.

TABLE I

|  | Pristine | Chlorine 1 d | Chlorine 2 d | Chlorine 30 d |
| --- | --- | --- | --- | --- |
| N-PANi Permeability (lmh/bar) | 86.9 | 103.3 | 100,6 | 108.7 |
| N-PANi rejection (%) | 65.8 | 62.9 | 75.7 | 70.2 |
| PANi Permeability (lmh/bar) | 280.4 | 642.1 | 1328 | N/A |
| PANi rejection (%) | 12.9 | 1.8 | 0 | N/A |

Figure 2:
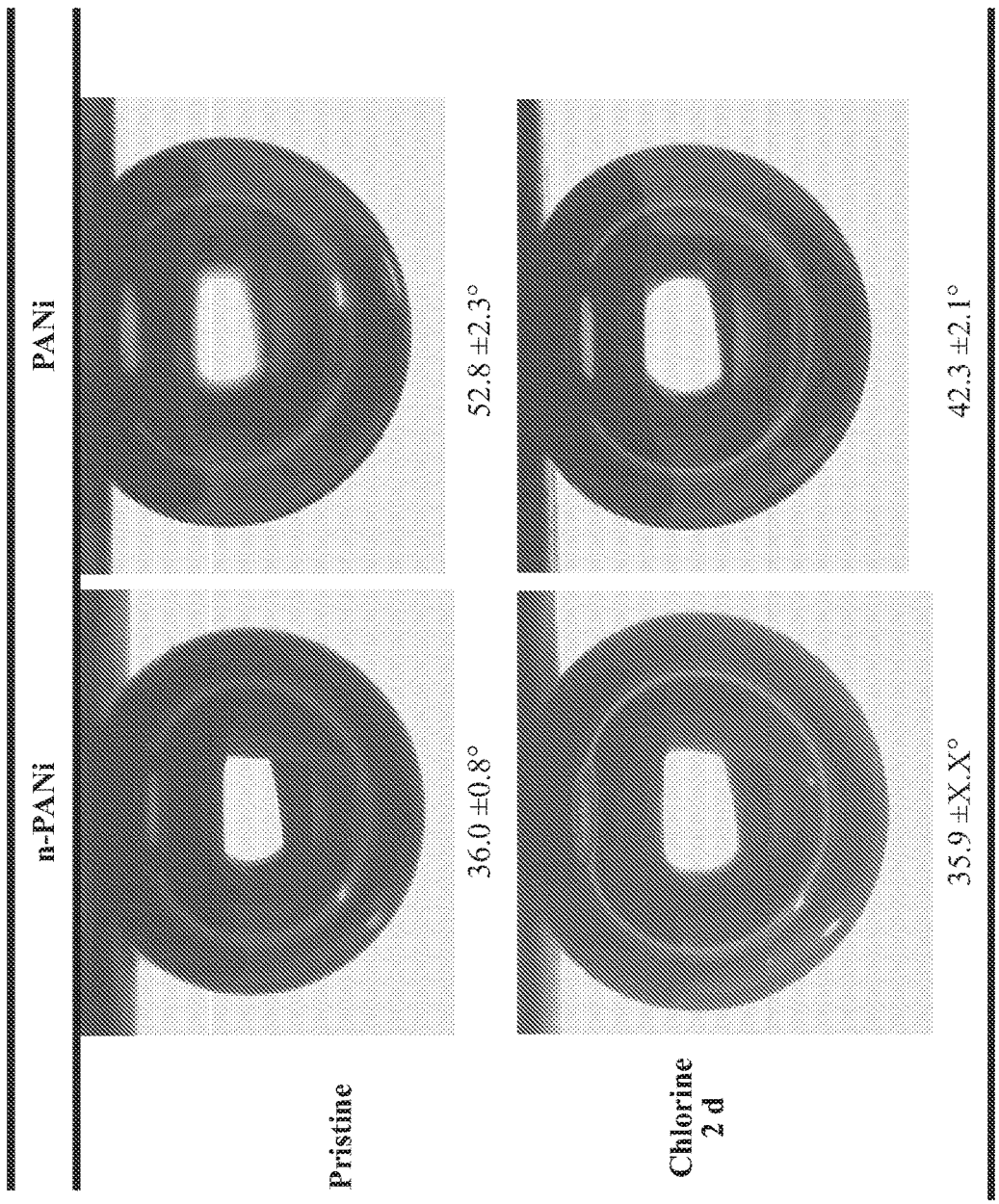
FIG. 2 shows representative data pertaining to the contact angle of n-PANi and PANi membranes before and after being soaked in 250 ppm free chlorine.

The Pani membrane turned golden from: its original purple color after being soaked in 250 ppm free chlorine for 2 days, showing that it was bleached due to certain reactions with chlorine. Additionally, there were cracks on the Pani membrane surface which could be because 4-MP deteriorated the membrane (FIG. 1) (Yang, D. and Mattes, B. R. (2002) *J. Poylm. Sci. Pol. Phys.* 40, 2702-2713). Various black dots showed up on the FSf membrane surface after it had been soaked in 250 ppm free chlorine for 2 days, indicating possible membrane deterioration by chlorine, 5. Contact Angle of Membranes The n-PANi membrane is hydrophilic, with a contact angle 36.0±0.8° compared with 52.8±2.3° for the Pani membrane and 54.0±1.7° for the PSf membrane (FIG. 2). After being soaked in 250 ppm free chlorine for 2 days, the contact angle of the n-PANi membrane remained unchanged, while that of the Pani membrane decreased from 52.8±2.3° to 42.3±2.1°, further demonstrating the occurrence of reactions with chlorine and the instability of Pani in chlorine.

6. FT-IR Analysis of Polyaniline Membranes

Figure 3:
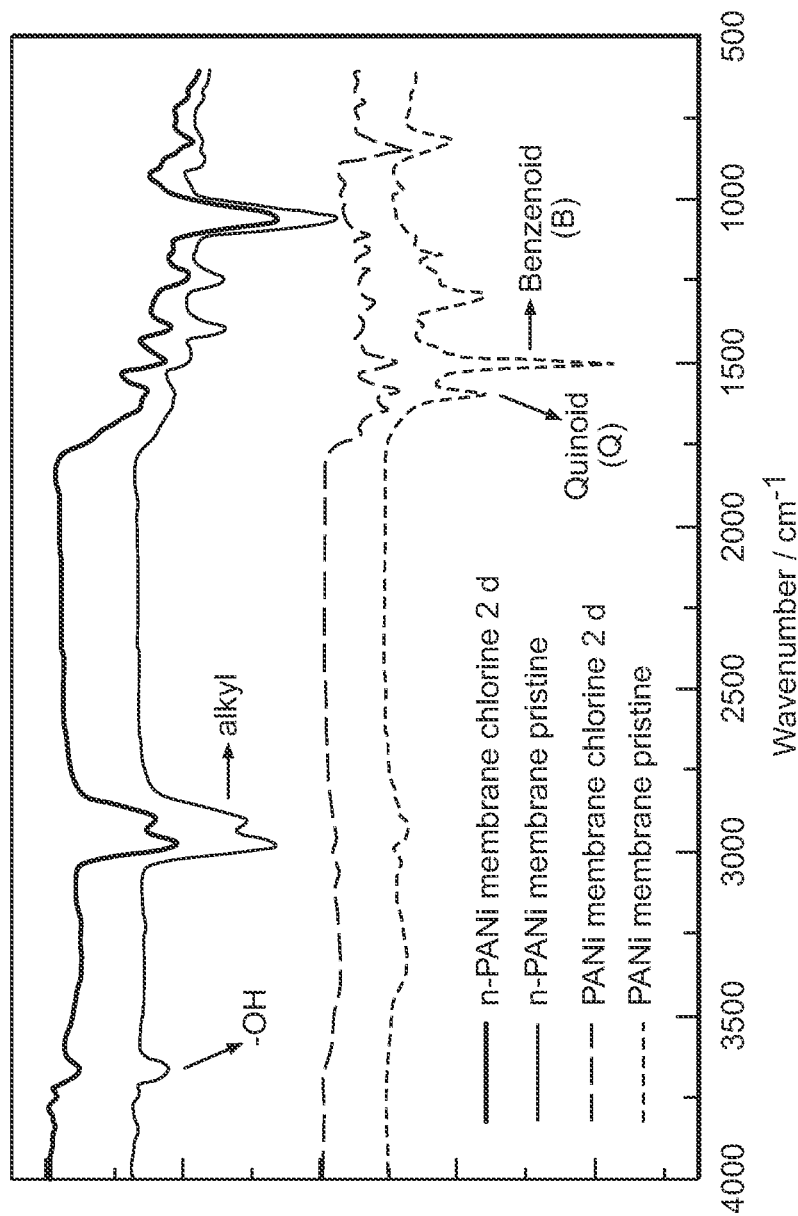
FIG. 3 shows representative data pertaining to the effect of chlorine on the benzenoid and quinoid groups in polyaniline membranes as observed by FT-IR analysis.

FT-IR spectra was used to follow the benzenoid and quinoid groups in the polyaniline membranes (FIG. 3). For pure Pani, a red shift in the quinoid peak and a blue shift in the benzenoid peak are observed. However, the quinoid and benzenoid peaks of the n-Pani stayed at the same positions after being soaked in 250 ppm of free chlorine for 2 days. The intensity ratio of the quinoid group to the benzenoid group in the Pani membrane increased from 0.5 to 1, while that for the n-Pani membrane remained essentially unchanged (Table II). Without wishing to be bound by theory, the increase in quinoid intensity in the pure Pani membrane may suggest that the benzenoid groups are being oxidized into quinoid groups by chlorine.

TABLE II

| Membrane | Peak | Pristine ($cm^{-1}$) | Chlorine 2 d ($cm^{-1}$) |
| --- | --- | --- | --- |
| n-Pani | Benzenoid | 1495 | 1495 |
|  | Quinoid | 1591 | 1591 |
|  | Q/B Ratio | 1.2 | 1.3 |
| Pani | Benzenoid | 1501 | 1498 |
|  | Quinoid | 1597 | 1587 |
|  | Q/B Ratio | 0.5 | 1.0 |

7. UV-Vis Analysis of Polyaniline Membranes

Figure 4:
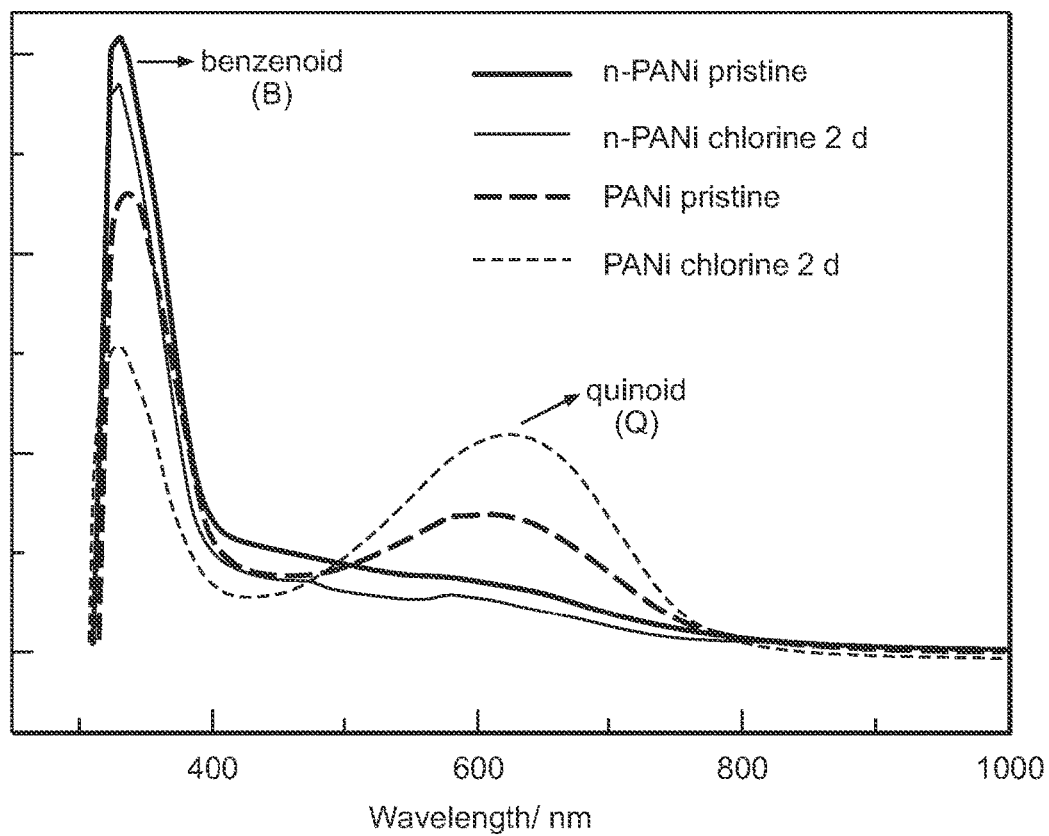
FIG. 4 shows representative data pertaining to the effect of chlorine on the benzenoid and quinoid groups in polyaniline membranes as observed by UV-Vis analysis.

UV-Vis spectra showed one visible peak (benzenoid peak) for the n-PANi membrane and two peaks (benzenoid and quinoid peak) for the Pani membrane within the 300-1000 nm test range (FIG. 4). After being soaked in 250 ppm free chlorine for 2 days, n-PANi showed no change in the UV-Vis spectrum. In contrast, the Pani spectrum changed drastically. Blue shift was observed for the benzenoid peak and red shift was observed for the quinoid peak. The intensity ratio of the quinoid peak to benzenoid peak also increased (Table III), which is consistent with that in the IR spectra, further supporting the explanation of benzenoid groups being oxidized to quinoid groups by chlorine.

TABLE III

| Membrane | Peak | Pristine (nm) | Chlorine 2 d (nm) |
|---|---|---|---|
| n-Pani | Benzenoid | 331 | 331 |
| Pani | Benzenoid | 338 | 329 |
|  | Quinoid | 601 | 624 |
|  | Q/B Ratio | 0.33 | 0.71 |

8. NMR Analysis of Polyaniline Membranes

Figure 5:
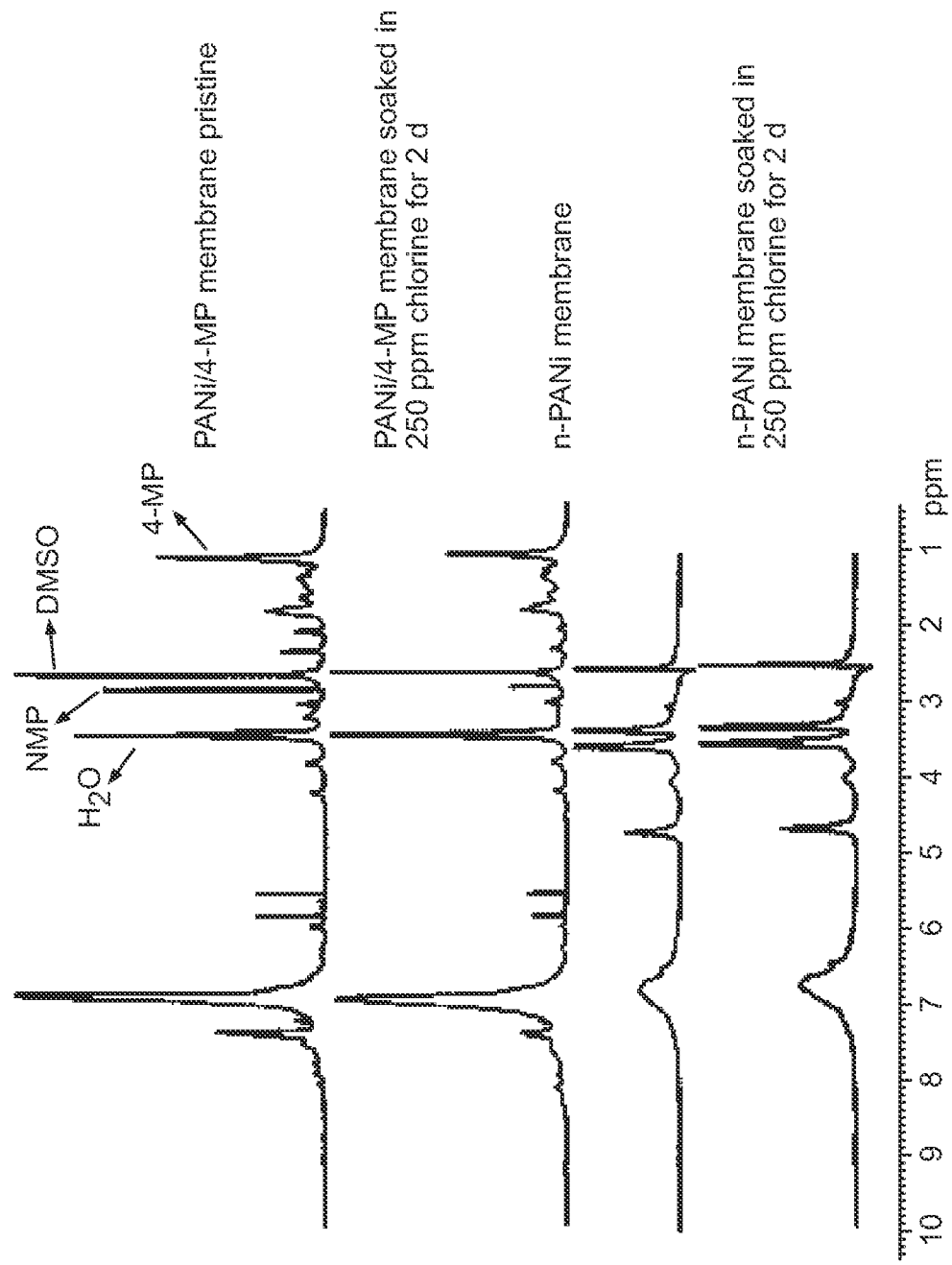
FIG. 5S shows representative data pertaining to the effect of chlorine on the benzenoid and quinoid groups m polyaniline membranes as observed by Nuclear Magnetic Resonance (NMR) analysis.

NMR spectra of N-Pani revealed feat the alkyl and hydroxyl groups in the polymer structure do not change after being soaked in 250 ppm of free chlorine for 2 days (FIG. 5). NMR spectra of pure Pani indicated that there's both NMP and 4-MP remaining in the unsupported membrane. After exposure to chlorine, the NMP peak decreased significantly, in the as-synthesized membrane, NMP is bonded to the Pani backbone via hydrogen bonding (Scheme III) (G. R. Guillen, B. T. Meverry, T. P. Farrell, R. B, Kaner, and E. M. V. Hock, Manuscript in Preparation). Without on wishing to be bound by theory, the decrease in the number of benzenoid groups may indicate that there are fewer potential sites for NMP to attach. The decrease in the intensity of the peak for the alkyl group around 3000 cm$^{-1}$ in the FT-IR spectrum may also be due, for example, to the decrease in NMP content.

SCHEME III.

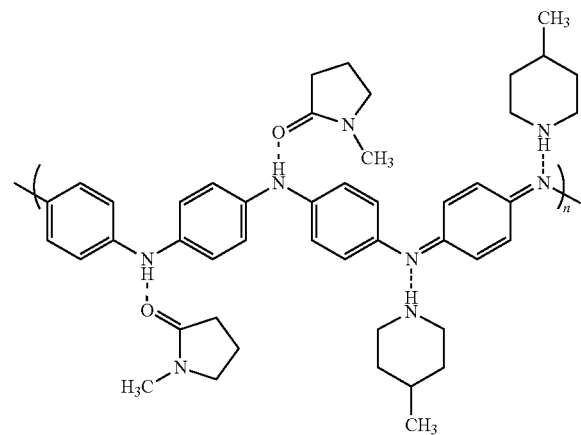

9. Bacterial Adhesion

Figure 6:
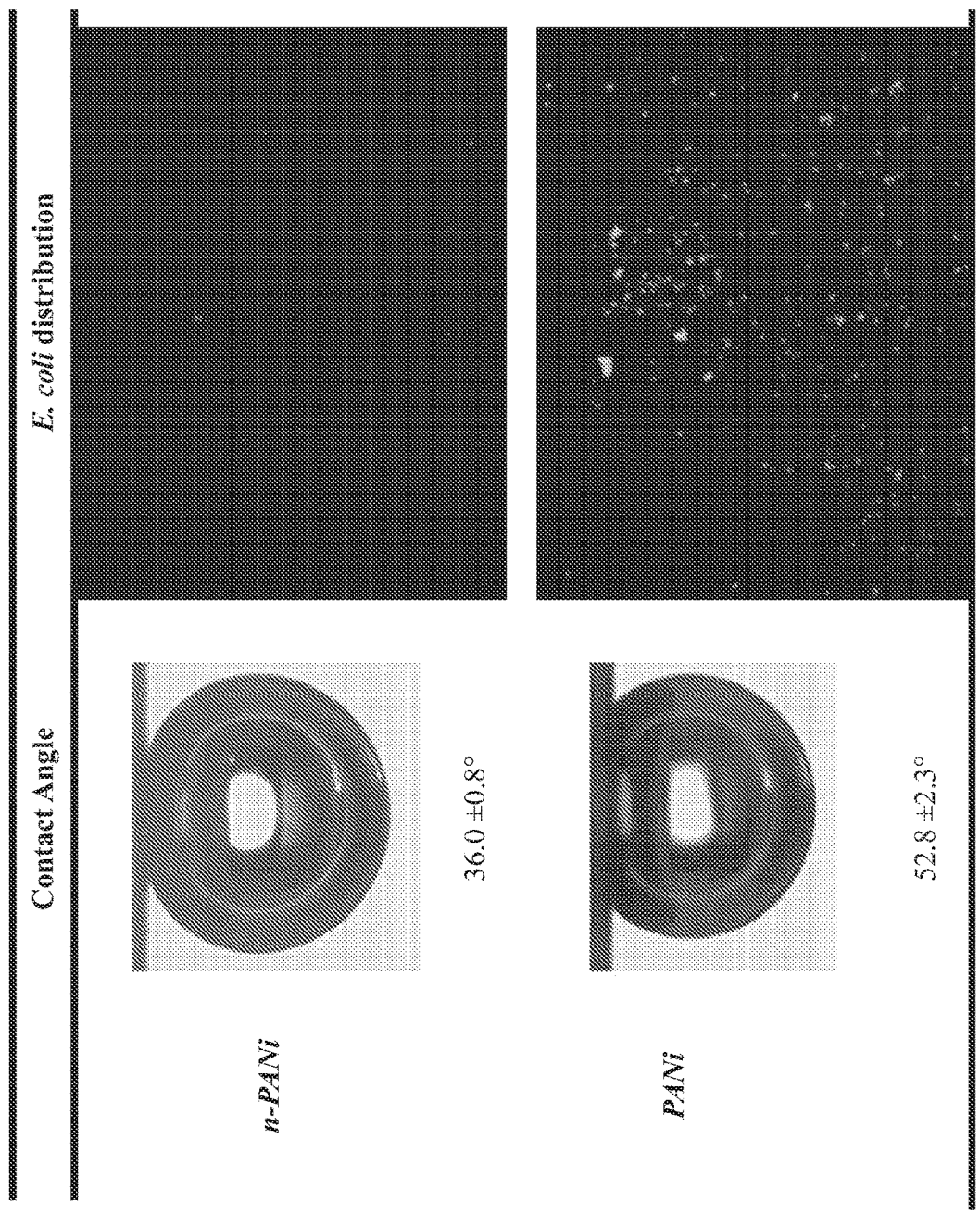
FIG. 6 shows images from bacterial adhesion tests that indicate that n-Pani membranes are more resistant to fouling than Pani membranes.

Bacterial adhesion tests indicated that n-Pani membranes are more resistant to fouling than either Pani or PSf membranes since less bacteria adhered to their membrane surfaces (FIG. 6). The anti-fouling properties of n-Pani membranes can be attributed to their enhanced hydrophilicity. Generally, the more hydrophilic a membrane is, the less likely it is for hydrophobic matter to adhere to it (Mcverry, B. T., et al (2013) Chem. Mater. 25, 3597-3602). Hydrophilic surfaces "like" water and the water on the membrane surface in turn can help repel hydrophobic matter from sticking to the membrane.

The n-PANi membrane exhibits an observed contact angle of 36.0±0.8° indicating its increased hydrophilicity compared to a PANi membrane (CA=52.8±2.3°), Bacterial attachment test results are shown in FIG. 6 with green fluorescence representing E. colonies adhered to the membrane surface. It is evident that n-PANi membranes are less prone to fouling compared to PANi membranes. This is in agreement with n-PANi's lower water contact angle values, i.e. higher hydrophilicity, which suppresses the undesirable hydrophobic interactions between microorganisms and the membrane surface.

10. Long-Term Chlorine Resistance of N-pani Membranes

Long-term chorine resistance of n-PANi membrane was tested by extending the soaking time in 250 ppm free chlorine solution to 30 days. Fresh hypochlorite solutions were prepared and exchanged every 2 days. At the end of the 30-day period, the membrane performance was evaluated. After 30 days, the n-PANi membrane maintained its pure water permeability of 108.7 huh/bar and a BSA rejection of 70.2% (Table 1), indicating outstanding long-term chlorine resistance. During operation, chlorine cleaning is performed either by backflushing with 2-8 ppm hypochlorite solution for 1 min or soaking in 20-400 ppm free chlorine for 1 h periodically. The combined, effect of chlorine oxidation can be expressed in a concentration×time manner.[15] n-PANi is able to withstand at least 180,000 mg h/L of free chlorine exposure. Therefore, we believe n-PANi is a viable candidate for long-term use in water treatment plants without failure due to chlorine degradation.

It will be apparent to those skilled in the art that various modifications and variations can be made in the present invention without departing from, the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

11. Flux Decline Upon BSA Fouling and Flux Recovery Upon Water Flushing

Figure 7:
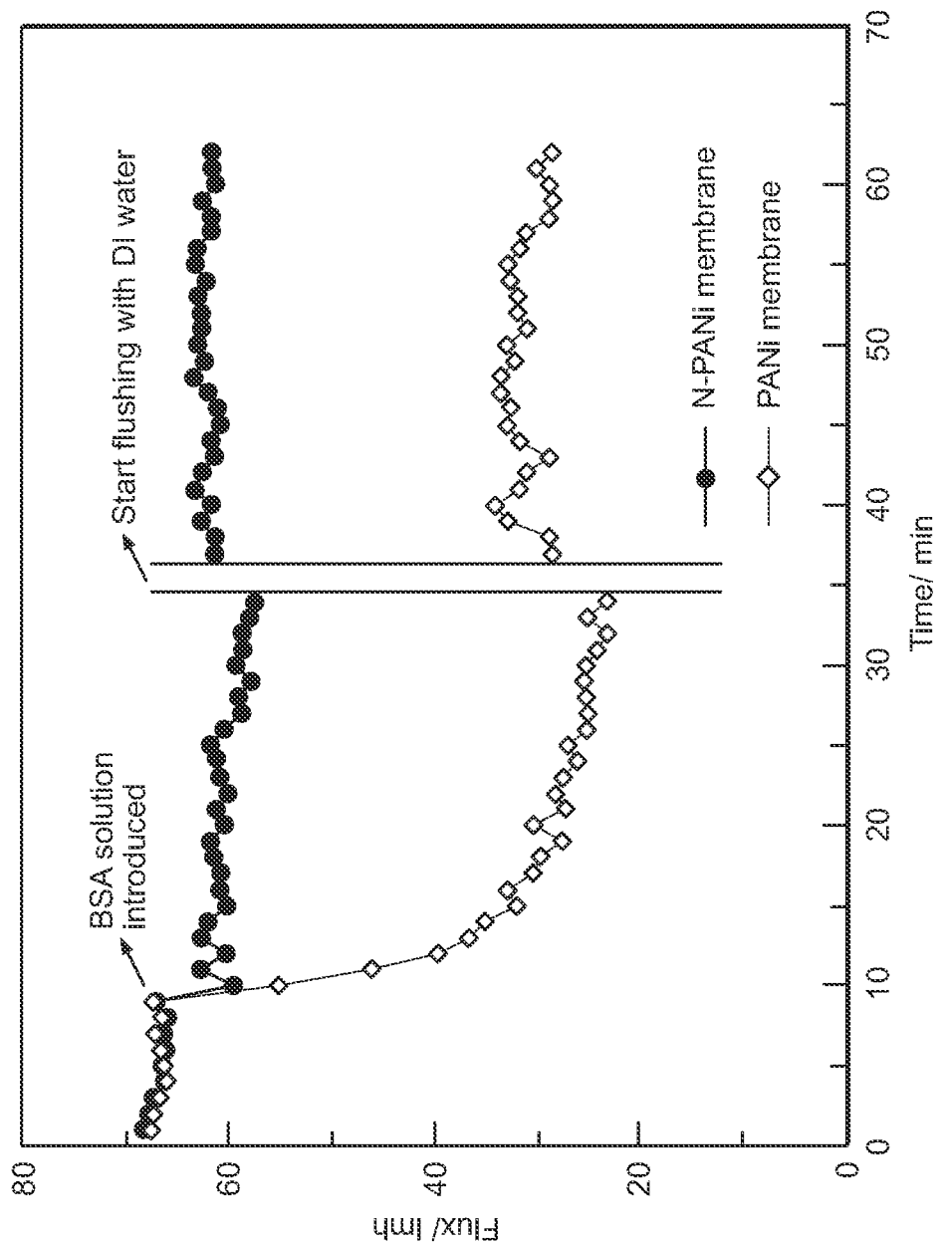
FIG. 7 shows flux decline and recovery for membranes fouled by 1.5 g/L BSA solution before being flushed with DI water.

The antifouling properties of n-PANi membranes were further investigated using a cross-flow fouling test (FIG. 7). After 10 mm of stable flux, the feed was switched to at 1.5 g/L BSA solution. As soon as the BSA solution was used, there was a sudden decrease in flux caused by membrane fouling. The PANi membrane lost 63% of its initial flux due to fouling and only regained 44% of its initial flux when the feed was switched back to DI water after 35 min. The n-PANi membrane exhibits greater fouling resistance than the PANi membrane, only losing 11% of its initial flux from exposure to the BSA solution, while regaining 91% of its initial flux when rinsed with DI water. It's also worth noting that McVerry et al. performed similar testing on a polysulfone membrane in which the same fouling technique was applied, and a commercial polysulfone membrane also exhibited a greater amount of fouling with 50% flux decline after 10 min of fouling and 62% flux recovery after flushing with DI water. Therefore, n-PANi has proven to be a promising new membrane material due to its outstanding ability to effectively mitigate fouling.

12. Cross-Sectional Morphologies and Surface Images

Cross-sectional morphologies and surface images were taken using a JEOL JSM-6701F scanning electron microscope. Unsupported membrane samples were used for cross-sectional imaging. The membranes were prepared from polymer solutions cast unsupported on a glass plate followed by precipitation via non-solvent induced phase inversion in a DI water bath. The resulting unsupported membrane films were peeled off and dried in vacuo overnight at 60° C. Membrane surface images were observed at; 3,000× and 100,000× to visualize the pore size and porosity. In order to determine the chlorine damage on membrane morphology, n-PANi and PANi membranes were soaked in 250 ppm free chlorine for 2 days before drying. Cross-sectional and surface images of the pristine and chlorine exposed membranes were viewed at 600× magnification.

Figure 8:
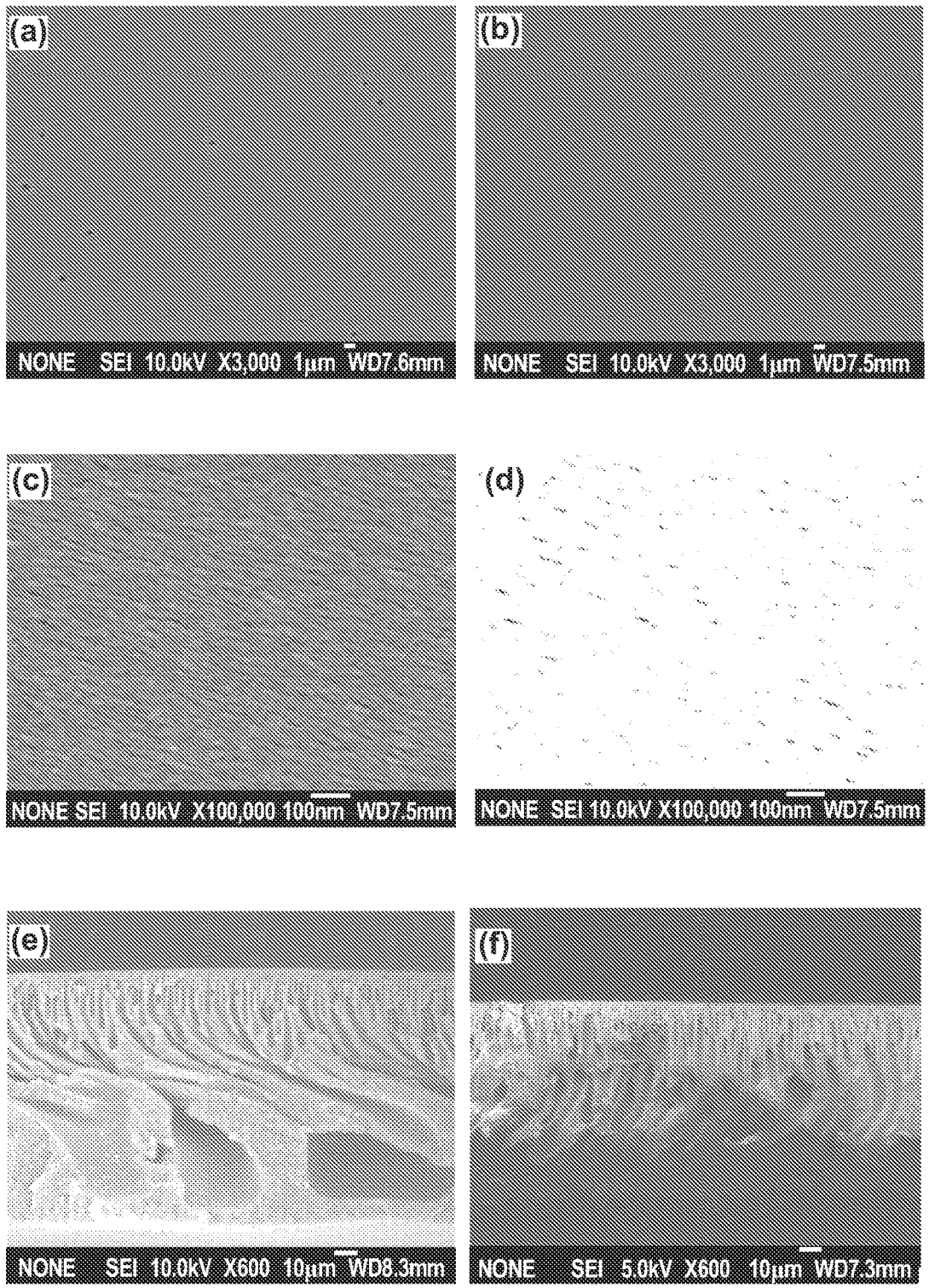
FIG. 8 has 12 panels (a-l), depicting SEM images. Panel (a) depicts a PANi membrane and Panel (b) depicts a n-PANi membrane surface at 3,000× magnification; Panel (c) depicts a n-PANi membrane surface at 100,000× magnification and Panel (d) depicts its black-white picture after conversion using image J software. Panels (e)-(h) depict cross-sectional images of (e) pristine PANi membrane, (f) PANi membrane after chlorine exposure, (g) pristine n-PANi membrane and (h) n-PANi membrane after chlorine exposure at 600× magnification. Panels (i)-(l) depict surface images of (i) pristine PANi membrane, (j) PANi membrane after chlorine exposure, (k) pristine n-PANi membrane and (l) n-PANi membrane after chlorine exposure at 600× magnification.
Figure 8:
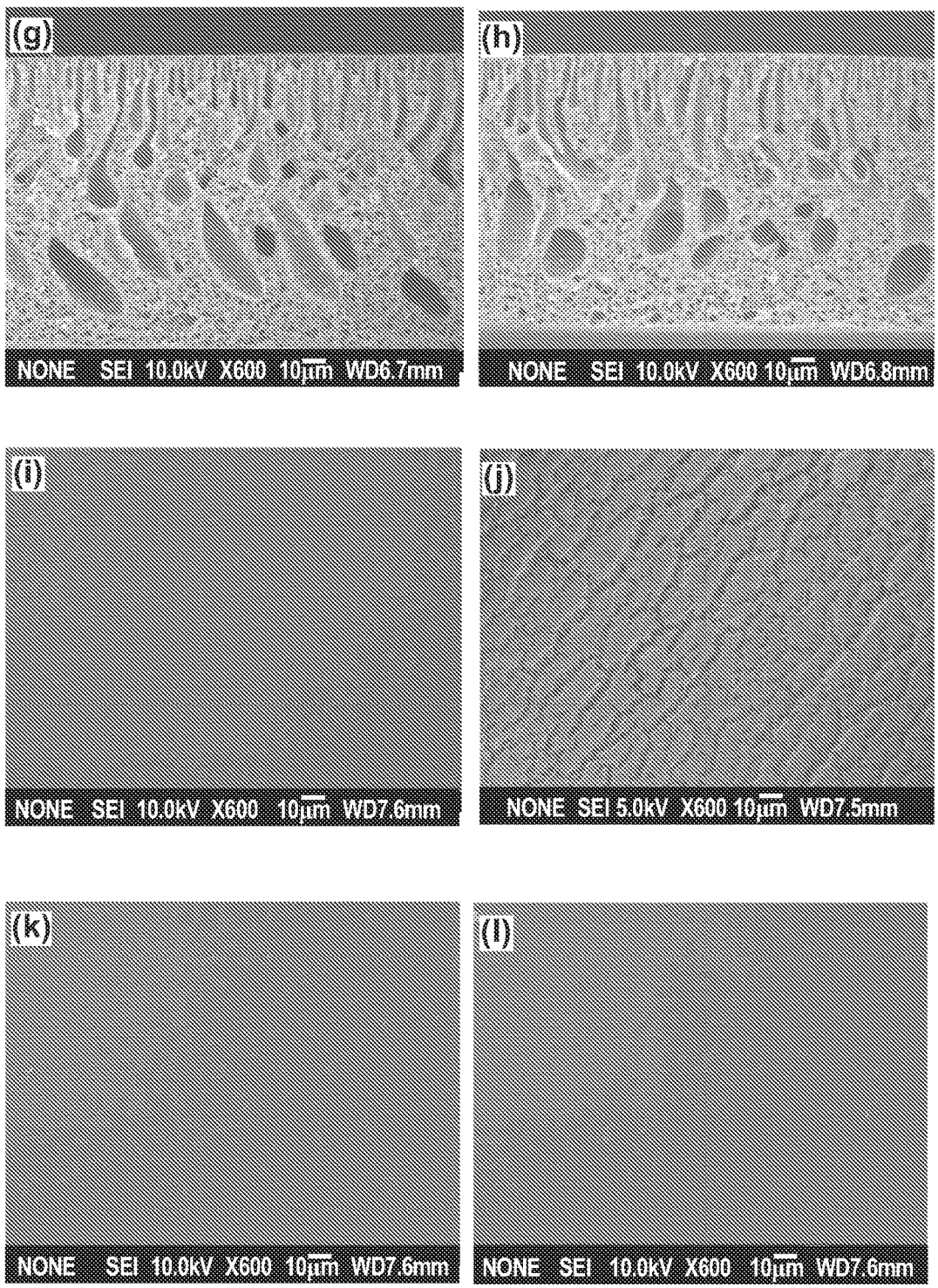

Membrane surface SEM images (FIG. 8a) showed large pores on PANi membrane surface. The pores were several hundred nanometers in diameter, which is comparable with that reported previously. The big pores may be contributing to its relatively high permeability but low BSA (only 8 nm in diameter) rejection. In comparison, at the same magnification, n-PANi membrane surface was continuous with, no visible pores. At 100,000×, slip-shaped pores can be seen, on n-PANi membrane surface (FIG. 8c). The image was converted to black-white picture (FIG. 8d) using NIH Image J software in order to estimate the pore size. The slips were up to 50 nm long with around 10 nm width which led to higher BSA rejection. The surface SEM image in FIG. 8j clearly shows the damage that the chlorine exposure causes to the membrane. The exposed PANi membrane possesses large defects in the surface.

What is claimed is:

1. A filtration membrane comprising

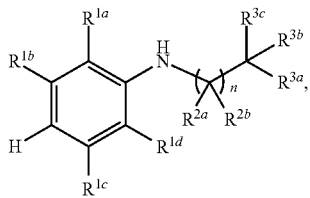

a polymer comprising a structure represented by formula I:

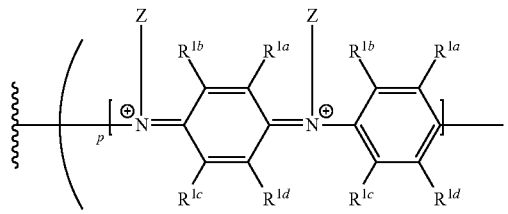

Formula I

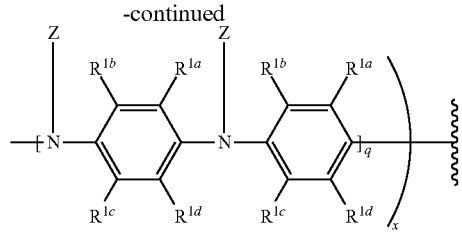

wherein each Z is independently selected from hydrogen and

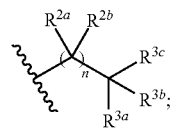

wherein n is an integer selected from 1, 2, and 3;
wherein p is independently 0, 0.5, or 1;
wherein q is independently 0, 0.5, or 1;
wherein, for each x, p+q=1;
wherein each of $R^{1a}$, $R^{1b}$, $R^{1c}$, and $R^{1d}$ is independently selected from hydrogen, halogen, —CN, —$SR^{20}$, —$OR^{21}$, —$NR^{22a}R^{22b}$, —$NR^{22a}R^{22b}H^+$, —$SO_2R^{23}$, —$(C=O)R^{24}$, and C1-C3 alkyl substituted with 0, 1, 2, or 3 groups selected from halogen, —CN, —$SR^{20}$, —$OR^{21}$, —$NR^{22a}R^{22b}$, —$SO_2R^{23}$, and —$(C=O)R^{24}$;
wherein each of $R^{2a}$ and $R^{2b}$ is independently selected from hydrogen, halogen, —CN, —$SR^{30}$, —$OR^{31}$, —$NR^{32a}R^{32b}$, —$NR^{32a}R^{32b}H^+$, —$SO_2R^{33}$, —$(C=O)R^{34}$, and C1-C3 alkyl substituted with 0, 1, 2, or 3 groups selected from halogen, —CN, —$SR^{30}$, —$OR^{31}$, —$NR^{32a}R^{32b}$, —$SO_2R^{33}$, and —$(C=O)R^{34}$;
wherein each of $R^{3a}$, $R^{3b}$, and $R^{3c}$ is independently selected from hydrogen, halogen, —CN, —$SR^{40}$, —$OR^{41}$, —$NR^{42a}R^{42b}H^+$, —$NR^{42a}R^{42b}H^+$, —$SO_2R^{43}$, and —$(C=O)R^{44}$;
wherein each of $R^{20}$, $R^{21}$, $R^{22a}$, $R^{22b}$, $R^{30}$, $R^{31}$, $R^{32a}$, $R^{32b}$, $R^{40}$, $R^{41}$, $R^{42a}$, and $R^{42b}$, when present, is independently selected from hydrogen, C1-C3 alkyl, C1-C3 monohaloalkyl, and C1-C3 polyhaloalkyl;
wherein each of $R^{23}$ and $R^{24}$, when present, is independently selected from —$O^-$, —$OR^{25}$, C1-C3 alkyl, C1-C3 monohaloalkyl, C1-C3 polyhaloalkyl, and —$NR^{26a}R^{26b}$;
wherein each of $R^{25}$, $R^{26a}$, and $R^{26b}$, when present, is independently selected from hydrogen, C1-C3 alkyl, C1-C3 monohaloalkyl, and C1-C3 polyhaloalkyl;
wherein each of $R^{33}$ and $R^{34}$, when present, is independently selected from —$O^-$, —$OR^{35}$, C1-C3 alkyl, C1-C3 monohaloalkyl, C1-C3 polyhaloalkyl, and —$NR^{36a}R^{36b}$;
wherein each of $R^{35}$, $R^{36a}$, and $R^{36b}$, when present, is independently selected from hydrogen, C1-C3 alkyl, C1-C3 monohaloalkyl, and C1-C3 polyhaloalkyl;
wherein each of $R^{43}$ and $R^{44}$, when present, is independently selected from —$O^-$, —$OR^{45}$, C1-C3 alkyl, C1-C3 monohaloalkyl, C1-C3 polyhaloalkyl, and —$NR^{46a}R^{46b}$;
wherein each of $R^{45}$, $R^{46a}$, and $R^{46b}$, when present, is selected from hydrogen, C1-C3 alkyl, C1-C3 monohaloalkyl, and C1-C3 polyhaloalkyl; and wherein at least one Z is a structure represented by a formula:

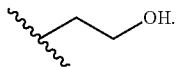 [SMILES: *CCO]

2. The membrane of claim 1, wherein the membrane further comprises a support structure.

3. The membrane of claim 1, wherein the membrane further comprises a second polymer selected from polysulfone, sulfonated polysulfone, polyethersulfone, sulfonated polyethersulfone, polyaniline, polyaniline co-polymers, polyacrylonitrile, polyurethane, cellulose acetate, polyvinylidene fluoride, polytetrafluoroethylene, polyvinyl fluoride, polyvinylidene fluoride, polytrifluoroethylene, polyperfluoroalkyl vinyl ether, polyhexafluoropropylene, cellulose acetate, polyurethane, cellulose acetate, and polyurethane, or a mixture thereof.

4. The membrane of claim 1, wherein the membrane further comprises polysulfone.

5. The membrane of claim 1, wherein the polymer is present in an amount from about 0.1 wt % to about 35 wt %.

6. The filtration membrane of claim 1, wherein each of $R^{1a}$, $R^{1b}$, $R^{1c}$, and $R^{1d}$ is hydrogen.

7. The filtration membrane of claim 1, wherein each Z is a structure represented by a formula:

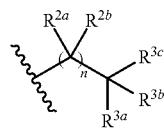

and at least one Z is a structure represented by a formula

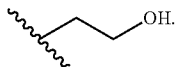 [SMILES: *CCO]

8. A filtration membrane comprising a polymer formed by polymerizing a compound having a structure represented by formula II:

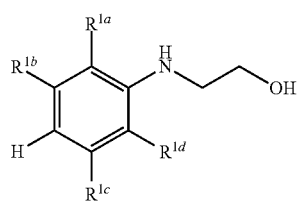

Formula II wherein each of $R^{1a}$, $R^{1b}$, $R^{1c}$, and $R^{1d}$ is independently selected from hydrogen, halogen, —CN, —$SR^{20}$, —$OR^{21}$, —$NR^{22a}R^{22b}$, —$NR^{22a}R^{22b}H^+$, —$SO_2R^{23}$, —(C=O)$R^{24}$, and C1-C3 alkyl substituted with 0, 1, 2, or 3 groups selected from halogen, —CN, —$SR^{20}$, —$OR^{21}$, —$NR^{22a}R^{22b}$, —$SO_2R^{23}$, and —(C=O)$R^{24}$;

wherein each of $R^{20}$, $R^{21}$, $R^{22a}$ and $R^{22b}$, when present, is independently selected from hydrogen, C1-C3 alkyl, C1-C3 monohaloalkyl, and C1-C3 polyhaloalkyl;

wherein each of $R^{23}$ and $R^{24}$, when present, is independently selected from —$O^-$, —$OR^{25}$, C1-C3 alkyl, C1-C3 monohaloalkyl, C1-C3 polyhaloalkyl, and —$NR^{26a}R^{26b}$; and wherein each of $R^{25}$, $R^{26a}$, and $R^{26b}$, when present, is independently selected from hydrogen, C1-C3 alkyl, C1-C3 monohaloalkyl, and C1-C3 polyhaloalkyl.

9. The membrane of claim 8, wherein the membrane further comprises a support structure.

10. The membrane of claim 8, wherein the membrane further comprises a second polymer selected from polysulfone, sulfonated polysulfone, polyethersulfone, sulfonated polyethersulfone, polyaniline, polyaniline co-polymers, polyacrylonitrile, polyurethane, cellulose acetate, polyvinylidene fluoride, polytetrafluoroethylene, polyvinyl fluoride, polyvinylidene fluoride, polytrifluoroethylene, polyperfluoroalkyl vinyl ether, polyhexafluoropropylene, cellulose acetate, polyurethane, cellulose acetate, and polyurethane, or a mixture thereof.

11. The membrane of claim 8, wherein the membrane further comprises polysulfone.

12. The membrane of claim 8, wherein the polymer is present in an amount from about 0.1 wt % to about 35 wt %.

13. The membrane of claim 8, wherein the compound is

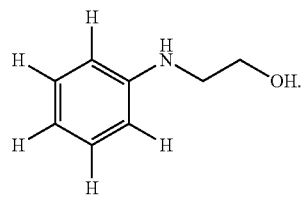

* * * * *

UNITED STATES PATENT AND TRADEMARK OFFICE
CERTIFICATE OF CORRECTION

PATENT NO. : 10,532,328 B2  Page 1 of 1
APPLICATION NO. : 15/302361
DATED : January 14, 2020
INVENTOR(S) : Eric M. V. Hoek et al.

It is certified that error appears in the above-identified patent and that said Letters Patent is hereby corrected as shown below:

In the Claims

In Claim 1, Column 63, Line 43-50, cancel the structure " 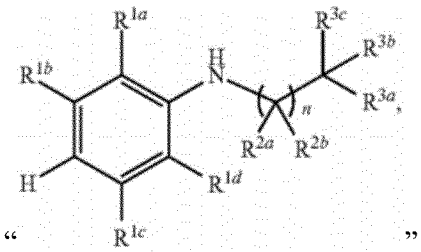 "

In Claim 1, Column 64, Line 41, cancel the text "-$NR^{42a}R^{42b}H^+$, -$NR^{42a}R^{42b}H^+$," and insert:
-- -$NR^{42a}R^{42b}$, -$NR^{42a}R^{42b}H^+$, --

Signed and Sealed this
Seventh Day of July, 2020

Andrei Iancu
*Director of the United States Patent and Trademark Office*